United States Patent
Galstian et al.

(10) Patent No.: US 12,099,265 B2
(45) Date of Patent: Sep. 24, 2024

(54) LIQUID CRYSTAL CELL ASSEMBLY AND METHOD FOR DETECTION ENHANCEMENT

(71) Applicants: Tigran Galstian, Québec (CA); Van Vladimir Galstian, Québec (CA)

(72) Inventors: Tigran Galstian, Québec (CA); Van Vladimir Galstian, Québec (CA)

(*) Notice: Subject to any disclaimer, the term of this patent is extended or adjusted under 35 U.S.C. 154(b) by 0 days.

(21) Appl. No.: 18/451,887

(22) Filed: Aug. 18, 2023

(65) Prior Publication Data
US 2024/0045239 A1    Feb. 8, 2024

Related U.S. Application Data

(63) Continuation of application No. PCT/CA2022/050336, filed on Mar. 8, 2022.
(Continued)

(51) Int. Cl.
*G02F 1/01*  (2006.01)
*G02F 1/13*  (2006.01)
(Continued)

(52) U.S. Cl.
CPC .......... *G02F 1/0136* (2013.01); *G02F 1/1306* (2013.01); *G02F 1/1313* (2013.01);
(Continued)

(58) Field of Classification Search
CPC .... G02F 1/0136; G02F 1/1306; G02F 1/1313; G02F 1/13318; G02F 1/133636; G02F 1/133769; G02F 1/1398; G02F 1/13718; G02F 1/1347; G02F 1/13725; G02F 1/13475; H04N 23/55; G02B 27/286
See application file for complete search history.

(56) References Cited

U.S. PATENT DOCUMENTS 5,589,965 A    12/1996  Bahadur et al.
9,148,555 B2    9/2015  Iwasaki
(Continued)

FOREIGN PATENT DOCUMENTS

| | | |
|---|---|---|
| EP | 3049864 B1 | 3/2021 |
| JP | 2016-534392 A | 11/2016 |
| WO | 2019/094793 A1 | 5/2019 |

OTHER PUBLICATIONS

International application No. PCT/CA2022/050336 International Search Report dated Jun. 30, 2022.
(Continued)

*Primary Examiner* — Donald L Raleigh
(74) *Attorney, Agent, or Firm* — Anglehart et al.

(57) ABSTRACT

Simple and cost-effective measurement of polarization components or the complete PSoL (the so-called Stokes parameters) is achieved without any mechanical movements or deformation by using liquid crystal elements. A transmission of a first polarization of light is greater than a transmission of a second orthogonal polarization of light and transmission of the second polarization is greater than 5%. In another of the different states, the device has different levels of transmission of the first and second polarizations of light. At least two orthogonal polarization component values characterizing the light can be resolved by comparing an intensity of light captured in a plurality of the different states.

20 Claims, 39 Drawing Sheets

Related U.S. Application Data

(60) Provisional application No. 63/248,165, filed on Sep. 24, 2021, provisional application No. 63/158,108, filed on Mar. 8, 2021.

(51) Int. Cl.
  *G02F 1/133* (2006.01)
  *G02F 1/13363* (2006.01)
  *G02F 1/1337* (2006.01)

(52) U.S. Cl.
  CPC .... *G02F 1/13318* (2013.01); *G02F 1/133636* (2013.01); *G02F 1/133769* (2021.01)

(56) References Cited

U.S. PATENT DOCUMENTS

| | | |
|---|---|---|
| 2007/0229754 A1 | 10/2007 | Galstian et al. |
| 2016/0282639 A1 | 9/2016 | von und zu Liechtenstein |
| 2017/0219909 A1* | 8/2017 | Galstian ............... G02F 1/1337 |
| 2019/0364254 A1 | 11/2019 | Ortiz Egea et al. |
| 2020/0182988 A1 | 6/2020 | Pau |
| 2021/0026164 A1 | 1/2021 | Skorka et al. |

OTHER PUBLICATIONS

International application No. PCT/CA2022/050336 Search Strategy dated Jun. 30, 2022.
International application No. PCT/CA2022/050336 Written Opinion of the International Searching Authority dated Jun. 30, 2022.
International application No. PCT/CA2022/050336 International Supplementary International Search Report dated May 26, 2023.
H. G. Berry, G et al., Measurement of the Stokes parameters of light, Applied Optics / vol. 16, No. 12 / Dec. 1977. pp. 3200-3205.
Haitao Luo, et al., Compact and miniature snapshot imaging polarimeter, Aug. 20, 2008 / vol. 47, No. 24 / Applied Optics. pp. 4413-4417.
Sijia Wen, et al., Joint Chromatic and Polarimetric Demosaicing via Sparse Coding, arXiv:1912.07308v1 [cs.CV] Dec. 16, 2019. pp. 1-10.

* cited by examiner

Measuring $I_{x(0°)}$

Measuring $I_{(-45°)}$

Measuring $I_{y(90°)}$

Measuring $I_{(+45°)}$

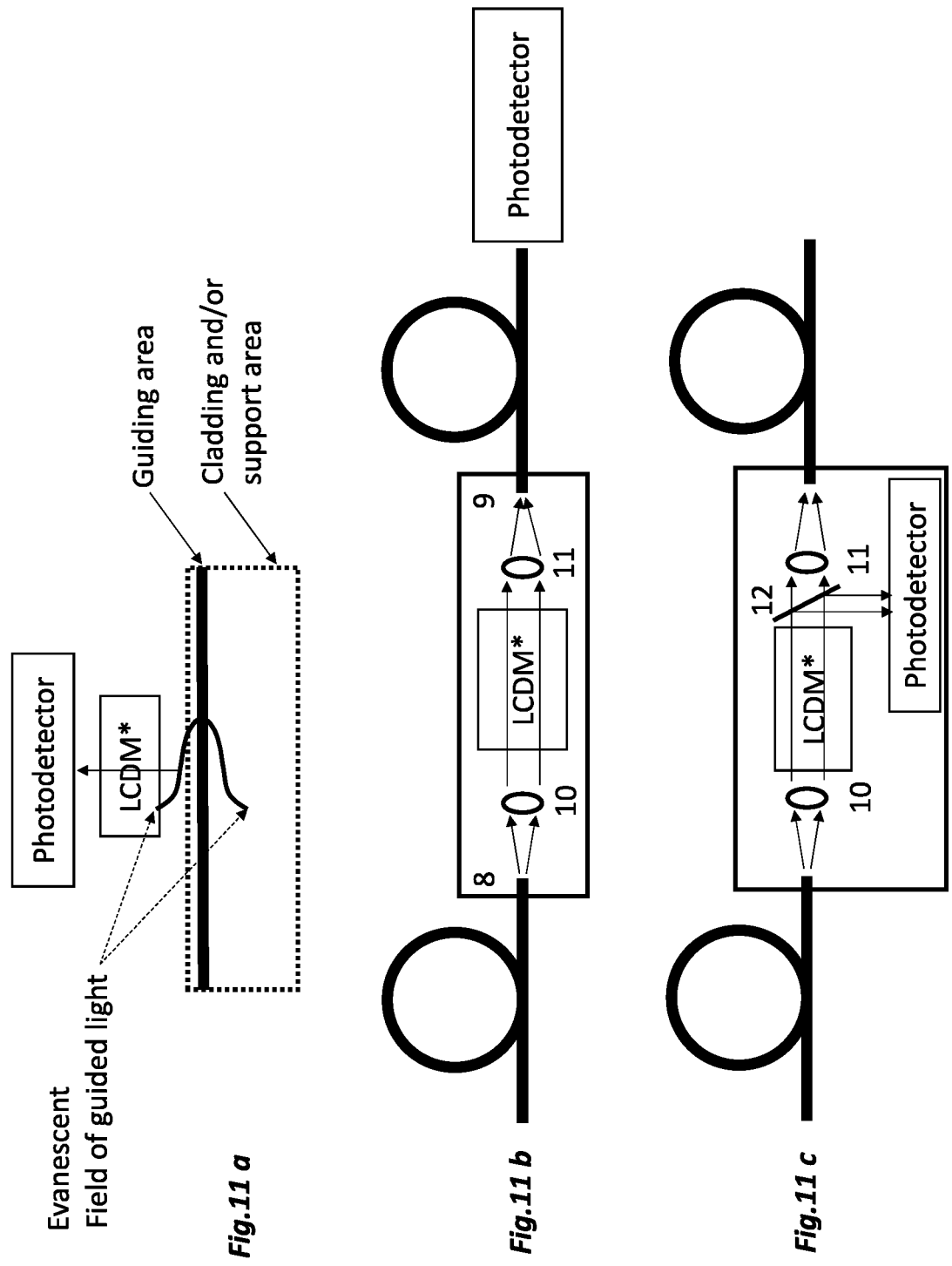

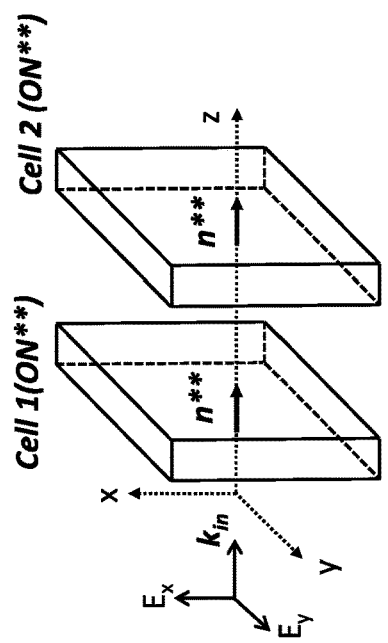
Fig.16 a
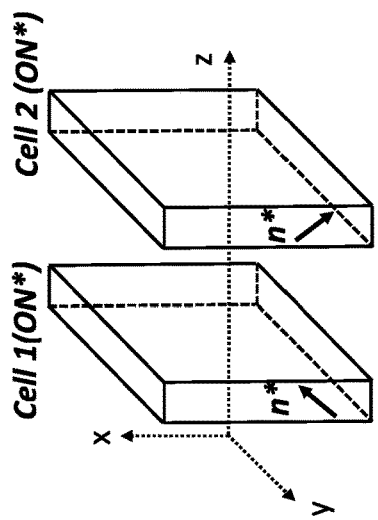
Fig.16 b
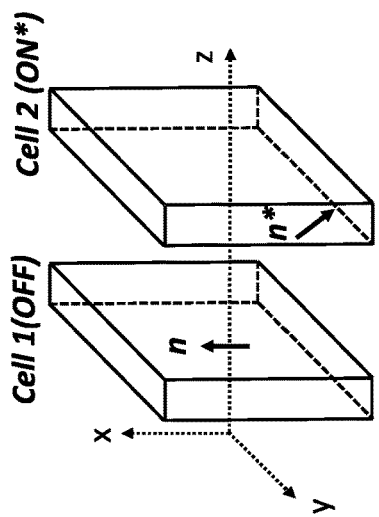
Fig.16 c
Fig.16 d
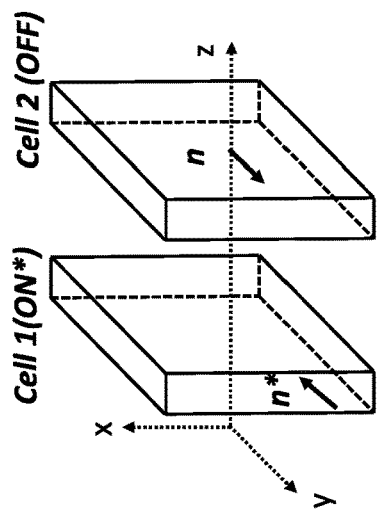
Fig.16 e

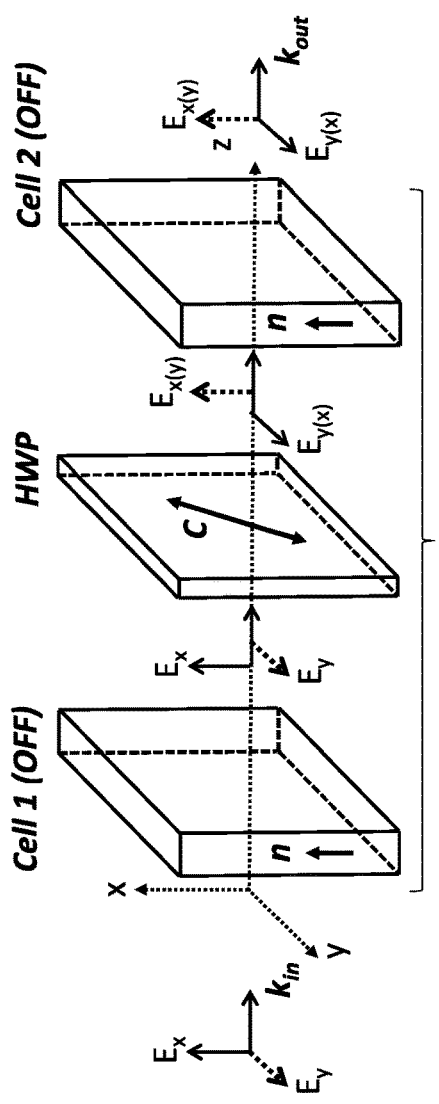
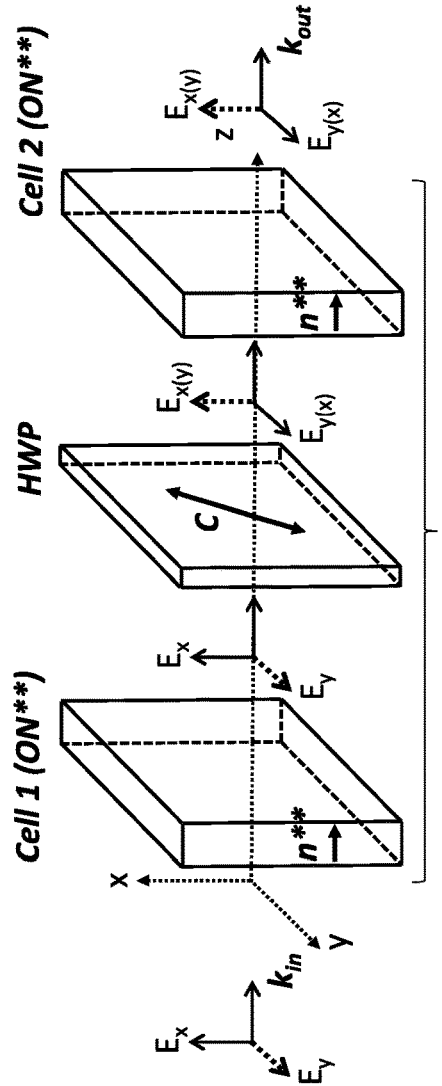
Fig.18 a
Fig.18 b

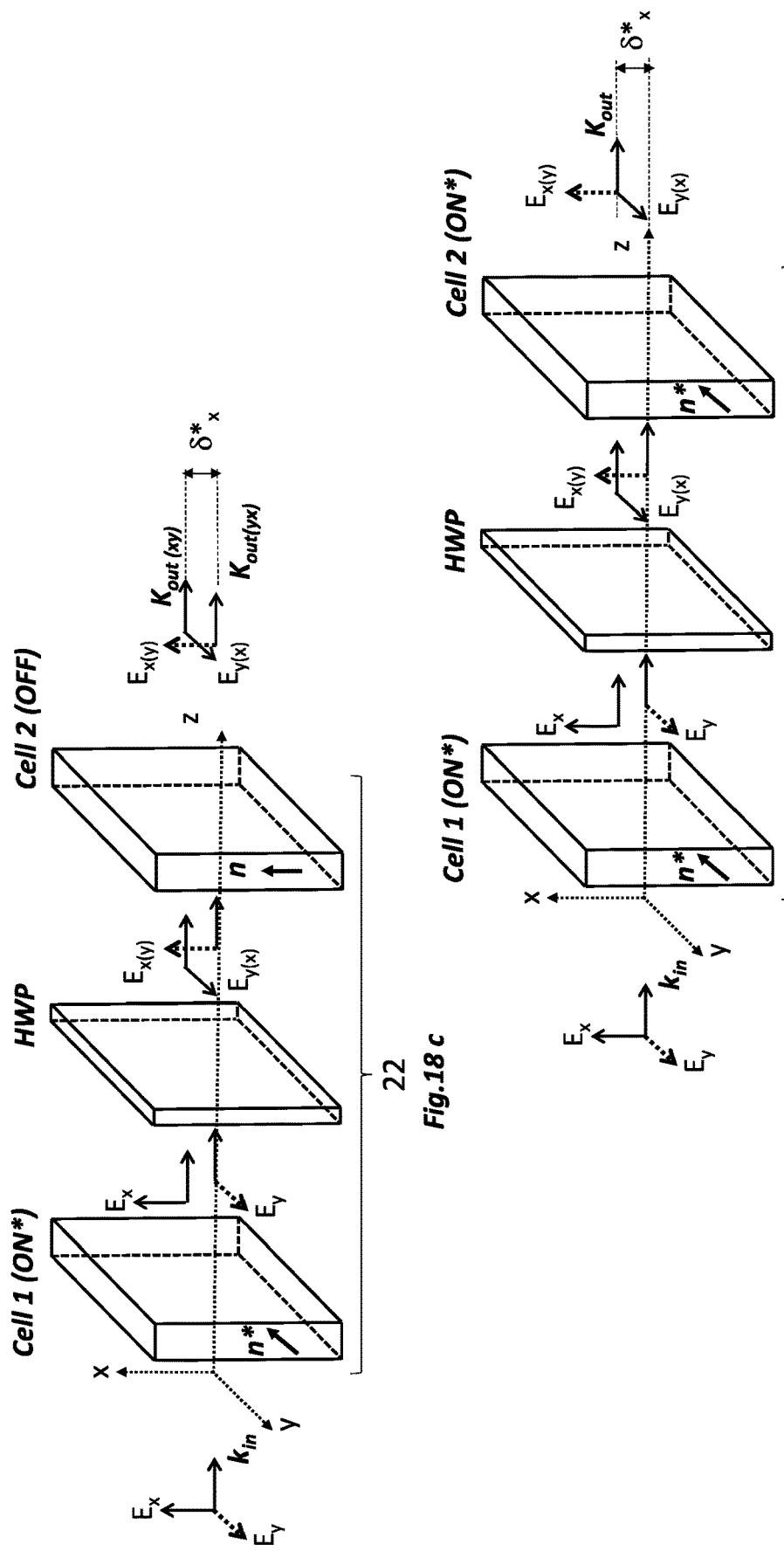

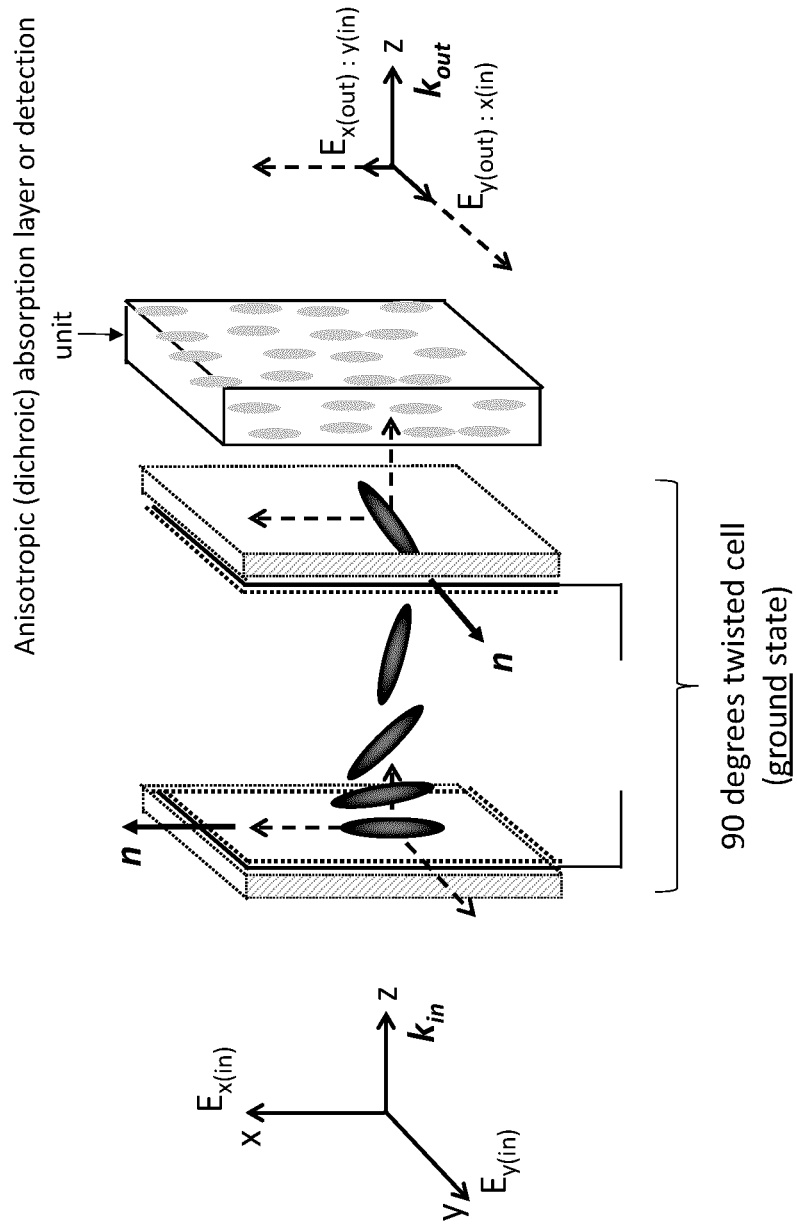
Fig.22a (3D view)

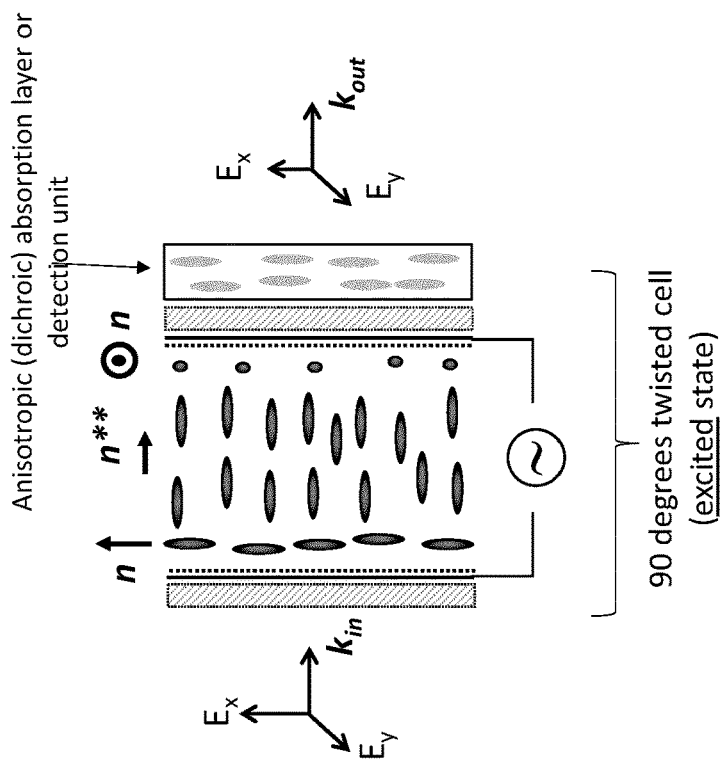
Fig.22c (Side view)
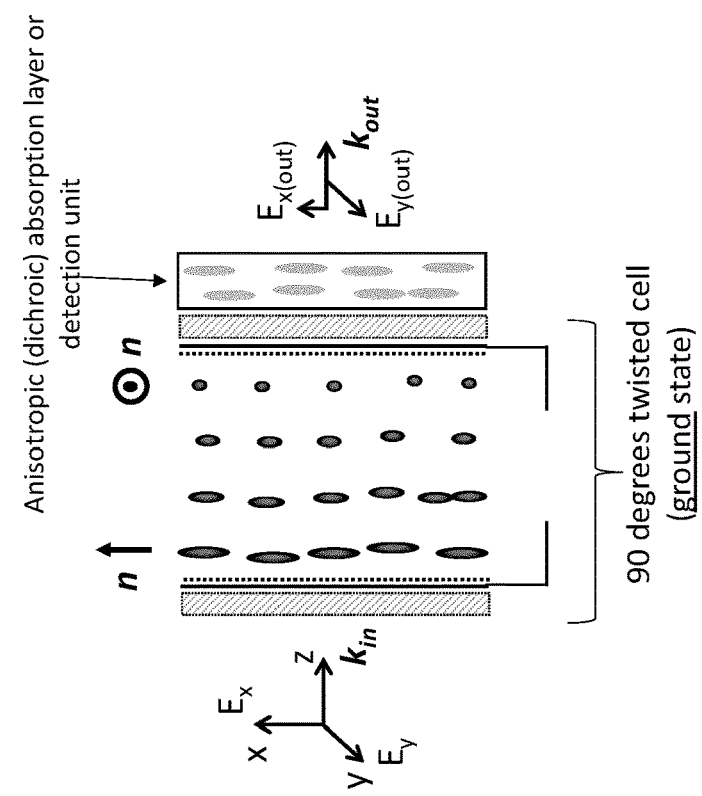
Fig.22b (Side view)

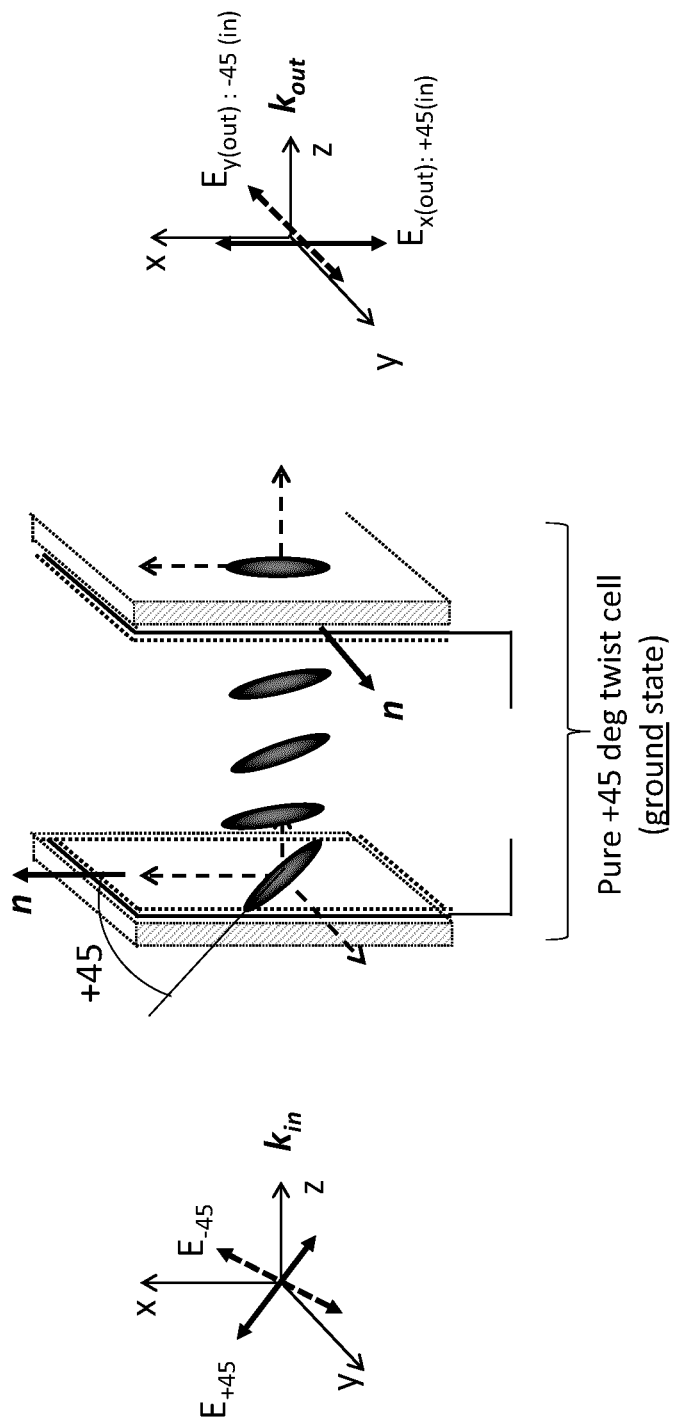
Fig.23a (3D view)

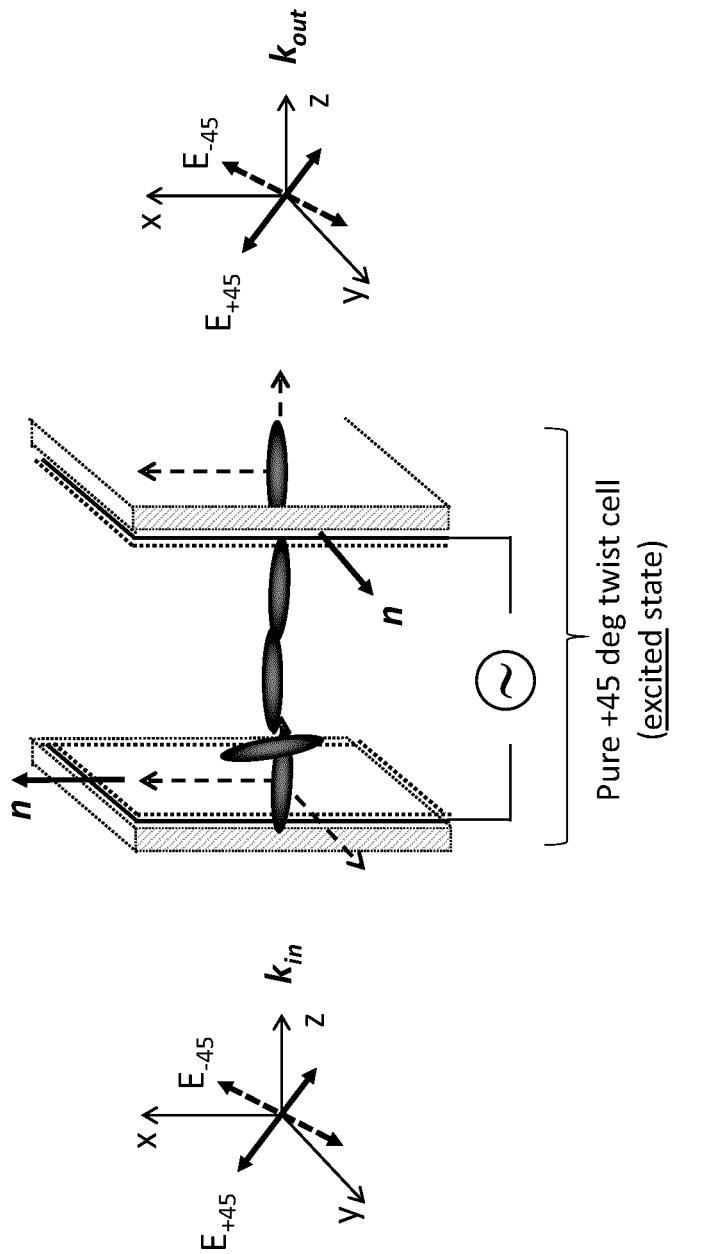
Fig.23b (3D view)

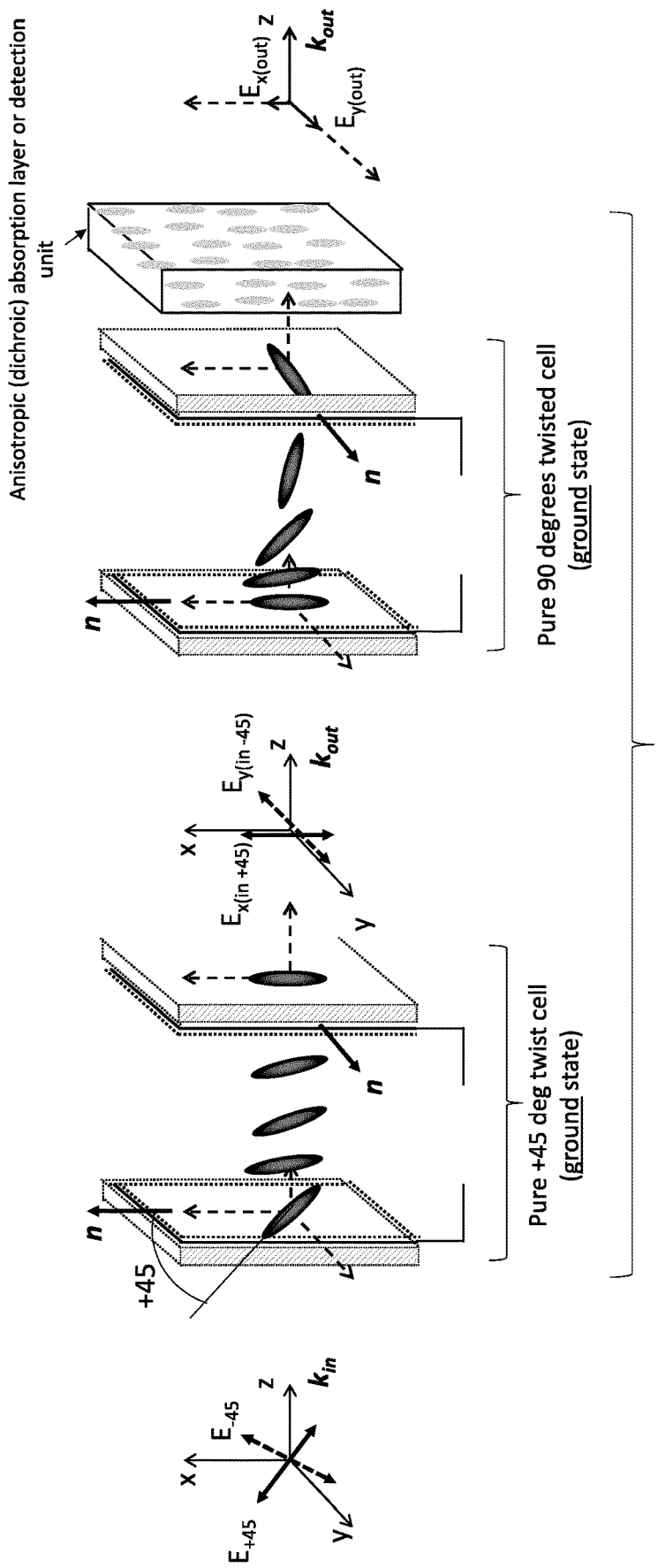
Fig.23c (3D view)

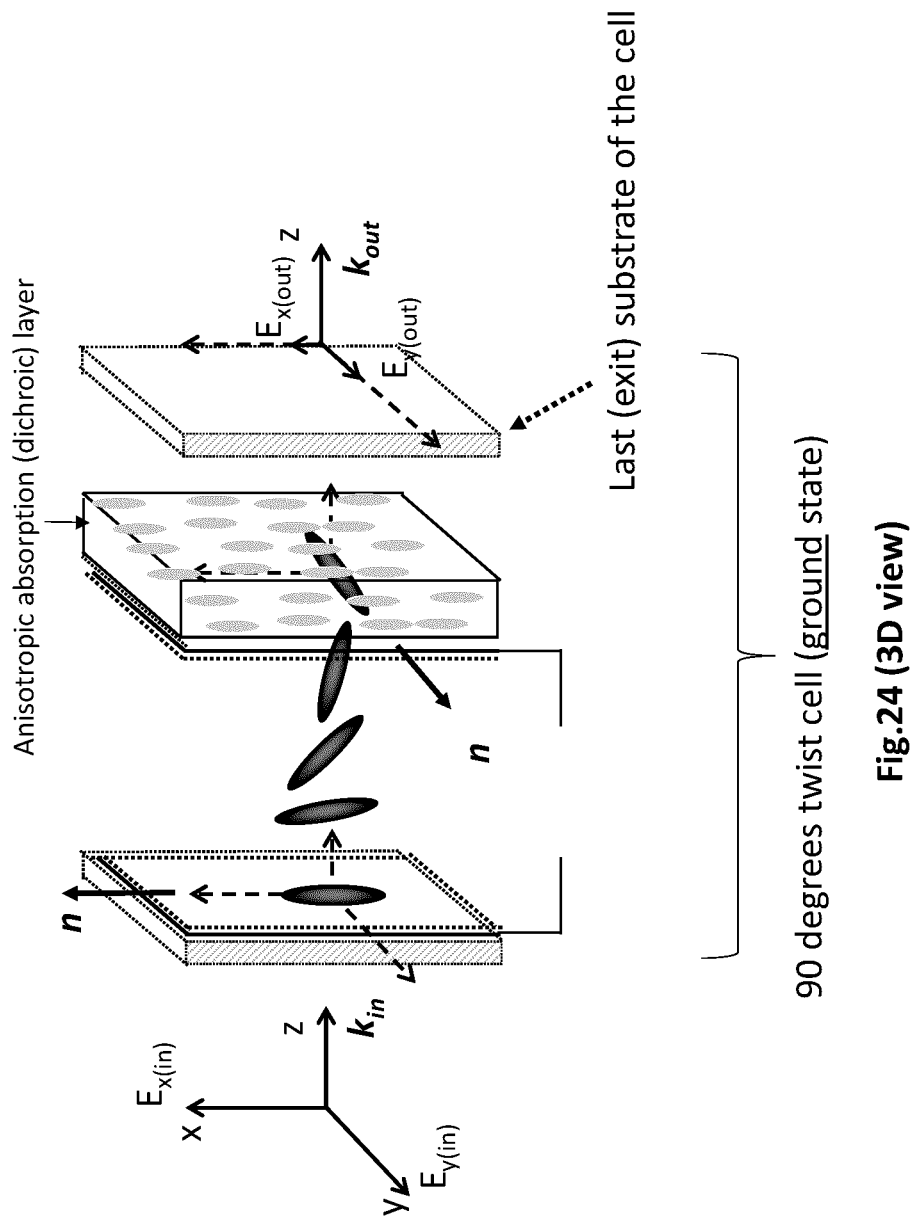
Fig.24 (3D view)

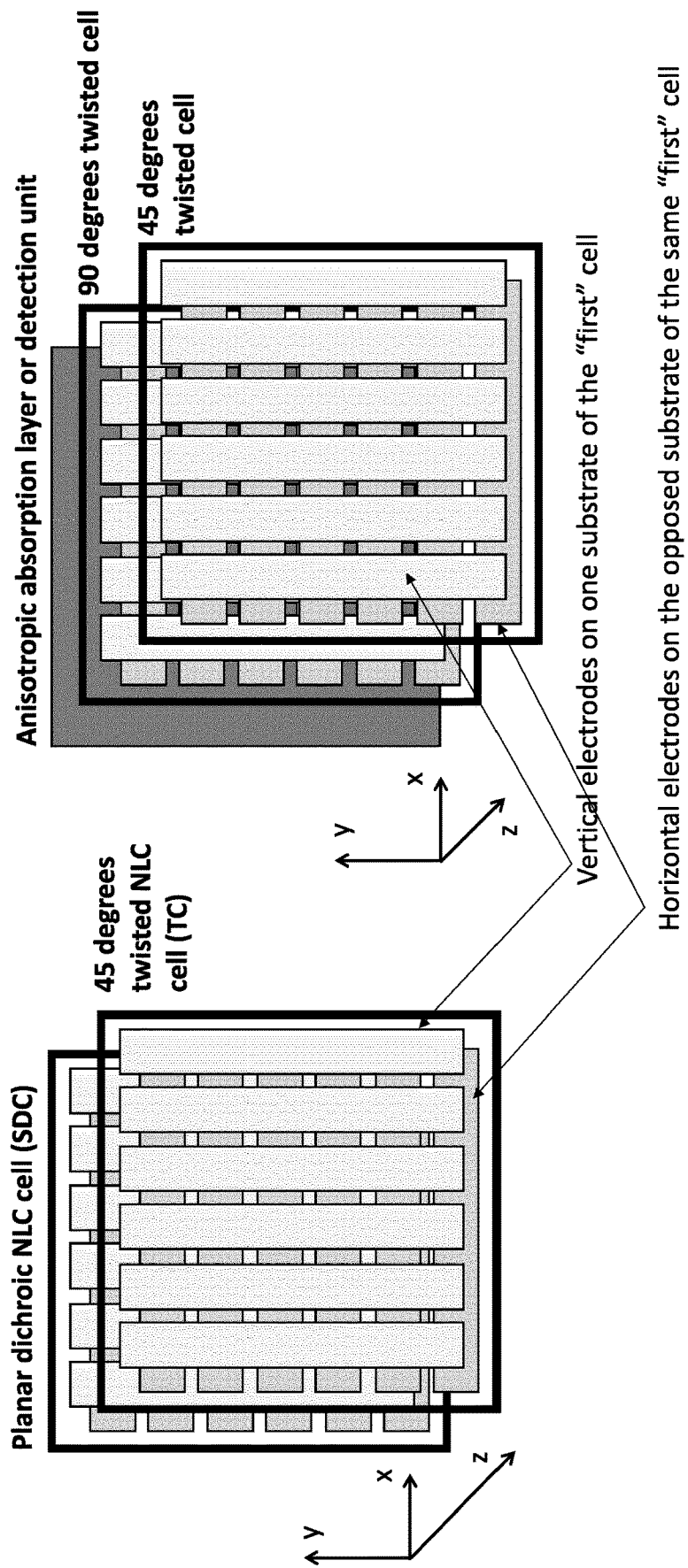
Fig.25b (3D view)
Fig.25a (3D view)

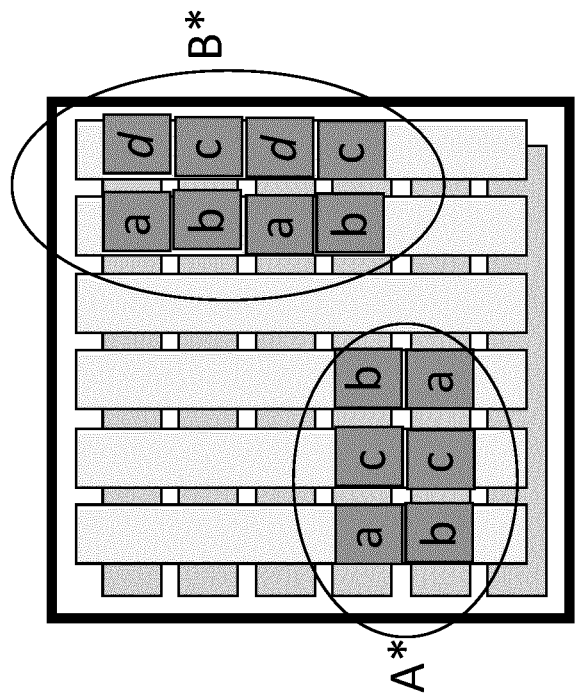
Fig.25d (top view)
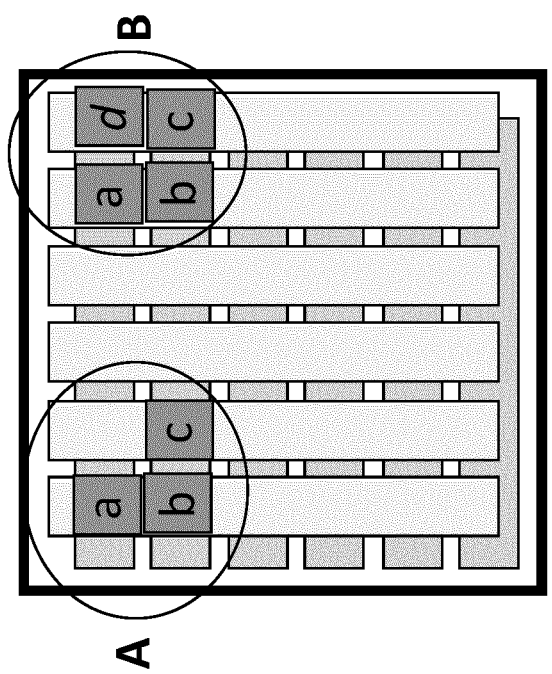
Fig.25c (top view)

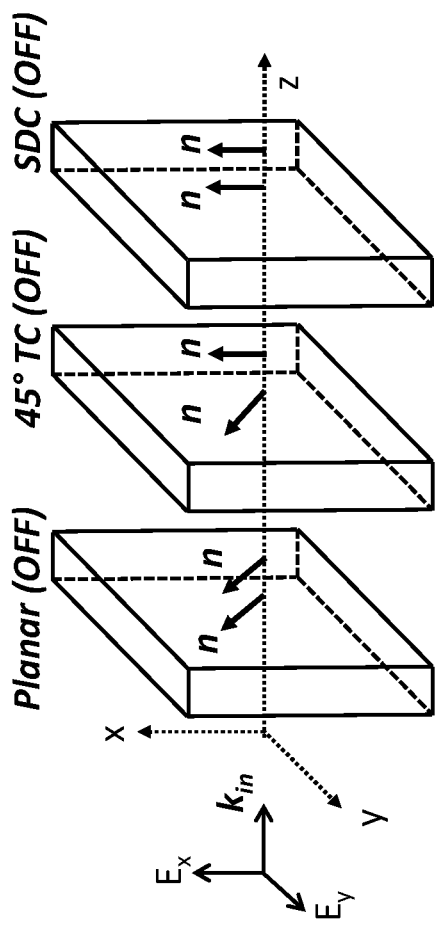
*Fig.26 (3D view; ground state)*

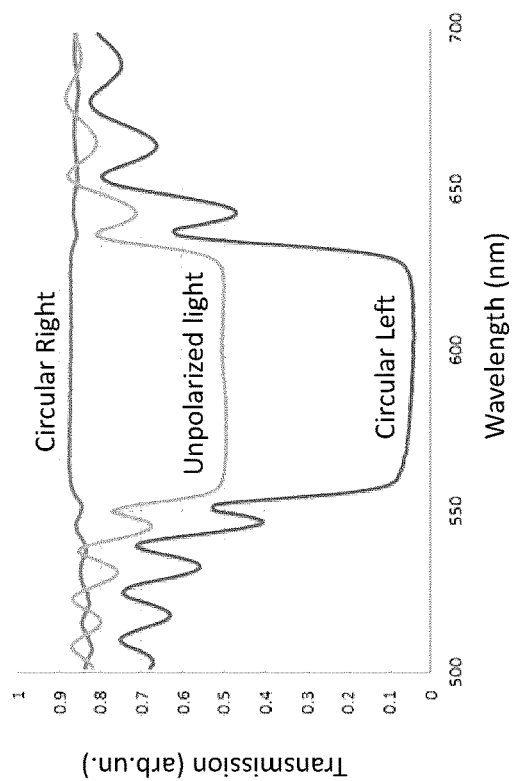
*Fig.27 b*
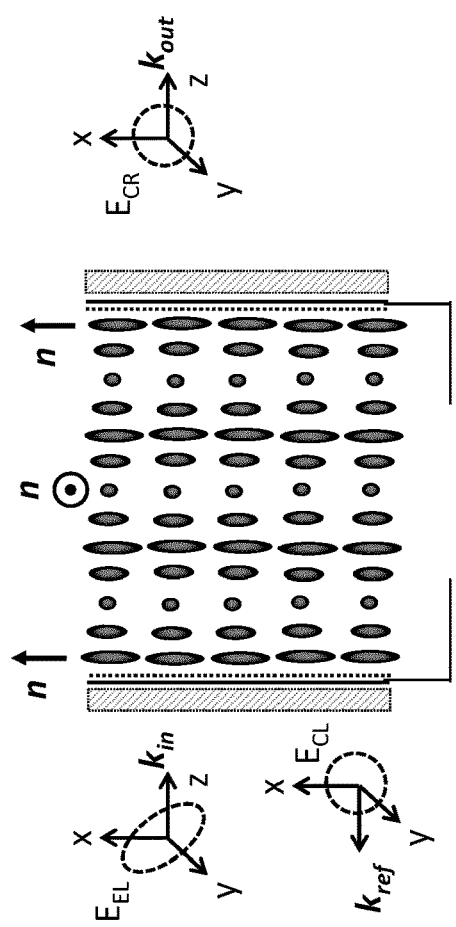
*Fig.27 a (side view; ground state)*

LIQUID CRYSTAL CELL ASSEMBLY AND METHOD FOR DETECTION ENHANCEMENT

This patent application claims priority of US provisional patent applications 63/158,108 filed Mar. 8, 2021 and 63/248,165 filed Sep. 24, 2021, the contents of which are hereby incorporated by reference.

TECHNICAL FIELD

The present invention generally relates to methods and devices using optical sensors and more particularly to liquid crystalline polarimetric elements and image sensors using the same.

BACKGROUND

Polarization of light refers to the spatiotemporal behavior of the vector of its electric field E. Knowing the polarization state of light (PSoL) is important in many applications, such as laser beam characterization, microscopy, telecommunication, polarization discrimination imaging, etc. Natural light is usually unpolarized (that is, its electric field behaves chaotically). In contrast, some artificial light sources (such as lasers) can be highly polarized (that is, their electric field behaves in a very deterministic way). Usually, the field E of light, propagating in the direction of z axis, can be presented by the sum of two orthogonal polarization components $E_x$ and $E_y$ (FIG. 1a, where k represents the wave vector of light). The PsoL can change after traversing some objects (FIG. 1b) or upon reflection from them (FIG. 1c). Most interestingly, various objects may change differently the PsoL, and often, man-made artificial objects (such as a car) will introduce different changes compared to natural objects (such as a leaf). Thus, this polarization change may be used as a very powerful tool to identify, study and to classify materials. For example, it can be used both for scientific or artistic purposes by revealing the specificities and differences of objects in photographic images or in LIDAR systems. This requires the availability of devices that can measure the PsoL efficiently.

The operation principles of currently available devices, used to measure the PsoL, are either based on the mechanical rotation of a linear polarizer (FIG. 2, see hereafter), or polarization sensitive diffractive elements or a combination of anisotropic waveplates. These methods are cumbersome, costly, and not well-suited for many emerging photonic applications. Most importantly, they are often made for "single-channel" detection and are "disruptive", that is, the light beam must be interrupted or dramatically attenuated to perform these measurements.

There is therefore a need for a simpler, less costly, parallel, and non-disruptive method to measure the PsoL. The current invention provides such solution.

SUMMARY

Applicant provides a device and a method that can allow the simple and cost-effective measurement of polarization components or the complete PSoL (the so-called Stokes parameters, see hereafter) without any mechanical movements or deformation. This method may be used for a single beam (single channel) detection as well as for different parts of a beam, as a parallel multi-channel detection or imaging.

In some embodiments of the proposed solution, a light polarization modulation device may comprise at least one active liquid crystal element that, in response to a control signal, changes a propagation of light in a polarization-dependent manner in different states, wherein, in one of the different states, the device has a transmission of a first polarization of light greater than a transmission of a second orthogonal polarization of light and transmission of said second polarization is greater than 5%, and in another of the different states, the device has different levels of transmission of said first polarization of light and said second polarization of light than in the one of the different states, and wherein at least one polarization state value characterizing the light can be resolved by comparing an intensity of light captured in a plurality of said different states. In this way, the use of conventional polarization filters that cause over 50% of the unpolarized light to be lost are avoided while still being able to detect polarization components or PSoL.

Some embodiments can be incorporated into a camera without significantly harming normal camera operation in a given liquid crystal state (e.g. image resolution, sharpness and sensitivity may be affected by less than few percents), and offering the added ability to detect polarization components or PSoL when desired.

The at least one active liquid crystal element may comprise a planar nematic liquid crystal cell containing a dichroic dye that, in use, can provide a variable absorption of light of one linear polarization depending on an orientation of a planar nematic liquid crystal material.

The planar nematic liquid crystal cell containing a dichroic dye may absorb less than 40% of the one linear polarization and less than 4% of an orthogonal linear polarization in one orientation of the planar nematic liquid crystal material and less than 4% of the one linear polarization and of the orthogonal linear polarization in another orientation of the planar nematic liquid crystal material. Two orthogonal linear polarization components, one in the direction of the ground state molecular orientation of the said planar nematic liquid crystal cell and the second in the perpendicular direction, may be calculated by comparing the total transmitted light intensity in said two different states.

The at least one active liquid crystal element may further comprise a twisted liquid crystal cell able to provide a 45° rotation of a linear polarization of light in its ground-state, wherein the planar nematic liquid crystal cell receives the light from the twisted liquid crystal cell and the controller compares the intensity signal using the said variable absorption in the presence of 45° rotation or in the absence of such a rotation, when the second cell is untwisted, to provide also a measurement and calculation of two more linear polarization component values along +45° and −45°, enabling thus the recording of four key polarization components, along 0°, 90°, +45° and −45°, of the incident radiation.

The at least one active liquid crystal element may comprise two active liquid crystal elements having a planar nematic liquid crystal orientation and containing the dichroic dye, the planar nematic liquid crystal orientation being at 45° between the two active liquid crystal elements, and the controller compares the intensity signal using the two active liquid crystal elements to provide a measurement of four key polarization components, along 0°, 90°, +45° and −45°, of the incident radiation.

The at least one active liquid crystal element may further comprise a cholesteric liquid crystal element arranged to at least partially reflect one circular polarization of light in one of the different states and not to reflect the one circular polarization of light in another of the different states. In this way, the controller can be configured to provide the difference of intensities between right and left circular polarization components, commonly called parameter $S_3$ of Stokes, enabling thus the measurement and calculation of all four Stokes parameters $S_0$ to $S_3$ as the at least one polarization state value characterizing the light.

In other embodiments, the at least one active liquid crystal element may comprise a twisted liquid crystal cell able to rotate or to switch a linear polarization of light by 90° in a ground state and by 0° in an active untwisted state, the device comprising also an output component or a film with dichroic loss of light, based on absorption, diffraction, reflection, etc., passing through the said assembly of the cell and of the film to the at least one photodetector. The detection of total light transmission difference through the combined device in the ground state of said twisted cell and in the state when the twist is eliminated (untwisted) providing information about two orthogonal linear polarization components of incident light with respect to the ground state molecular orientation of the said twisted cell.

In other embodiments, the at least one active liquid crystal element may comprise a twisted liquid crystal cell able to rotate or to switch a linear polarization of light by 45° in a ground state and by 0° in an active untwisted state, the device comprising also the above mentioned assembly of the twisted liquid crystal cell, able to rotate or to switch a linear polarization of light by 90° in a ground state and by 0° in an active untwisted state, as well as the said output component or a film with dichroic loss of light, based on absorption, diffraction, reflection, etc., passing through the said final assembly to the at least one photodetector. The detection of total light transmission difference through the combined device in ground state and excited (untwisted) states of said twisted cells providing information about four key polarization components, along 0°, 90°, +45° and −45°, of the incident radiation with respect to the ground state molecular orientation of the said twisted cell.

The cell with 90° adiabatic rotation of polarization may contain itself a dichroic absorption and be used as the said active liquid crystal element for light to be switched between two different states with different loss mechanisms for two orthogonal linear polarization states.

The combination of the cell with 90° adiabatic rotation of polarization with switchable loss and of a 45° twisted switchable cell enabling also to provide the information about four key polarization components, along 0°, 90°, +45° and −45°, of the incident radiation with respect to the ground state molecular orientation of the said twisted cell.

Depending upon the sensitivity of the detection system used, the transmission of a first polarization of light may be between 0.5% and 5% greater than its transmission of a second orthogonal polarization of light. Such a smaller difference is large enough to be reliably detected by the photodetector while not impeding accurate detection of intensity or $S_0$.

The device may further comprise a calibration light source having a plurality of known polarization states and a control input for selecting the known polarization states, wherein the controller can be connected to the control input of the calibration light source and can be configured to calibrate how the at least one polarization state value characterizing the light is provided by comparing the intensity signal in the different states.

The device may further comprise an adapter for mounting the device to an aperture of a photodetector, such as a camera, a user trigger, an indicator, and a controller connected to the user trigger and providing the control signal and activating the indicator to cycle through the different states and prompt a user of the camera to acquire at least one image in each of the different states.

The device may further comprise at least one photodetector for receiving light passing through the at least one active liquid crystal element and producing an intensity signal, and a controller providing the control signal, receiving the intensity signal and providing at least one polarization state value characterizing the light by comparing the intensity signal in the different states. The controller may determine an intensity value $S_0$ characterizing the light by combining the intensity signal from the different states.

The at least one photodetector may be an image sensor. The controller may comprise an image processor configured to combine images of a scene or object acquired with the at least one active liquid crystal element in different states to improve quality of an image of the scene or object while also providing state of polarization values for the scene or object. By "image sensor", it is to be understood that non-visible wavelength and non-optical array sensors are to be included. For example, infrared sensors, LIDARs, RADARs and other types of antennas may be image sensors.

The device may further comprise a controllable light source connected to the controller to provide controlled lighting, including its color, timing and polarization, to the scene or object.

The at least one active liquid crystal element may have a planar nematic liquid crystal orientation causing light of one polarization to shift in the different states, wherein the image sensor may have active light sensitive pixel areas surrounded by inactive areas, and the image processor may be configured to make use of the shift of light to enhance a resolution of the image of the scene or object to be greater than a resolution of the image sensor. The image processor may be configured to make use of the shift of light to double a horizontal resolution and to double a vertical resolution of the image of the scene or object with respect to a resolution of the image sensor.

Polarization information can be used to characterize material types, object shapes and can be useful in improving driving safety or machine vision by better detection of objects, their edges and/or features on surfaces of objects. Polarization information can also increase contrast of objects or features viewed through transparent surfaces or materials. Accordingly, in some embodiments of the present solution, there is provided a method of manufacturing product involving machine vision. This method can comprise providing the light detection and polarization characterization device as defined above, performing object detection using an image from the image sensor and the at least one polarization state value characterizing the light in the image from the image sensor, and using the object detection in quality control to reject or to release the product.

In one aspect of the present solution there is provided a sandwich-like cell that is filled by a nematic liquid crystal (NLC) mixture with dichroic absorption (that is, different absorption or loss values for two orthogonal PSoLs), further called "switchable dichroic cell" or SDC. The application of an external electric potential difference (further called as tension or voltage) to this cell can change the dichroic absorption of light of extraordinary polarization that is crossing this cell. For example, when the cell is under high tension, then the absorption of light may be almost isotropic (the same value for two orthogonal PSoLs). In contrast, when the cell is in its ground state, then the absorption becomes anisotropic. In the first aspect of the invention, the proposed here cell and method allow to use the difference of light transmission in these two states to calculate the degree of linear polarization (DoLP) of light.

In another aspect of the invention there is provided a combination of one SDC cell with a twisted cell (TC) filled by another NLC mixture without dichroic absorption. The application of an external electric voltage to one or each of these cells can change the dichroic absorption of light that is crossing these cells. The difference of light transmission in different excitation regimes can then be used to calculate the complete PSoL (see hereafter for details).

In another aspect of the invention there is provided a combination of two SDC cells that are filled by an NLC mixture with dichroic absorptions. The application of an external electric voltage to one or each of these cells can change the dichroic absorption of light that is crossing these cells. The difference of light transmission in different excitation regimes can then be used to calculate the complete PSoL (see hereafter for details).

In another aspect of the invention there is provided a method (device and processing algorithm) for making a simple polarimeter device by using the above-mentioned cell or combination of two cells along with a simple power detector (photodetector), controller to trigger electrical signals and a simple algorithm for calculation of the DoLP or PSoL.

In another aspect there is provided a polarimeter that also includes a reference path to take into account the possible rapid intensity fluctuations of input light during the measurement of the DoLP or PSoL.

In another aspect, the same concept is generalized for multiple channel cases both in free space and in the guided wave geometries (fiber, planar or other photonic integrated circuit).

In another aspect, the concept of multiple channel detection is applied to provide an image sensing system enabling the simultaneous recording of the light "intensity" distribution image as well as the distribution (across the image) of the DoLP or PSoL.

In another aspect, various methods are proposed to generate lateral shift of light with the above-mentioned cell or cell assembly that will increase the spatial resolution of optical systems.

In another aspect, combinations of cells are proposed also to perform spatial lateral shifting and phase delay of light to optimize and to increase the spatial and angular resolution of the image sensor or other optical systems.

In another aspect, one of the combinations of cells is proposed also to perform optical image stabilization without mechanical movements.

In other embodiments of the proposed solution, there is provided a device that may have a nematic liquid crystal cell having electrically variable dichroic absorption (or other polarization dependent loss) and a ground state orientation of its axes in a predetermined direction, a light detector, a controller providing electrical signals to the cell and an algorithm, enabling the synchronized excitation of the cell, the detection of changes in the transmitted through the cell light power or intensity, and the determination of the linear polarization components of the incident light with respect to the predetermined direction.

In other embodiments of the proposed solution, there is provided a device having a twisted nematic liquid crystal cell having negligible absorption dichroism and an approximate total molecular rotation angle of 45° in its ground state, and a nematic liquid crystal cell having electrically variable dichroic ab sorption (or other polarization dependent loss) and a ground state orientation of its axes in a predetermined direction, a light detector, a controller providing electrical signals to the cell and an algorithm, enabling the synchronized excitation of the cell, the detection of changes in the transmitted through the cell light power, and the determination of the linear polarization components of the incident light with respect to the direction, the cell having its ground state molecular orientation parallel to the output ground state molecular orientation of the twisted cell and enabling the synchronized excitation of the cells, the detection of changes in the transmitted through the cell-assembly light power, and the determination of polarization Stokes components of the incident light.

In other embodiments of the proposed solution, there is provided a device having a first nematic liquid crystal cell having electrically variable dichroic ab sorption (or other polarization dependent loss) and a ground state orientation of its axes in a predetermined direction, a light detector, a controller providing electrical signals to the cell and an algorithm, enabling the synchronized excitation of the cell, the detection of changes in the transmitted through the cell light power, and the determination of the linear polarization components of the incident light with respect to the direction, and a second similar nematic liquid crystal cell having electrically variable dichroic absorption and a ground state molecular orientation tilted at approximately 45° with respect to the ground state molecular orientation of the first cell, enabling the synchronized excitation of the cells, the detection of changes in the transmitted through the cell-assembly light power, and the determination of polarization Stokes components of the incident light.

The device may also contain a single passive reference arm or an array of passive reference arms of power detection that is synchronized with the controller to detect in parallel (at the same time) the incident light power for each step of measurement of transmitted light power.

The device may be implemented into a guided wave, fiber, or into photonic integrated circuit geometries.

In other embodiments of the proposed solution, there is provided an imaging device having a nematic liquid crystal cell having electrically variable dichroic absorption and a ground state molecular orientation along a predetermined direction, an image sensor, a controller providing electrical signals to the cell, an image recording and processing unit connected to a memory storing executable instructions defining an algorithm enabling the use of the pixels of the image sensor as multichannel detection elements that are synchronized with the controller to enable the recording of the power distribution images transmitted through the cell for each applied voltage and the determination of the linear polarization components of the incident light with respect to the direction for each real or effective pixel of the image sensor.

In other embodiments of the proposed solution, there is provided an imaging device having a twisted nematic liquid crystal cell having negligible absorption dichroism and a total molecular rotation angle of 45°, a nematic liquid crystal cell having electrically variable dichroic absorption and a ground state molecular orientation along a predetermined direction, an image sensor, a controller providing electrical signals to the cell, an image recording and processing unit connected to a memory storing executable instructions defining an algorithm enabling the use of the pixels of the image sensor as multichannel detection elements that are synchronized with the controller to enable the recording of the power distribution images transmitted through the cell for each applied voltage and the determination of the linear polarization components of the incident light with respect to the direction for each real or effective pixel of the image sensor, the nematic liquid crystal cell having electrically variable dichroic absorption with its ground state molecular orientation parallel to the output ground state molecular orientation of the twisted cell and enabling the synchronized excitation of the cells, the detection of changes in the transmitted through the cell-assembly light power, and the determination of polarization Stokes components of the incident light for each real or effective pixel of the image sensor.

In other embodiments of the proposed solution, there is provided an imaging device having a nematic liquid crystal cell having electrically variable dichroic absorption and a ground state molecular orientation along a predetermined direction, an image sensor, a controller providing electrical signals to the cell, an image recording and processing unit connected to a memory storing executable instructions defining an algorithm enabling the use of the pixels of the image sensor as multichannel detection elements that are synchronized with the controller to enable the recording of the power distribution images transmitted through the cell for each applied voltage and the determination of the linear polarization components of the incident light with respect to the direction for each real or effective pixel of the image sensor, the nematic liquid crystal cell having electrically variable dichroic absorption, a second nematic liquid crystal cell having electrically variable dichroic ab sorption and a ground state molecular orientation that is tilted at 45 degrees with respect to the ground state molecular orientation of the nematic liquid crystal cell having electrically variable dichroic absorption and enabling the synchronized excitation of the cells, the detection of changes in the transmitted through the cell-assembly light power, and the determination of polarization Stokes components of the incident light for each real or effective pixel of the image sensor.

The imaging device can be combined with imaging optics, filters, obturators and other elements providing a stand-alone imaging camera.

The imaging device may have local transparent passive zones incorporated into the liquid crystal cells that can be used as reference channels for the detection of the power of the incident light when performing the detection of transmitted power through neighboring active areas.

The imaging device may be used along with artificial illumination devices to expose the objects of interest and to perform so called active polarization discrimination imaging. The the artificial illumination devices may be integrated and capable of generating different types of illumination intensity, wavelength or polarization state that is synchronized and triggered with the controller and with the image processing algorithm. The artificial illumination devices can be coherent and well polarized allowing the detection and calculation of all 4 Stokes parameters, including the last parameter S3.

The liquid crystal cells may be further subjected to variable intermediate voltages to perform lateral shifts of extraordinary light components in at least one direction predetermined by the ground state molecular orientation of one of the cells, and possibly also in a second predetermined direction in the presence of the second cell, along with an algorithm to estimate the shifted light's power by taking into account the separately measured Stokes parameters of light in the neighboring areas, and thus by increasing the spatial resolution of the imaging device.

The imaging device may further comprise an additional assembly of two nematic liquid crystal cells having their ground state molecular orientations that are tilted one with respect to other approximately at 90°, to introduce independent, from the assembly of dichroic cells, electrically variable differential changes between the ordinary and extraordinary polarization modes of light, and thus to increase the spatial and angular resolutions of the image sensor or of the camera by using the Stokes parameter data measured separately in the neighboring areas.

In other embodiments of the proposed solution, there is provided an assembly of two nematic liquid crystal cells having their ground state molecular orientations both being aligned along the same predetermined direction and a half wave plate that is inserted between the two cells with the optical axis of this plate being tilted at 45° with respect to the predetermined direction, enabling the lateral shift of the incident light of arbitrary polarization in the predetermined direction. Two such assemblies which have their the predetermined directions that are oriented at 90° one with respect to the other may be provided, enabling the lateral shift of incident light of arbitrary polarization in the predetermined direction, and in a second direction that is perpendicular to the predetermined direction as well as in a third direction along the diagonal between the first and second directions.

A combination of these devices can be used to introduce independent electrically variable phase shifts and lateral spatial shifts, and thus to increase the spatial and angular resolutions of the image sensor or of the camera without using the Stokes parameter data.

Such devices may be used along with a light projection, emission, or detection system to introduce independent electrically variable lateral spatial shifts, and thus to increase the spatial resolution of the projection, emission, or detection. Such devices may be used along with a fixed sensor and a fixed lens positions within an imaging system to perform image shifting and image stabilization. Such devices may be used along with a movable sensor and a fixed lens positions within an imaging system to perform additional image shifting and image stabilization. Such devices may be used along with a fixed sensor and a movable lens positions within an imaging system to perform additional image shifting and image stabilization. Such devices may be used along with a movable sensor and a movable lens positions within an imaging system to perform additional image shifting and image stabilization.

In other embodiments of the proposed solution, there is provided a polarimetric detection device and method comprising one liquid crystal cell with electrically variable dichroic absorption or dichroic loss, at least one photodetector, a controller, a data recording and processing system implementing an algorithm to provide a first electrical signal to maintain the cell in its ground state and measuring the transmitted total optical power or intensity, provide a second electrical signal to transfer the cell into its strongly excited state and measuring the transmitted total optical power or intensity, and use the obtained transmission data along with preliminary information about the cell's transmission characteristics for the calculation of the linear polarization state of light.

In other embodiments of the proposed solution, there is provided a polarimetric detection device and method comprising one twisted nematic liquid crystal cell with negligible dichroism of absorption or loss and providing capability of dynamically switching the input light polarization into an output polarization between the ground state 45° and excited state 0° in combination with one liquid crystal cell with electrically variable dichroic absorption or dichroic loss, at least one photodetector, a controller, a data recording and processing system implementing an algorithm to provide a first electrical signal to maintain the cell in its ground state and measuring the transmitted total optical power or intensity, provide a second electrical signal to transfer the cell into its strongly excited state and measuring the transmitted total optical power or intensity, and use the obtained transmission data along with preliminary information about the cell's transmission characteristics for the calculation of the linear polarization state of light, the one liquid crystal cell with electrically variable dichroic absorption or dichroic loss being positioned after the twisted cell with its ground state molecular orientation being aligned at 45° in the way that it is parallel with the output orientation of molecules of the twisted cell, at least one photodetector, a controller, a data recording and processing system implementing or following an algorithm providing a first electrical signal to maintain both the cells in their ground state and measuring the transmitted total optical power or intensity, providing a second electrical signal to transfer the dichroic cell into its strongly excited state and measuring the transmitted total optical power or intensity, providing a third electrical signal to transfer the twisted cell into its strongly excited state and bringing the dichroic cell into its ground state orientation and then measuring the transmitted total optical power or intensity, and using the obtained the transmission data along with preliminary information about the cell's transmission characteristics for the calculation of the complete polarization state of light.

In other embodiments of the proposed solution, there is provided a polarimetric detection device and method comprising one liquid crystal cell with electrically variable dichroic absorption or dichroic loss, at least one photodetector, a controller, a data recording and processing system implementing an algorithm to provide a first electrical signal to maintain the cell in its ground state and measuring the transmitted total optical power or intensity, provide a second electrical signal to transfer the cell into its strongly excited state and measuring the transmitted total optical power or intensity, and use the obtained transmission data along with preliminary information about the cell's transmission characteristics for the calculation of the linear polarization state of light, the liquid crystal cell with electrically variable dichroic absorption or dichroic loss positioned with its ground state molecular orientation in a predetermined direction, a second similar cell with electrically variable dichroic absorption or loss with its ground state molecular orientation aligned at 45° with respect to the cell with electrically variable dichroic absorption or dichroic loss, at least one photodetector, a controller, a data recording and processing system implementing or following an algorithm involving providing a first electrical signal to bring both the cells in their strongly excited state and measuring the transmitted total optical power or intensity, providing a second electrical signal to transfer the first dichroic cell into its ground state and measuring the transmitted total optical power or intensity, providing a third electrical signal to transfer the first dichroic cell into its strongly excited state and transferring the second dichroic cell into its ground state cell and measuring the transmitted total optical power or intensity, and using the obtained the transmission data along with preliminary information about the cell's transmission characteristics for the calculation of the complete polarization state of light.

In other embodiments of the proposed solution, there is provided an imaging device and method comprising such a polarimetric detection device and method comprising one liquid crystal cell with electrically variable dichroic absorption or dichroic loss, at least one controller, at least one data recording and processing system implementing or following an algorithm involving providing a first set of predetermined electrical signals of excitation and deexcitation to various liquid crystal cells and detecting the transmitted power or the power distribution image and calculating the polarization state of light as reference, providing another set of predetermined electrical signals of excitation and deexcitation to various liquid crystal cells, generating beam shift and detecting the transmitted power or the power distribution image allowing the calculation of light intensity corresponding to the blind areas of the sensor to increase the spatial resolution of imaging.

In other embodiments of the proposed solution, there is provided a device and method for projecting, emitting, or detecting and recording optical images with enhanced spatial resolution comprising at least one assembly of two liquid crystal cells and a half wave plate, at least one synchronized controller, at least one projecting, emitting, or recording device and implementing or following an algorithm involving providing a predetermined electrical signal of excitation to the cell assembly to generate a first spatial lateral shift of light projection, emission, or recording, providing at least another predetermined electrical signal of excitation to the cell assembly to generate a spatial lateral shift of light projection, emission, or recording in the direction perpendicular to the first the direction, and providing at another predetermined electrical signal of excitation to the cell assembly to generate a spatial lateral shift of light projection, emission, or recording in the direction along the diagonal between the first directions.

In other embodiments of the proposed solution, there is provided an enhanced imaging device comprising an assembly of two nematic liquid crystal cells having their ground state molecular orientations both being aligned along the same predetermined direction and a half wave plate that is inserted between the two cells with the optical axis of this plate being tilted at 45° with respect to the predetermined direction, enabling the lateral shift of the incident light of arbitrary polarization in the predetermined direction, at least an image sensor, at least one movement detection system, at least a controller and processing unit implementing or following an algorithm involving using the information from the movement detection system, providing a set of electrical excitation signals to the assembly and generating dynamic shifts of the image to compensate movements and to perform optical image stabilization function.

In other embodiments of the proposed solution, there is provided an enhanced imaging device and method comprising at least one liquid crystal cell with electrically variable dichroic absorption or loss, at least one additional tunable anisotropic element, at least one image sensor, at least one controller, at least one data recording and processing system implementing or following an algorithm involving providing a first group of predetermined electrical signals of excitation and detecting Stokes parameters for each real or effective pixel of the image sensor, providing at least another predetermined electrical signal of moderate excitation and detecting the transmitted power distribution image, and calculating the power distribution image with an increased spatial lateral and angular resolution taking into account the separate measurement of Stokes parameters for the same input image.

In other embodiments of the proposed solution, there is provided a device that is the combination of one 90 degree twisted nematic liquid crystal cell with negligeable loss and with its director orientation at the exit surface of the cell being oriented in a predetermined direction, e.g., vertical, and an anisotropic absorption or attenuation layer, positioned either inside or outside of the cell, and having its maximal absorption or attenuation axis being in a predetermined, e.g., vertical direction, allowing the calculation of two orthogonal linear polarized components (along vertical and horizontal directions) of input electromagnetic radiation by using the measurements of the total light transmission through the combination in the ground-twisted and excited-untwisted states of the nematic liquid crystal cell.

The anisotropic absorption or attenuation layer may be composed of angularly aligned or angularly bleached dye molecules, carbon nano tubes, oriented graphene layers, conductive stripes, reflective elements, diffractive (wavelength selective) or other resonant structures or metastructures enabling anisotropic, polarization sensitive operation as well as wavelength selective operation when needed. The anisotropic absorption or attenuation layer may be a part of polarization dependent detection system, such as a radar antenna or other type of photodetector.

In other embodiments of the proposed solution, there is provided a device that is a combination of a nematic liquid crystal cell having +45 degree ground-state rotation of its director, the orientation of which at the exit surface of the cell is being oriented in the predetermined, e.g., vertical direction, and the device that is the combination of one 90 degree twisted nematic liquid crystal cell with negligeable loss and with its director orientation at the exit surface of the cell being oriented in a predetermined direction, allowing the same above-mentioned calculation of two orthogonal linear polarized components of input radiation when the +45 degree twisted cell is in the excited-untwisted state by operating the device that is the combination of one 90 degree twisted nematic liquid crystal cell with negligeable loss and with its director orientation at the exit surface of the cell being oriented in a predetermined direction, as well as allowing the detection of input +45 degrees and −45 degrees polarization states of the input light when the +45 degree twisted cell is in the ground state, again by operating the device of claim 30, enabling thus the calculation of Stokes parameters for the input light when both 45 degrees and 90 degrees cells are operated sequentially.

In other embodiments of the proposed solution, there is provided a combination of devices, described above, with a planar oriented nematic liquid crystal (NLC), that is added in front, and used to generate variable differential (relative) phase delay between the ordinary and extraordinary polarization modes of input light, measuring the first three Stokes parameters for different values of the generated phase delay and allowing the measurement of the last Stokes parameter, representing the difference of right and left circular polarization components of input light.

In other embodiments of the proposed solution, there is provided a cell containing circular polarization sensitive liquid crystal, such as blue-phase, cholesteric or twisted nematic, with calibrated transmission and reflection characteristics, combined with one of the above mentioned devices or with a simple photo detector or image sensor pixel to allow the measurement and calculation of the last Stokes parameter S3 even for unpolarized light, representing the difference between right and left circularly polarized components of input light, thanks to the recordings of the transmitted or reflected intensity values for the ground (twisted) and strongly excited (untwisted) states of the cell.

In other embodiments of the proposed solution, there is provided devices described above in which the transparent electrodes of nematic liquid crystal cells are pixelated or segmented (to form effective pixels) allowing their individual activation in laminated or subsequent cells in various synchronized pixel zones or segments and allowing the simultaneous detection of multiple polarization components during a single frame (simultaneously) instead of their sequential detection. Pixelated or segmented (to form effective pixels) and laminated devices may be configured in such a way that the orientations of various effective pixels are "frozen" (permanently fixed in desired states, for example by using polymerized reactive mesogenic molecules or other materials) allowing the simultaneous detection of multiple polarization components without using active control of liquid crystal orientation.

In other embodiments of the proposed solution, there is provided devices as described above where the choice of electrode positions (geometry), electrode materials and the characteristics of nematic liquid crystal or mesogenic cells are optimized to perform the polarization state determination for wavelengths ranging from UV to infrared, gigahertz, terahertz and other wavelengths.

In other embodiments of the proposed solution, there is provided devices described above where the polarization's adiabatic rotation process is replaced by a differential phase shifting process enabling a corresponding polarization transformation, particularly for wavelengths where the adiabatic rotation mode cannot be achieved, such as infrared, gigahertz, terahertz and other wavelengths.

In other embodiments of the proposed solution, there is provided a semi-automatic calibration procedure where the proposed assemblies are integrated with image sensors or cameras or antennas or other types of detectors and a known image of intensity and polarization is recorded allowing the calibration of the entire assembly.

In other embodiments of the proposed solution, there is provided the use of neural network and artificial intelligence algorithms to take into account the calibration data and supervised learning or training tools in view of automatic processing of real-life data-information, obtained during the operation of the system, and based on the user experience, to finally improve and optimize the quality of originally recorded image quality both for the "intensity" images as well as for the calculated "polarization" image in the unsupervised, automatic mode.

In other embodiments of the proposed solution, there is provided the use of noise cancelling or reduction algorithms to improve the quality of "polarization" images and to facilitate their use for material or object classification and recognition.

BRIEF DESCRIPTION OF THE DRAWINGS

The invention will be better understood by way of the following detailed description of embodiments of the invention with reference to the appended drawings, in which:

FIG. 9a schematically shows a version of the proposed Liquid Crystal Dichroism Modulator (LCDM) assembly made by the combination of two dichroic planar oriented NLC cells (with their ground state molecules being oriented at 45° with respect to each other) that contain oriented dichroic species as described in FIG. 8a.

FIG. 16a schematically shows a liquid crystal Tunable Waveplate Assembly (TWA), composed of two planar NLC cells with their ground state molecular orientations arranged at 90° with respect to each other, to perform independent spatial and angular resolution increase when integrated with a Stokes camera.

FIG. 16b schematically shows the TWA device, described in FIG. 16a, when both cells are in their strongly excited states.

FIG. 16c schematically shows the TWA device, described in FIG. 16a, when the first cell is moderately excited, while the second cell is in the ground state.

FIG. 16d schematically shows the TWA device, described in FIG. 16a, when the first cell is in the ground state, while the second cell is moderately excited.

FIG. 16e schematically shows the TWA device, described in FIG. 16a, when both cells are moderately excited.

FIG. 18a schematically shows a Tunable Shifter Assembly (TSA), composed of two identical planar aligned NLC cells and of a broad band half wave plate (HWP), inserted in between and oriented at 45°, the entire assembly enabling the spatial shift of an unpolarized light in the direction of x axis.

FIG. 18b schematically shows the TSA, described in FIG. 18a, when both NLC cells are strongly excited.

FIG. 18c schematically shows the proposed TSA, described in FIG. 18a, when the first NLC cell is moderately excited, while the second NLC cell is in the ground state.

FIG. 18d schematically shows the proposed TSA, described in FIG. 18a, when both NLC cells are moderately excited.

FIG. 22a schematically shows the 3D view of an alternative approach for measuring and then calculating two orthogonal linear polarization components (e.g., vertical and horizontal) of input light by using a separate anisotropic absorption (dichroic) film or detection unit in combination with a cell of an NLC with ground-state 90 degrees rotation of its director n, aligned with the maximal transmission axis of the film.

FIG. 22b schematically shows the side view of the alternative approach, described in FIG. 22a, in the ground (twisted) state of the NLC.

FIG. 22c schematically shows the side view of the alternative approach, described in FIG. 22a, but in the excited (untwisted) state of the NLC.

FIG. 23a schematically shows the 3D view of a 45 degree twisted NLC cell (in its ground state) that is performing a rotation of input +45 degrees and −45 degrees linear polarization components into, respectively, new vertical (x) and new horizontal (y) linear polarization components.

FIG. 23b schematically demonstrates the 3D view of the device, described in FIG. 23a, but in the excited (untwisted) state that does not rotate polarizations.

FIG. 23c schematically demonstrates the 3D view of the combination of two devices that are described in FIG. 22a and in FIG. 23a, in their ground states.

FIG. 24 schematically demonstrates the 3D view of an alternative version of the device, described in FIG. 22a, with the anisotropic absorption layer being integrated inside the NLC cell.

FIG. 25a schematically demonstrates the 3D view of an alternative version of the device, based on the combination of the planar switchable anisotropic (dichroic) absorption NLC cell and the 45 degrees twisted NLC cell, both with segmented and synchronized "effective-pixel" electrodes allowing the simultaneous detection of various polarization components, during a single frame.

FIG. 25b schematically demonstrates the 3D view of an alternative version of the device, based on the combination of a separate anisotropic absorption or detection film and 45 degrees and 90 degrees twisted pure NLC cells with segmented and synchronized electrodes allowing the simultaneous detection of various polarization components, during a single frame.

FIG. 25c schematically demonstrates two examples, A and B, of configuration of effective excitation pixels of consecutive NLC cells of devices described in FIG. 25a or FIG. 25b.

FIG. 25d schematically demonstrates two examples of "filling" of the surface of the device by using effective pixel configurations described in FIG. 25c.

FIG. 26 schematically demonstrates an example of cell assembly which allows measuring the last Stokes parameter that is the difference between right and left circular polarized light intensities.

FIG. 27a schematically demonstrates a liquid crystal cell with periodically twisted (helicoidal) orientation of its director.

FIG. 27b demonstrates transmission coefficients and their dependence upon the wavelength for different circular polarization components of the incident light.

DETAILED DESCRIPTION

There exist several methods to perform the analyses of the PSoL. One of them is the so-called Stokes method that describes the PSoL (e.g., for a wave propagating along the z axis, FIG. 1a) by using the following 4 parameters (H. G. Berry, G. Gabrielse, and A. E. Livingston, Measurement of the Stokes parameters of light, APPLIED OPTICS/Vol. 16, No. 12/December 1977):

$$S_0 \equiv <|E_x|^2> + <|E_y|^2> = I(X) + I(y) \qquad \text{eq. (1a)}$$

$$S_1 \equiv <|E_x|^2> - <|E_y|^2> = I(X) - I(y) \qquad \text{eq. (1b)}$$

$$S_2 = \text{Re}<E_x E_y> = I(+45°) - I(-45°) \qquad \text{eq. (1c)}$$

$$S_3 = \text{Im}<E_x E_y> = I(RHC) - I(LHC) \qquad \text{eq. (1d)}$$

where $E_x$ and $E_y$ are the electric field components along the x and y axes; the sign $<>$ designates the time average; $I(x)$, $I(y)$, $I(+45°)$, and $I(-45°)$ are the intensities of light polarization components along, respectively, x, y, +45° and −45° directions; $I(RHC)$ and $I(LHC)$ are the intensities of right handed circular (RHC) and left handed circular (LHC) polarization components of light. In what follows, we shall use the word "intensity" while keeping in mind that it is the "power" density of light, so, by measuring the power of light (by a common photodetector) and by knowing the active detection area, we can easily calculate the corresponding intensity. That is why these two terms will be interchangeable in our text.

It may be also shown that $$S_0^2 \geq S_1^2 + S_2^2 + S_3^2 \qquad \text{eq.(2)}$$

Figure 2:
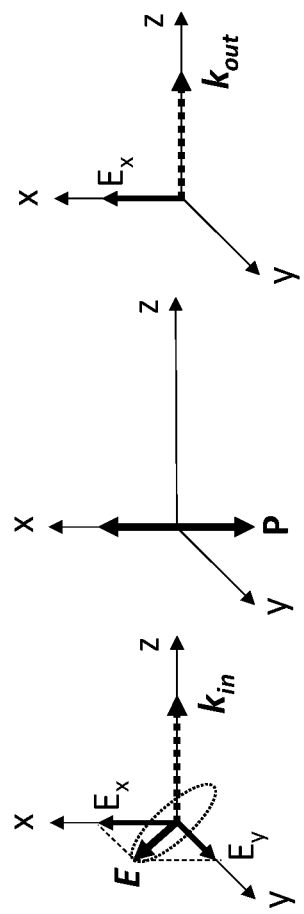
FIG. 2 schematically shows the transformation or filtering of light polarization by means of an ideal linear polarizer.
Figure 3B:
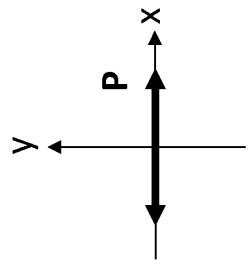
FIG. 3b schematically shows the horizontal orientation of the linear polarizer.
Figure 3D:
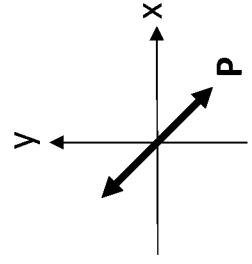
FIG. 3d schematically shows the −45° orientation of the linear polarizer.
Figure 3A:
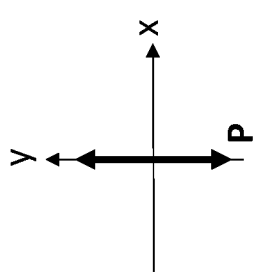
FIG. 3a schematically shows an example of reference orientation (e.g, vertical) of the linear polarizer.
Figure 3C:
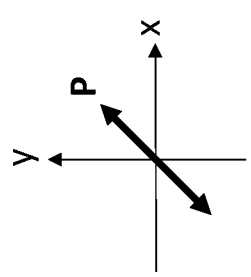
FIG. 3c schematically shows the +45° orientation of the linear polarizer.

The equation above is valid for the general case, including unpolarized light. The equality here is achieved only for completely polarized light. Thus, one possible way, to find the values of $S_0$, $S_1$, $S_2$ and $S_3$, is to use an ideal linear polarizer P that is a device that allows 100% transmission of light polarized along the x axis and 0% transmission of light polarized along the y axis, FIG. 2. Indeed, we can measure the values of $I(x)$, $I(y)$, $I(+45°)$, and $I(-45°)$ by alternatively orienting the polarizer P at 4 different directions and by detecting the corresponding transmitted light intensities (see FIG. 3). We can then calculate the values of $S_0$, $S_1$, and $S_2$ (using eq.1a,b,c) and then, if needed, we can also estimate the value of $S_3$ by using the eq.2. However, this is not applicable to unpolarized or partially polarized light and, in addition, it requires the mechanical rotation of the polarizer P (or a retardation wave plate) that is very lossy, slow, cumbersome, and highly undesired in most photonic applications.

Figure 4:
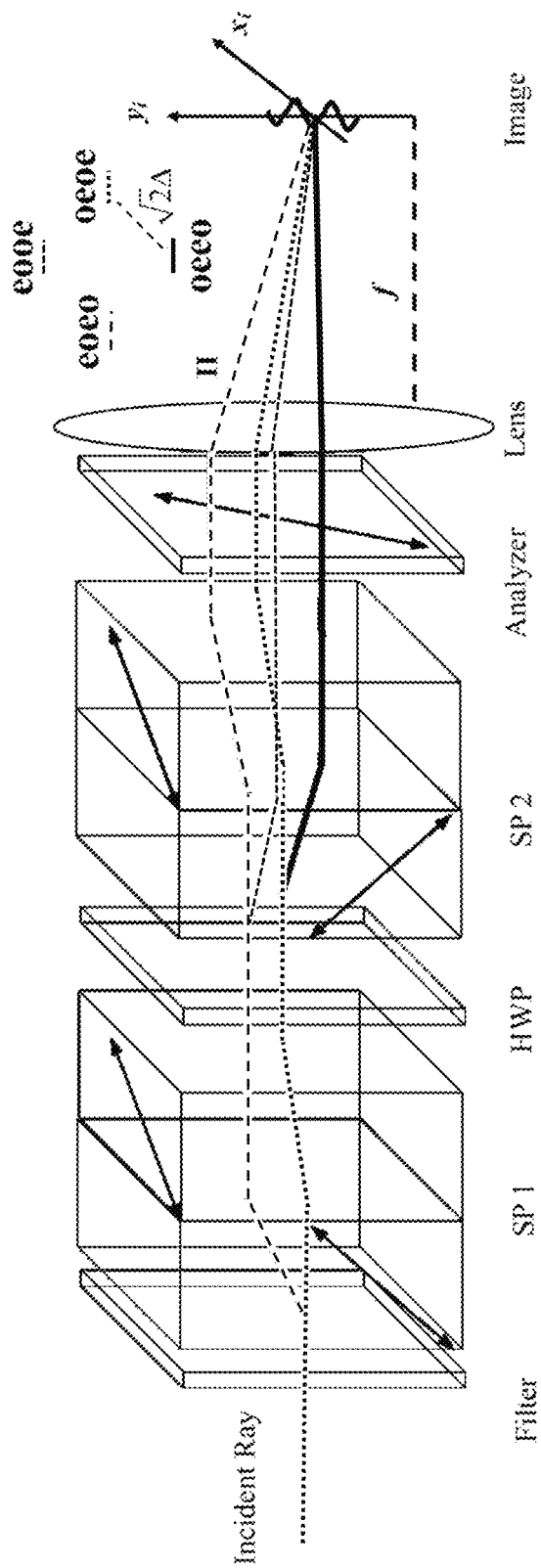
FIG. 4 schematically shows a prior art use of a filter, two anisotropic Savart plates, a half wave plate, an analyzer, and an image sensor to record Stokes parameters.

This is the reason why various efforts were deployed to develop alternative methods of polarization detection without mechanical movements. Among others, one interesting approach (Haitao Luo, Kazuhiko Oka, Edward DeHoog, Michael Kudenov, James Schiewgerling, and Eustace L. Dereniak, Compact and miniature snapshot imaging polarimeter, 20 Aug. 2008/Vol. 47, No. 24/APPLIED OPTICS, see FIG. 4) uses a combination of a spectral filter, two Savart plates (SP1 and SP2), a Half Wave Plate (HWP), an analyzer (polarizer), a lens and an image sensor to record the values of Stokes components without rotating elements. This however is a rather complex and disruptive device that is acceptable for few applications only.

Figure 5:
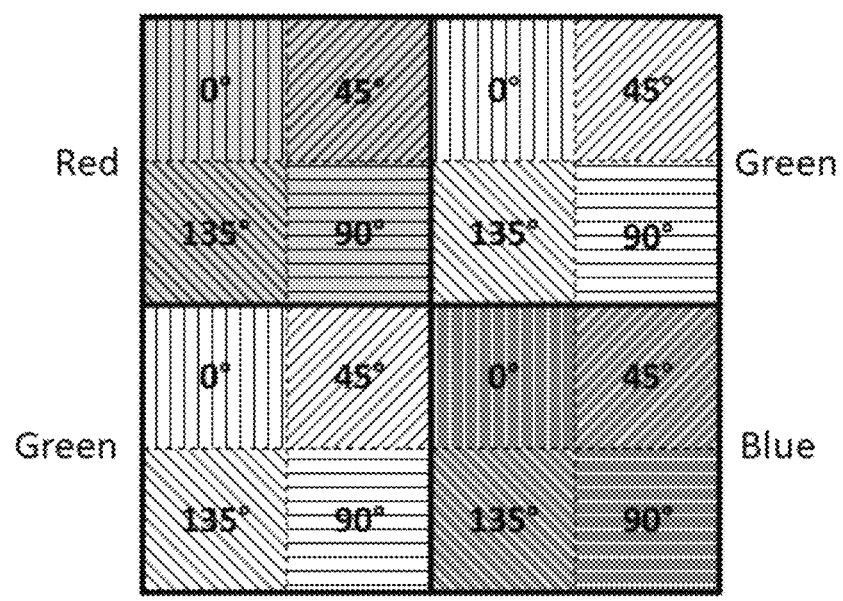
FIG. 5 schematically shows a prior art use of 4 micro polarizers for each image sensor's RGB color pixel that are arranged in 4 orientations.

Another approach (Sijia Wen, Yinqiang Zheng, Feng Lu, Qinping Zhao, Joint Chromatic and Polarimetric Demosaicing via Sparse Coding, arXiv:1912.07308v1 [cs.CV] 16 Dec. 2019, see FIG. 5) is inspired by the rotating polarizer's concept. It uses 4 integrated micro polarizers for each detection channel, even when these channels are very small, such as image sensor's pixels. An example of such directional polarizing filters with RGB Bayer (color) layer structure is shown in the FIG. 5. In this case, the device can be rather thin, however, it suffers from the significant loss of spatial resolution (by a factor of 4) as well as of the dramatic loss of total light efficiency due to the use of polarizers (the light transmission is reduced by more than half for each pixel).

Figure 6B:
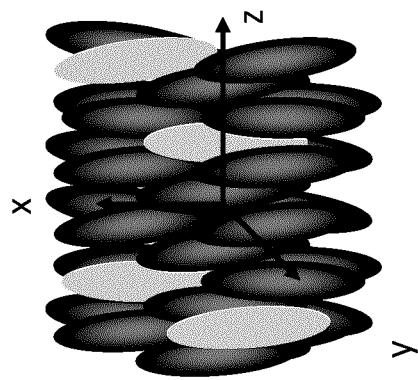
FIG. 6b schematically shows the natural uniaxial orientation (along the x axis) of an NLC containing oriented dichroic absorption species (ellipses with open colors).
Figure 6A:
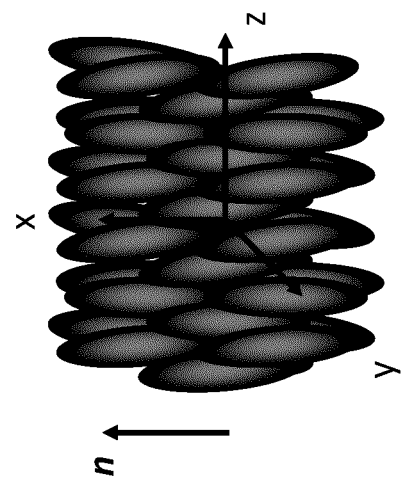
FIG. 6a schematically shows the natural uniaxial orientation (along the x axis) of molecules (dark colored ellipses) of an NLC.

The proposed here invention uses liquid crystals (LCs) to avoid the above-mentioned problems. LCs are liquids that are composed of naturally aligned anisotropic molecules. FIG. 6a schematically shows an example of an NLC where the long axes of its molecules (dark colored ellipses) are aligned along the x axis. The average orientation of these molecules is usually described by a unit vector n, named director (P. G. de Gennes, J. Prost, The Physics of Liquid Crystals, Oxford University Press, 1993). These materials have been intensively studied and shown to be an excellent choice for electrooptic applications. It was also shown that it is possible to introduce into the NLC various species (molecules, nano tubes, nanoparticles, etc.) having anisotropic absorption to obtain a good global orientation of these species by the NLC matrix. This naturally provides a material with macroscopic dichroic absorption (different attenuations for different orthogonal light polarizations). FIG. 6b schematically shows an example of an NLC host that contains few such species (ellipses with open colors) well oriented by the NLC.

Electrically variable dichroic absorption may be created by introducing into the liquid crystalline matrix various species including nano rods, nanotubes, and dye molecules with anisotropic absorption. This last family of dopants has been intensively studied and validated for industrial applications (see Ref. Aleksandr V. Ivashchenko, Dichroic Dyes for Liquid Crystal Displays, Nov. 29, 2017, by CRC Press).

Among others, we can find the following non limiting list of such dyes: Azomethine, Indigoid and Thioindigoid, Merocyanine, Azulenes, Quinophthalonic, Perylene, Phthaloperine, Triphenodioxazines, Quinoxalines, Triazine, Tertrazine, Azo dyes, and Anthraquinone. It will be appreciated that, while good miscibility or dispersion, good alignment (with high orientational order parameter), the thermal and photochemical stability requirements are more general, various molecules may be suitable at various degrees depending upon the target application.

The broadband character of absorption dichroism is also appreciated, but various combinations of dyes may be chosen to shape the spectral characteristics of the mixture and to fit specific applications. Alternatively, the absorption characteristics may be obtained at main wavelengths in a separate measurement and used during the data processing step. Also, while in traditional imaging applications, the visible spectral range is of highest interest, in other applications (such as telecommunication or LIDAR) an operation range in the infrared range may be required and thus corresponding dichroic species must be chosen.

Interestingly enough, the majority of liquid crystals already have dichroic absorption (obviously it depends upon the choice of the working wavelength) and thus there will be no need at all to introduce additional species.

The proposed method can work also if we use materials with electrically variable anisotropic losses that are not originated by absorption. For example, some polymer stabilized liquid crystals can have strong polarization dependent scattering losses. The application of a strong electric field can change this anisotropy. Namely, some materials can have strong anisotropic scattering in the ground state. In this case, the application of the strong electric field can eliminate the anisotropy of scattering. Alternatively, in some compositions, the ground state scattering may be isotropic and the application of a strong electric field can generate anisotropic scattering.

Another possible alternative represents materials with electrically variable anisotropic diffraction or reflection. Namely, when light traverses these materials, it can have polarization dependent diffraction or reflection and thus the transmitted light can exhibit corresponding losses. The application of the electric field can change this situation.

In all these cases, we can use the proposed method with some changes, to find either the linear polarization state or the complete state of polarization.

Figure 7A:
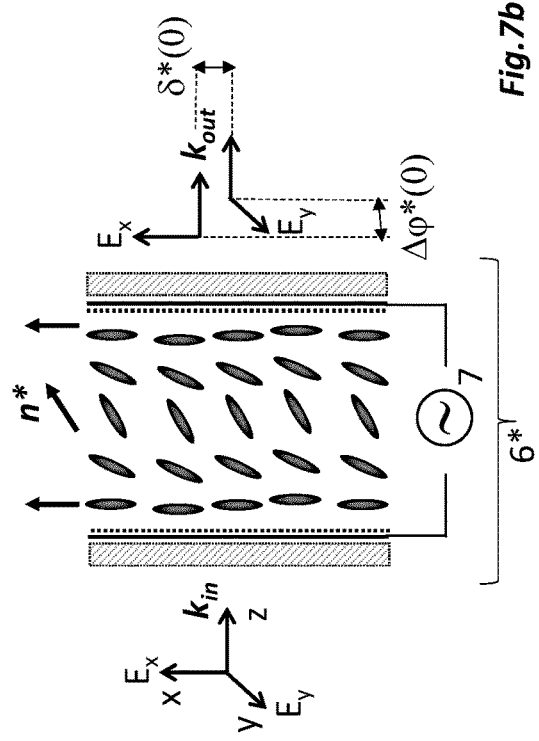
FIG. 7a schematically shows a "planar" aligned NLC cell (with small pretilt angle) in its ground state with a uniform orientation of its molecules (along the x axis), and its influence on light traversing the cell at normal incidence.

The main interest in LC materials was related to their high optical birefringence (anisotropy, $\Delta n$) and to the extreme sensitivity of the orientation of their anisotropy axis (the director n) to the externally applied electric fields. Thus, FIG. 7a schematically shows a non-excited (or "ground-state") planar aligned NLC cell (with a small "pretilt" angle) in the form of a sandwich that is built by using a substrate 2 which is covered by a thin transparent conductive layer 3 (such as indium tin oxide or ITO) that is also covered by another thin layer 4 for the alignment of NLC's molecules (for example, a Polyimide layer that is mechanically rubbed to impose the desired orientation of n, here along the x axis). The second substrate is the same as the first one, but it is rotated in a way to have its coatings 3,4 being inside the cell. Thus, the combination of these two substrates provides a sandwich (or cell) 6 that is built with a specific gap (the separation L between substrates), defining the thickness of the NLC filled in.

Figure 1C:
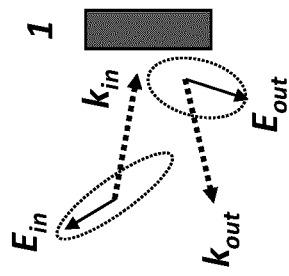
FIG. 1c schematically shows the change of light polarization after reflection from the object 1.
Figure 1B:
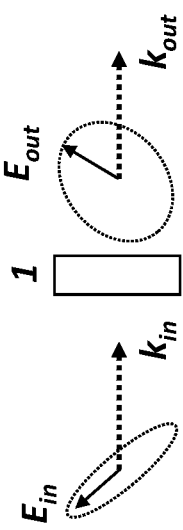
FIG. 1b schematically shows the change of light polarization after traversing the object 1.
Figure 1A:
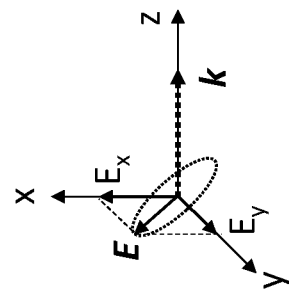
FIG. 1a schematically shows key vectorial parameters of light.

In the ground state (FIG. 7a), this cell exhibits uniaxial anisotropy with strong optical birefringence $\Delta n = n_x - n_y \neq 0$ due to the natural and uniform alignment of the NLC molecules along the preferred direction (here, x). The impact of this birefringence can be simply illustrated if we consider a normal incidence of light ($\alpha = 0°$) on the cell. Indeed, when light propagates along the z axis ($k_{in}$ is parallel to z, FIG. 7a, $\alpha = 0°$), its polarization state can be described by means of the sum of $E_x$ and $E_y$ components of the electric field (FIG. 1a). In this case, two polarization components will behave differently inside the cell; $E_x$ will propagate in the extraordinary mode, while $E_y$ (perpendicular to the drawing plane) will propagate in the ordinary mode. These components will thus emerge from the cell (with $k_{out}$) with a differential phase delay $\Delta\varphi(\alpha=0) = 2\pi L \Delta n / \lambda_0$, where Xo is the wavelength of light in vacuum.

Figure 7B:
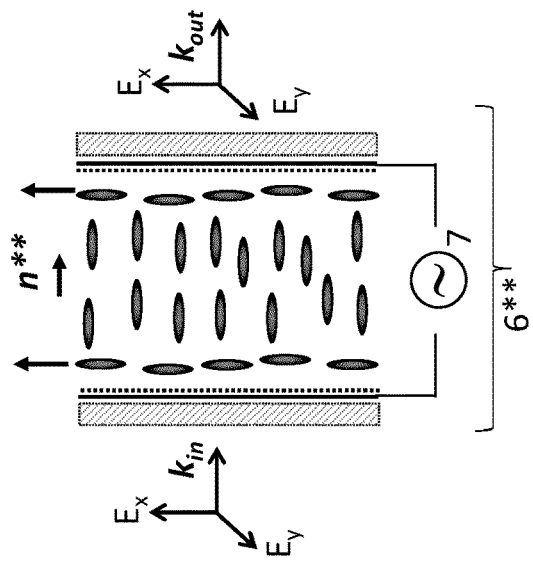
FIG. 7b schematically shows the moderately excited state (above the reorientation threshold tension, but below its saturation) of the cell of FIG. 7a with gradually changing (along the z axis, in the xz plane) orientation of its molecules, and its influence on light traversing the cell at normal incidence.
Figure 7C:
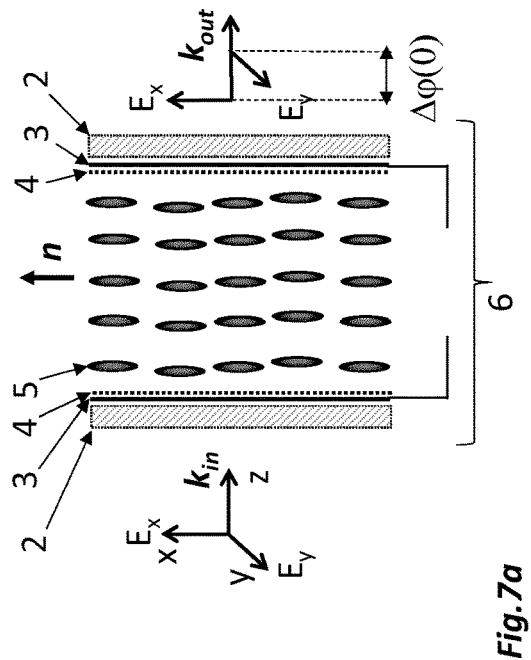
FIG. 7c schematically shows the influence of the same cell, as described in FIG. 7b, on the light traversing the cell at tilted incidence, at an angle α.

When a moderate electric field (higher than a certain threshold value, En) is applied to the cell (e.g., thanks to an electrical voltage source 7, providing a moderate tension $V > V_{th}$), then a gradual reorientation (mainly in the xz plane, FIG. 7b) of molecules is created along the z axis, and, proportionally, the differential phase delay $\Delta\varphi$ is changed (see $\Delta\varphi^*$ versus $\Delta\varphi$). In addition, the extraordinary component $E_x$ may be laterally shifted $\delta^*$ (up or down, depending upon the direction of molecular reorientation and the birefringence of the material). Hereafter, this mode of excitation will be described as "moderate" and with a single star, e.g., as n*. It is worth mentioning that both the $\Delta\varphi^*$ and the $\delta^*$ depend also upon the incidence angle $\alpha$ (FIG. 7c). Typically, for an NLC with positive optical anisotropy, the $\Delta\varphi$ is larger for the normal incidence (FIG. 7b) compared to the tilted incidence (FIG. 7c). There is also a dependence upon the applied voltage and the characteristics of the cell, and all these dependencies can provide very useful functions (see hereafter).

Figure 7D:
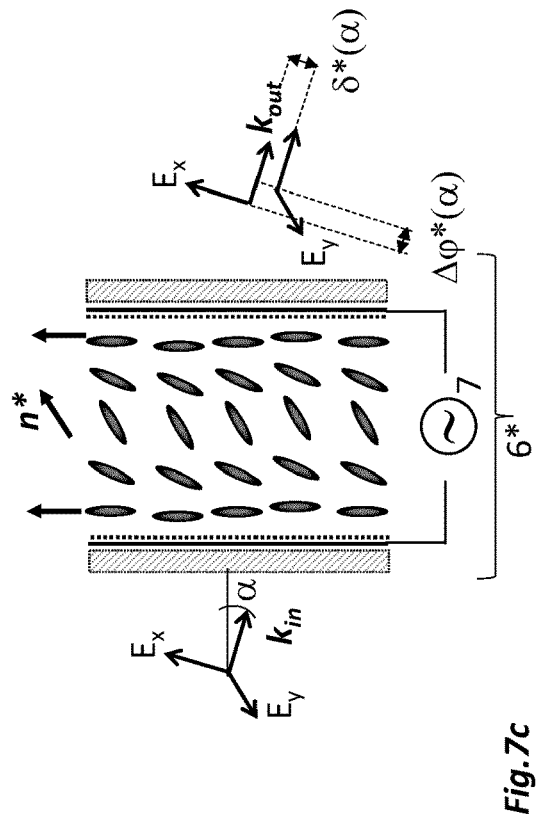
FIG. 7d schematically shows the strongly excited state (well above the threshold tension, in the saturation mode) of the cell of FIG. 7a with abruptly changing (in the xz plane) orientation of its molecules, and its influence on light traversing the cell at normal incidence.

We shall come back to all these phenomena later, but for the moment, we must also consider another regime of excitation that can be important for this invention. This is the regime of strong (or saturated) excitation of the NLC cell when $V \gg V_{th}$. In this case (FIG. 7d), the molecular reorientation is very abrupt, and except a very narrow layer (near to substrates), all molecules become oriented along the z axis. Thus, both $E_x$ and $E_y$ components propagate essentially in the ordinary mode, and, at the output, there is no relative phase delay ($\Delta\varphi^{} \approx 0$) nor spatial shift ($\delta^{} \approx 0$). Hereafter, this mode of excitation will be described as "strong" and will be denoted with a double star, e.g., as n. The value of the corresponding voltage (V) here will be defined by the value of the threshold voltage $V_{th}$ (specific for the material used, etc.). However, the above-mentioned conditions ($\Delta\varphi^{} \approx 0$ and $\delta^{**} \approx 0$) indicate the level of voltages required. In some cases, when the available voltages are not high enough, then the device must be calibrated and used for as high as possible voltages.

Figure 7F:
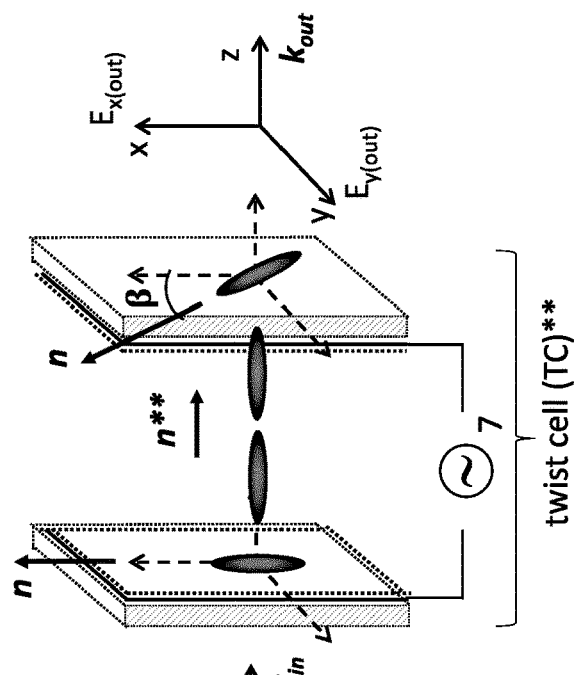
FIG. 7f schematically shows the TC of the FIG. 7e, but in the strongly excited state, and its influence on light traversing the cell at normal incidence, essentially leaving the polarization state of light unchanged.
Figure 7E:
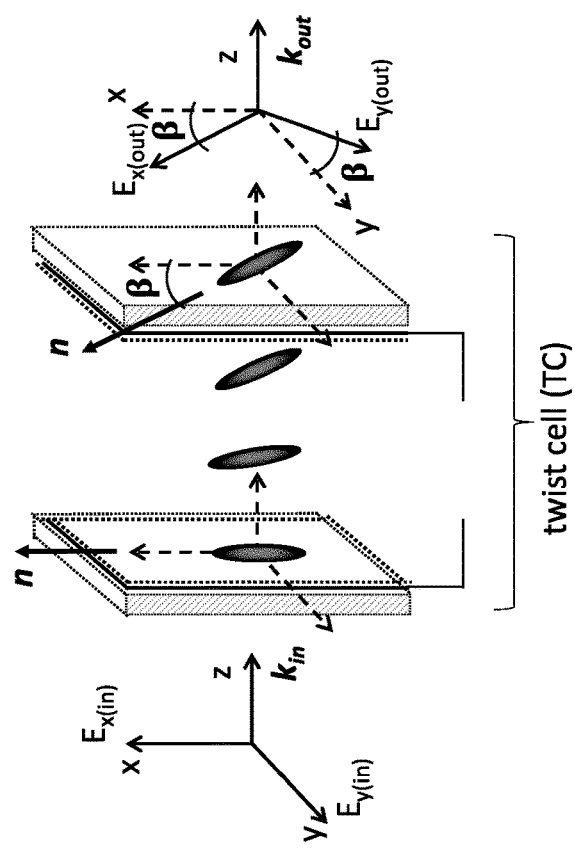
FIG. 7e schematically shows a ground state twisted cell (TC) where the molecular orientation is gradually rotated from the vertical orientation (along the x axis) at the input of the cell up to the angle β at the output of the cell, and its influence on light traversing the cell at normal incidence by essentially rotating its polarization at the same angle β.

Before going further, it will be useful also to describe another type of cell that is well-known in the industry (see FIG. 7e), called twisted cell (TC), where the alignment layers 4 (not shown here) are treated, e.g., mechanically rubbed, in the way to provide a gradual rotation of molecules from the input to the output planes of the cell in its ground state. The corresponding twist angle $\beta$ of the director may be chosen to be, e.g., 45°, 90°, 270° etc., depending upon the target application. If a specific set of physical requirements are satisfied (such as optical birefringence of the NLC, the cell thickness, and the optical wavelength), then the input light polarization components $E_x(in)$ and $E_y(in)$, which are aligned along directions parallel and perpendicular to the orientation of the director n in the input plane of the cell (here, correspondingly along the x and y axes), will be adiabatically rotated upon the propagation of light in the cell. Thus, the corresponding output orientations of these polarization components will be rotated by the same angle $\beta$ with respect to corresponding input components (FIG. 7e).

One of the most important properties of such TCs is that, in the strongly excited state (FIG. 7f), an abrupt molecular reorientation occurs (as explained in FIG. 7d) and the adiabatic polarization rotation is "eliminated". Consequently, the output polarization components remain aligned in the same directions as the corresponding input components. Thus, such TCs can be used, among others, to dynamically switch the output orientation of light polarization between angles 0 and β. FIG. 7f.

The above mentioned two extreme regimes (ground state and strongly excited state) are in the core of the first embodiment of our invention. Namely, let us now consider an NLC cell that exhibits a dichroic absorption either thanks to the natural absorption of its molecules or due to the introduction (into the NLC matrix) of species generating such absorption (FIG. 6b). We shall call this cell as switchable dichroic cell or SDC (FIG. 8a). In this case, still in the ground state of the cell, the two orthogonal polarization components of light will emerge not only with a relative phase delay, but also with amplitudes $E_x$ and $E_y$ (and thus, corresponding intensities, $I_x$ and $I_y$) which are attenuated differently (FIG. 8a). Let us denote the absorption coefficients of the NLC for the x and y components of light polarization, respectively, as αx and αy. The attenuation of light intensity I (measured at the exit of the NLC with the thickness L) can then be described by the following equations:

$$I_x(out)=I_x(in)\exp(\alpha_x L) \& \ I_y(out)=I_y(in)\exp(\alpha_y L) \quad \text{eq.(3)}$$

For the simplicity of the demonstration only, we can use the approximation of small absorption α (in the alternative case, we can simply measure and use cell's transmission coefficients $T_x=I_x(out)/I_x(in)$ and $T_y=T_y(out)/I_y(in)$ to obtain essentially the same results):

$$I(out)=I(in)\exp(\alpha L)\approx I(in)(1+\alpha L) \quad \text{eq.(4)}$$

In this case, still for the ground state (V=0, $\alpha_x \neq \alpha_y$), the output intensities may be described as $$I_x(out)I_x(in)(1+\alpha_x L) \& \ I_y(out)\approx I_y(in)(1+\alpha_y L) \quad \text{eq.(5)}$$

And their addition will be expressed as $$I_{tot}(V=0)I_x(out)+I_y(out)=I_x(in)(1+\alpha_x L)+I_y(in)(1+\alpha_y L) \quad \text{eq.(5)}$$

Figure 8B:
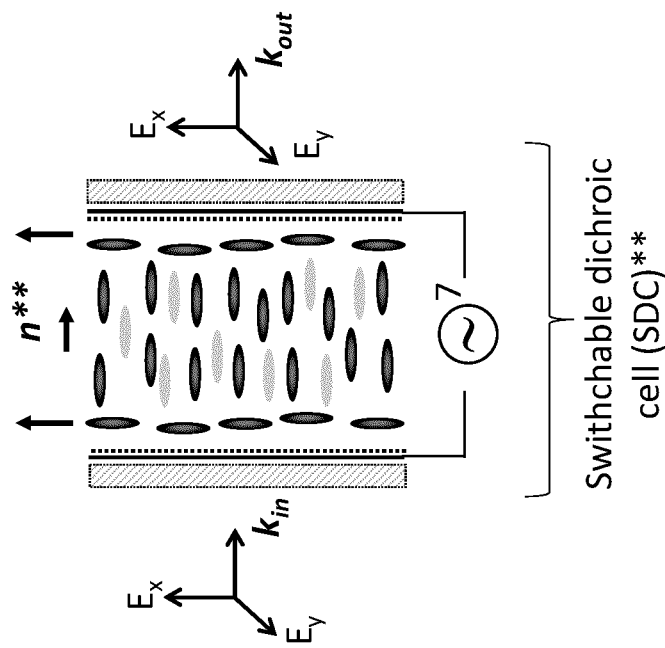
FIG. 8b schematically shows the strongly excited state (well above the threshold tension, in the saturation mode) of the cell of FIG. 8a containing oriented dichroic species that follow the reorientation of NLC molecules, and its influence on light traversing the cell at normal incidence by essentially eliminating the dichroic absorption.
Figure 8A:
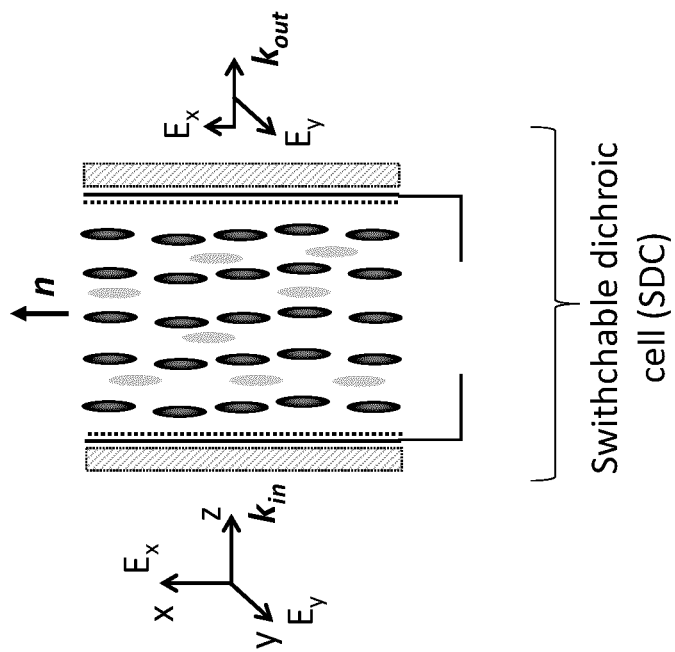
FIG. 8a schematically shows a ground state "planar" uniformly aligned (along the x axis) NLC cell containing oriented dichroic species, and its influence on light traversing the cell at normal incidence by essentially generating dichroic absorption.

In contrast, in the case of the strong excitation of the cell (V>>$V_{th}$), most molecules and dichroic species will be aligned along the z axis (FIG. 8b). We shall thus have $\alpha_x \approx \alpha_y$, and the corresponding output intensities may now be described as $$I_x(out)I_x(in)(1+\alpha_y L) \& \ I_y(out)\approx I_y(in)(1+\alpha_y L) \quad \text{eq.(7)}$$

And their addition will be expressed as $$I_{tot}(V>>V_{th})\approx [I_x(in)+I_y(in)](1+\alpha_y L) \quad \text{eq.(8)}$$

The difference of total intensities, between the ground and strongly excited states, will then be:

$$\Delta I_{tot}\approx I_{tot}(V>>V_{th})-I_{tot}(V=0)= \ldots =I_x(in)L(\alpha_y-\alpha_x) \quad \text{eq.(9)}$$

Thus, by measuring (one after the other, e.g., by using a simple photodetector) the values of $I_{tot}(V>>V_{th})$ and $I_{tot}$ (V=0), and by knowing the value of the multiplier $L(\alpha_y-\alpha_x)$ at the working wavelength (from separate spectral measurements of the cell), we can calculate the value of $I_x(in)$ by using the eq.(9). Then, by using the known values of $\alpha_y L$ (from separate spectral measurements of the cell) and of $I_{tot}(V>>V_{th})$, as well as by using the calculated value of $I_x(in)$, we can also calculate the value of $I_y(in)$ by using the eq.(8).

This method will thus allow us to use a single SDC (FIG. 8a) and to measure the two first parameters of Stokes, $S_0$ and $S_1$ (see, eq. 1a and eq.1b) by simple measurements of the transmitted (through the cell) light power. Thus, the described above cell and procedure can be used to describe the linear polarization state of light or the DoLP. For clarity, in the simplified way, the DoLP is sometimes described as the ratio $R=S_1/S_0$, while the more accurate definition is $$R=(Q^2+U^2)^{0.5}/S_0 \quad \text{eq. (10)}$$

where Q and U are coordinates along two orthogonal axes describing the linear polarization plane on the Poincare sphere. In what follows, we shall not specify the method used and will simply refer on this as DoLP.

One of the most important advantages of the proposed method is the absence of necessity of disrupting light or attenuating it dramatically during the measurement. The light overall attenuation may be very low (e.g., less than 10%), and the optical dichroism of the cell must be just high enough (few percent) to be detectable by the system used. There are many applications, for example, in polarizing microscopy, where a linear polarized light is injected into a material and it is required to know what is the DoLP at the output of the material. The described above cell and procedure will be enough to address this particular need.

Figure 8D:
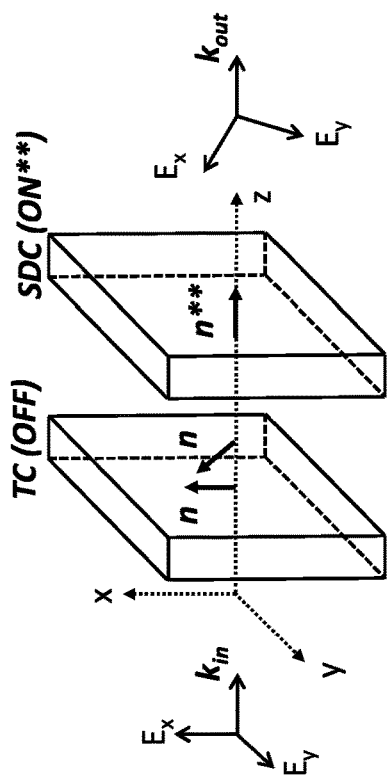
FIG. 8d schematically shows the combination of two cells, described in FIG. 8c, when the TC is in the ground state, while the SDC is in the strongly excited state, and the influence of this assembly on light traversing it at normal incidence, essentially rotating the angle of input polarization by 45° and by eliminating the dichroic absorption.
Figure 8C:
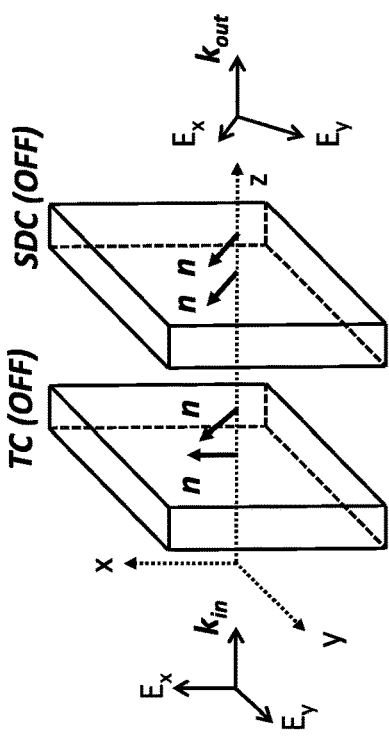
FIG. 8c schematically shows a combination of two cells, one TC, described in FIG. 7e, with its molecules aligned along the x axis at its input plane and aligned at β=45° at its output plane, and one uniform SDC, described in FIG. 8a, with its ground state molecular orientation tilted at 45°, and the influence of this assembly on light traversing it at normal incidence, essentially rotating the angle of input polarization by 45° and introducing dichroic absorption.

However, the above-mentioned method will not allow the detection of all Stokes parameters. For example, it will not distinguish a circular polarized light from a linear polarized light with its E field that is oriented at 45°. To perform more complete characterization of the PSoL, we must consider another device that is composed of two cells (FIG. 8c), the first one being a TC (as described in FIG. 7e) with its ground-state director aligned vertically (along the x axis) at its input plane and with its director aligned at 45° at its output plane (β=45°). The second cell is the SDC, described in FIG. 8a, with its ground state director that is everywhere aligned at 45° (FIG. 8c). In the ground state of this assembly, as explained before, the input polarization component $E_x$ will adiabatically rotate inside the TC (with a total rotation of 45°) and will enter into the SDC as an extraordinary polarization component. It will then emerge from the SDC without further orientational changes and with an attenuation corresponding to the extraordinary mode, as described above.

In this state, the measurement of the total transmitted (through the assembly) light intensity will correspond to the above-mentioned value of $L_{tot\_1}=I_{tot}(V=0)$ for the input light polarization components, aligned along x and y axes (as in FIG. 8a), keeping in mind that the losses of the TC are either negligible or at least isotropic (non dichroic).

Then we can apply a strong excitation only to the SDC (FIG. 8d), while still keeping the TC in its ground state. In this state, the measurement of the total transmitted (through the assembly) light intensity will correspond to the above-mentioned value of $I_{tot\_2}=I_{tot}(V>>V_{th})$, as in FIG. 8b, again, keeping in mind that the losses of the TC are either negligible or at least isotropic. Thus, we can calculate the values of $S_0$ and $S_1$ by using these two measurements, exactly as in the procedure described above for the single SDC (FIG. 8a and FIG. 8b).

Figure 8E:
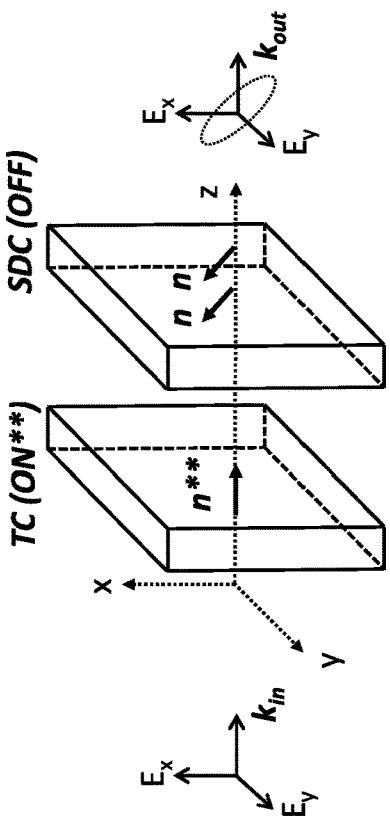
FIG. 8e schematically shows the combination of two cells, described in FIG. 8c, when the TC is in the strongly excited state, while the SDC is in the ground state, and its influence on light traversing the assembly at normal incidence, essentially by changing the polarization of input light and by exhibiting dichroic absorption.

However, we can also use an additional mode of operation for the above-mentioned assembly by further bringing the SDC to its ground state (FIG. 8e), while applying a strong excitation only to the TC. The transition of the SDC to its ground state may be natural (just removing the excitation) or, alternatively, we can impose a forced "relaxation" (to accelerate the transition to the ground state) if we use a, so-called, "dual frequency" NLC. As explained in FIG. 7f, this transition will eliminate the polarization rotation in the TC. In this state, the measurement of the total transmitted (through the assembly) light intensity will correspond to the above-mentioned value of $I_{tot\_3} = I_{tot\_45}(V=0)$, but for the input light polarizations that are rotated by 45° with respect to those defined by x and y axes of the FIG. 8a. That is, the SDC's optical axis being aligned at 45°, the extraordinary and ordinary polarization modes of light inside the SDC are now rotated at 45° with respect to the previous case, when the TC was in its ground state. Consequently, the measurement of $I_{tot\_3}$, relative to the $I_{tot\_2}$ will allow us calculating also the parameter $S_2$. We can do this since the switch of the TC between the ground state and the strongly excited state does not change the transmission intensity through the TC. Thus, with the obtained values of $S_0$, $S_1$ and $S_2$, we can also calculate the value of $S_3$ as explained above (by using the eq.2). The described above assembly and procedure will thus allow obtaining all 4 Stokes parameters.

In another embodiment, we can also obtain the PSoL if we consider another device that is composed of two SDCs (FIG. 9a) with their ground state molecular orientations n being aligned at 45° with respect to each other. For example, the molecules of the Cell 1 are oriented along the x axis, while the molecules of the Cell2 are oriented at 45° with respect to the x axis. Obviously, in the ground state of this device (no voltages are applied to cells, $V_1=V_2=0$), the transmitted light will undergo some polarization change and some attenuation (FIG. 9a), as explained above. However, in this state, we shall not be measuring the polarization state of light.

As a first step, we can strongly excite both cells (FIG. 9b) by applying high voltages to them, $V_1 >> V_{th}$ and $V_2 >> V_{th}$. The polarization change and anisotropic attenuation will be almost eliminated in this state. Then, we can make the first "reference" measurement of the total transmitted light intensity $I_{tot}(V >> V_{th})$.

Figure 9B:
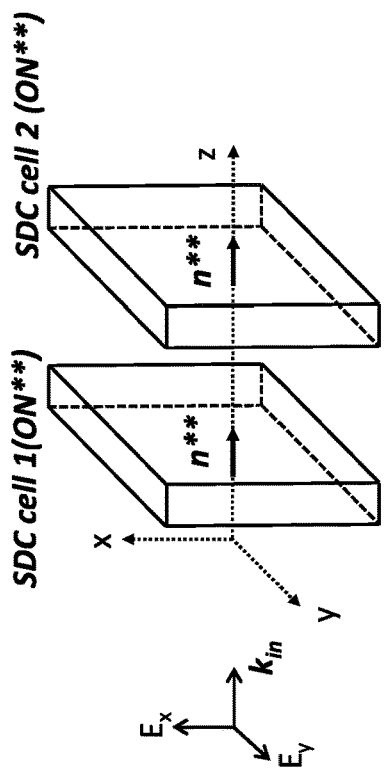
FIG. 9b schematically shows the LCDM assembly, described in FIG. 9a, in the strongly excited state of both NLC cells to be used as reference state.
Figure 9D:
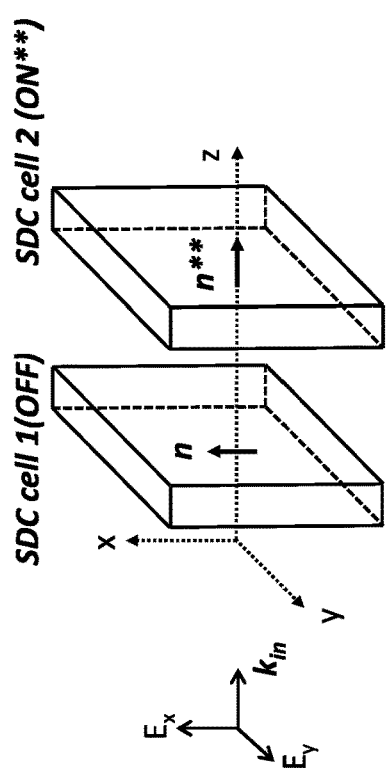
FIG. 9d schematically shows the LCDM assembly, described in FIG. 9a, when the "second" cell is strongly excited, while the "first" cell is in the ground state.

Then, we can remove the excitation from the Cell2 (FIG. 9c) and let it relax to the ground state. Alternatively, we can impose a forced "relaxation" (to accelerate the transition to the ground state) if we use a, so-called, "dual frequency" NLC. At the same time, the Cell 1 must still be kept under strong excitation, otherwise, a residual polarization change, and corresponding measurement error may be created. Then, we can make the second measurement of the total transmitted light intensity $I_{tot,Cell2}(V=0)$. This will allow us calculating the value of the Stokes parameter $S_2$ (see eq.1c).

Then, we can strongly excite the Cell2 and bring the Cell1 to its ground state (FIG. 9d) and make the final third measurement of the total transmitted light intensity $I_{tot,Cell1}(V=0)$. This will allow finding the values of Stokes parameter $S_0$ and $S_1$. Finally, we can calculate the value of $S_3$ as explained above (by using the eq.2) to obtain all 4 Stokes parameters for coherent (completely polarized) light.

All above mentioned approaches (FIG. 8a, FIG. 8c and FIG. 9a) are based on the dynamic modulation of the dichroism of at least one of the cells of the assembly of cells. That is the reason why we could call them as liquid crystal dichroism modulators (LCDMs). Hereafter we shall use the name "LCDM" as a non-limiting example of proposed modulators to be used in various configurations.

The stored digital information about the PSoL may be easily used for various purposes, such as LIDARs, autonomous driving, etc. However, the visual displaying of some of obtained results (for example, the parameters $S_1$, $S_2$, $S_3$ or their combinations) on a screen may be challenging since they may be negative for specific pixels. In this case, an offset value can be attributed, or different grey levels or color coding can be used to differentiate them (positive versus negative values) for visual representation and use, for example in art photography, surgery, dermatology, etc.

The advantages of this approach are numerous. First, we can measure the PSoL (all Stokes parameters) by using a very simple and low-cost component (the assembly of two above mentioned cells can cost less than 1$ for a 2 mm×2 mm component in high volume). Second, the measurement may be performed extremely quickly (typical switching times for thin NLC cells may be at the order of a couple of milliseconds only; and, if needed, the use of a dual frequency NLC may allow reaching sub millisecond times). Finally, the measurement is performed without interrupting the light path and without mechanical movement.

Figure 9C:
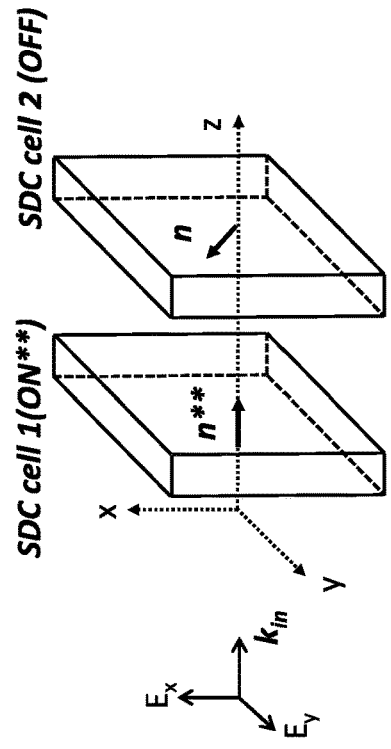
FIG. 9c schematically shows the LCDM assembly, described in FIG. 9a, when the "first" cell is strongly excited, while the "second" cell is in the ground state.
Figure 10A:
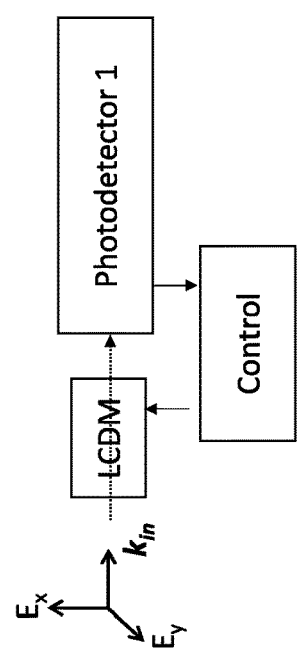
FIG. 10a schematically shows one of the proposed dichroic cell assemblies (here and after, by the example of the LCDM), combined with a detection system and an electrical control unit to synchronize the excitation signals (applied to the LCDM) and the detection of transmission and to perform a calculation.

The measurement method also is very simple, requiring only a controller and a photodetector 1 (see FIG. 10a): the intensity of the transmitted light, detected (with the photodetector 1) in the strongly excited state (FIG. 9b) is the first (reference) data. Then, we use the controller to switch the cell 2 into its ground state (FIG. 9c) and to record (in a synchronized way) the second transmitted intensity value, and finally we switch the cell 2 to the strongly excited state and we switch the cell 1 into its ground state (FIG. 9d) and we record (in a synchronized way) the third value. Thus, with only three measurements (which can be done, within 10 milliseconds or less) we can find all Stokes parameters of light. As can be understood, the control unit or controller can provide the control signal to the LCDM and receive the intensity signal from the photodetector or photodetectors (or image sensor). The controller then provides at least one polarization state value as an output (not shown in FIG. 10a) that characterizes the light by comparing the intensity signal in different states and it also provides an intensity measurement value by combining the intensity signal from the different states. It will be appreciated that the controller can be provided by suitable logic circuitry that can perform the calculations or by a suitable data processor associated with instruction memory for executing instructions that will perform the calculations, for example according to applicable image processing algorithms in the case of an image sensor for the photodetector. Such algorithms can include image enhancement by color coding or the like or by marking up or tracing over images to identify edges or material types based on the polarization of reflected light from object surfaces. In object recognition, object models can include state of polarization of light components.

Figure 10B:
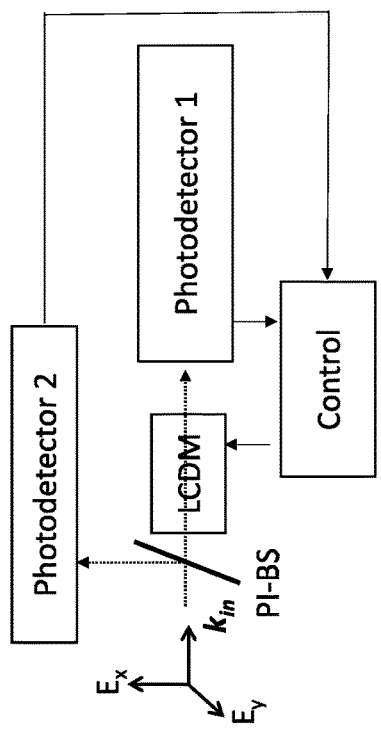
FIG. 10b schematically shows the LCDM, described in FIG. 10a, with an additional reference detection arm for the case of very fast fluctuations of input light intensity.

In the case, if during the recording of these three values, the intensity of incident light fluctuates significantly, then we can also use a reference arm (FIG. 10b). Indeed, the incident light may be split into two arms, e.g., by using a polarization independent beam splitter (PI-BS) and the second beam can be detected by a reference photodetector 2. The data obtained by the photodetector 1 may then be "calibrated" by the data of the photodetector 2 to take into account the fluctuations of the input light intensity.

Figure 10C:
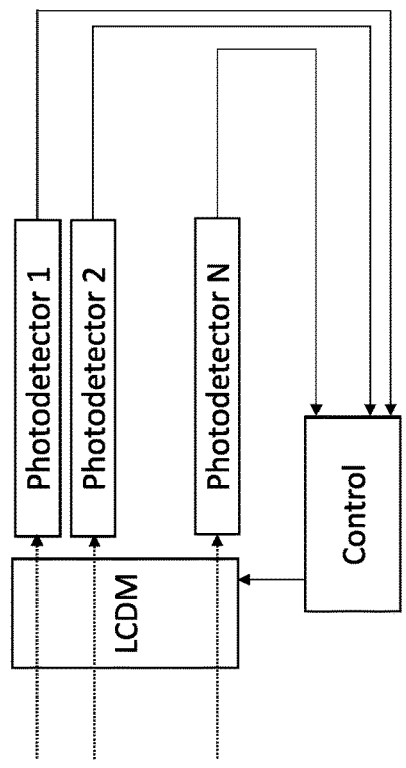
FIG. 10c schematically shows the use of a single (uniform) LCDM combination, described in FIG. 10a, along with an array of synchronized detectors.
Figure 10D:
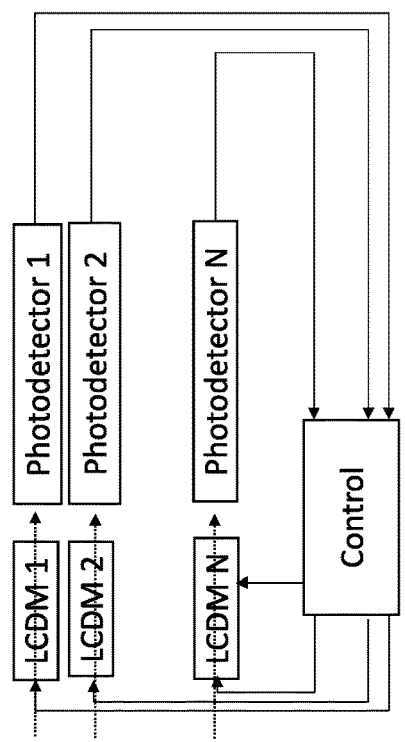
FIG. 10d schematically shows the use of multiple LCDM combinations, as the one described in FIG. 10a, along with an array of synchronized detectors.

The proposed LCDM device may have large enough surface to be positioned in front of multiple photodetectors and be used for multiple channels simultaneously (FIG. 10c). However, if preferred, the same LCDM device can be also segmented in a way to allow the individual control of each segment (FIG. 10d). In this way, each channel may be processed independently.

Figure 10E:
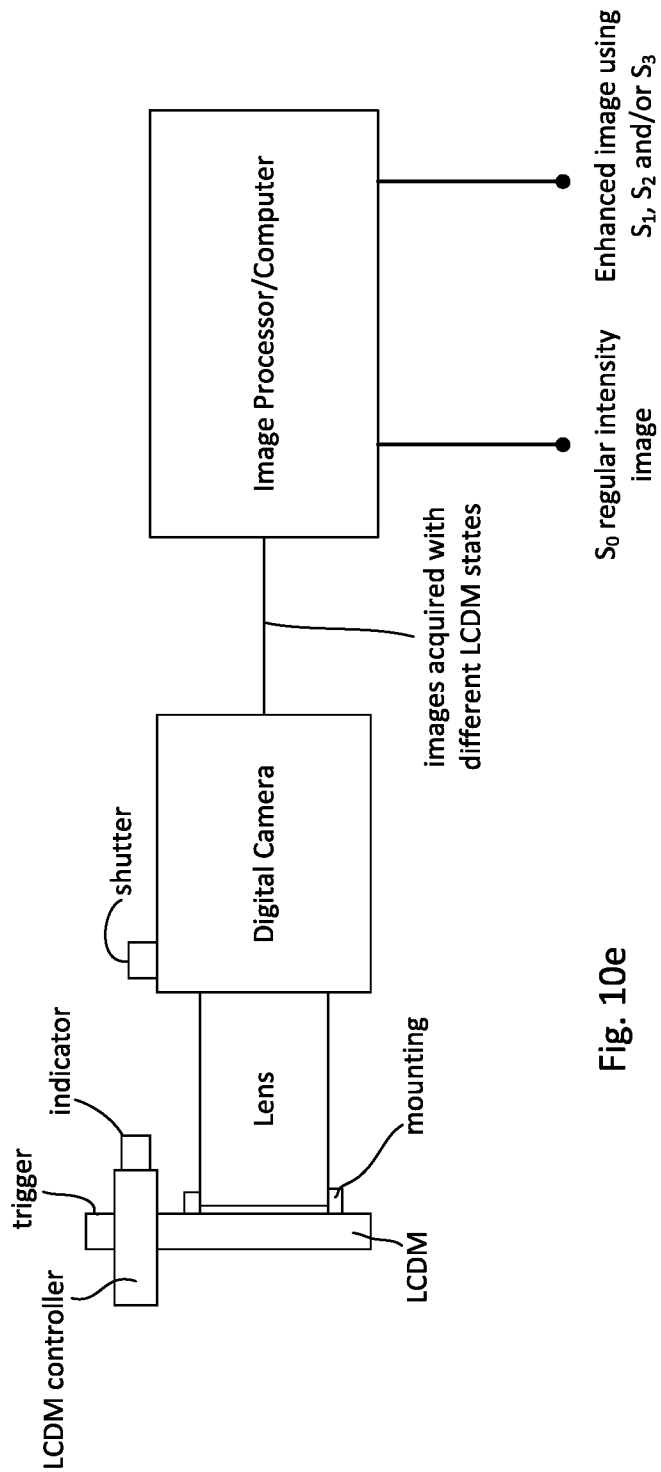
FIG. 10e schematically shows an LCDM as an attachment to a camera to be used with a separate image processor.

In the embodiment of FIG. 10e, the LCDM is provided as an attachment for mounting to a standard SLR camera lens or to any other camera type. Since the LCDM control is not integrated with the image acquisition control, the LCDM controller is a local controller that responds to a user trigger to begin cycling the LCDM through its various states while prompting the user using the indicator to use the camera to acquire images at each of the various states. The indicator can be acoustic or visual. When the cycle is complete, the indicator may provide a distinctive indication to inform the user that the cycle is complete. The acquired images can be transferred to a computer or image processor to resolve one or more polarization parameters $S_1$, $S_2$ and/or $S_3$. The image processing is performed as described herein. One or more of the acquired images can be used to provide a regular intensity image $S_0$. Images that are based on a combination of $S_0$ and one or more polarization parameters $S_1$, $S_2$ and/or $S_3$ can be prepared for the user or used in a machine vision system.

Figure 11:
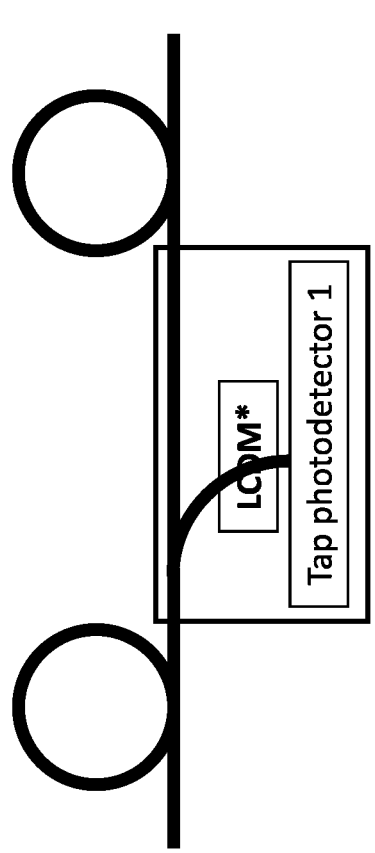
FIG. 11a schematically shows an application of the LCDM combination by using the evanescent field of light in an optical waveguide.
FIG. 11b schematically shows an application of the LCDM and its controller in a fiber optic device using an external end-detector that is synchronized with the LCDM's controller.
FIG. 11c schematically shows an application of the LCDM and its controller in a fiber optic device using an integrated synchronized detector.
FIG. 11d schematically shows an application of the LCDM and its controller that are integrated in a synchronized fiber optic "tap" detector.
FIG. 11e schematically shows the LCDM device, described in FIG. 11d, along with an additional reference "tap" detector.
Figure 11:
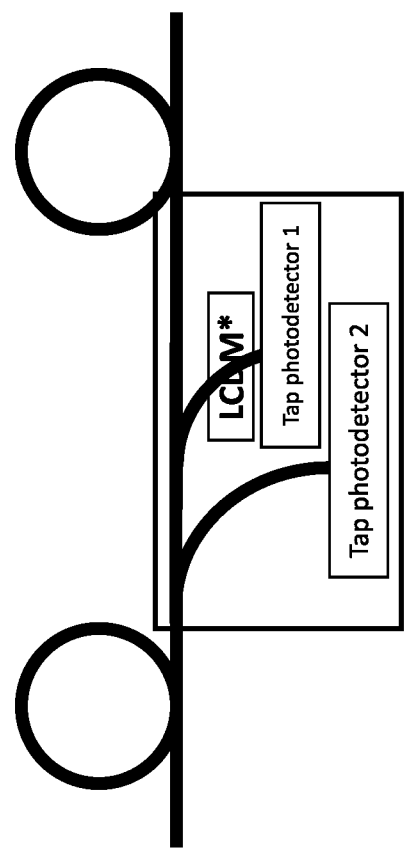

In contrast to the above-mentioned "free-space" applications, the LCDM device may be also used in the guided wave geometry to detect Stokes parameters of light propagating in the fiber (FIG. 11) or in other waveguiding devices, such as integrated photonic circuits.

In one possible application, the LCDM device and its controller (or its driver, farther called LCDM*) may be incorporated in the zone where the evanescent field of the guided light is present (FIG. 11a) to perform the above-mentioned measurements by using the evanescent field of the guided light.

In another possible application, the LCDM* device may be simply incorporated between two guiding ends 8 and 9 (FIG. 11b). Standard collimation (10) and focusing (11) optical elements can be used to reduce optical losses between two guide ends. The photodetector can be remote (at the right) but synchronized with the controller of the LCDM*. Alternatively, the photodetector can be integrated into the MCDM* module (FIG. 11c) by using a beam splitter 12. The proposed approach may be also easily integrated into a guiding circuit with an integrated "tap detector" with a photodetector 1 (FIG. 11d). Finally, to take into account the possible presence of rapid intensity fluctuations, a reference tap detector (with the photodetector 2) may also be used along with the LCDM* module in a synchronized way (FIG. 11c).

In another embodiment, the LCDM device can be used in combination with an image sensor or within an imaging system, preferably in the immediate proximity to the image sensor or in an imaging system that projects the output plane of the LCDM on the image sensor. If the image sensor is monochromatic (e.g., black and white), then it will be preferable to use dichroic species that are broadband and have approximately the same absorption coefficients ($\alpha_x$ & $\alpha_y$) and the same absorption dichroism ($\alpha_x$-$\alpha_y$) at the entire range of wavelengths used. In the opposite case, when the image sensor has color filters, the data corresponding to each color pixel may be processed by taking into account the absorption coefficients of NLC cells (measured separately) at the corresponding wavelengths.

Figure 12:
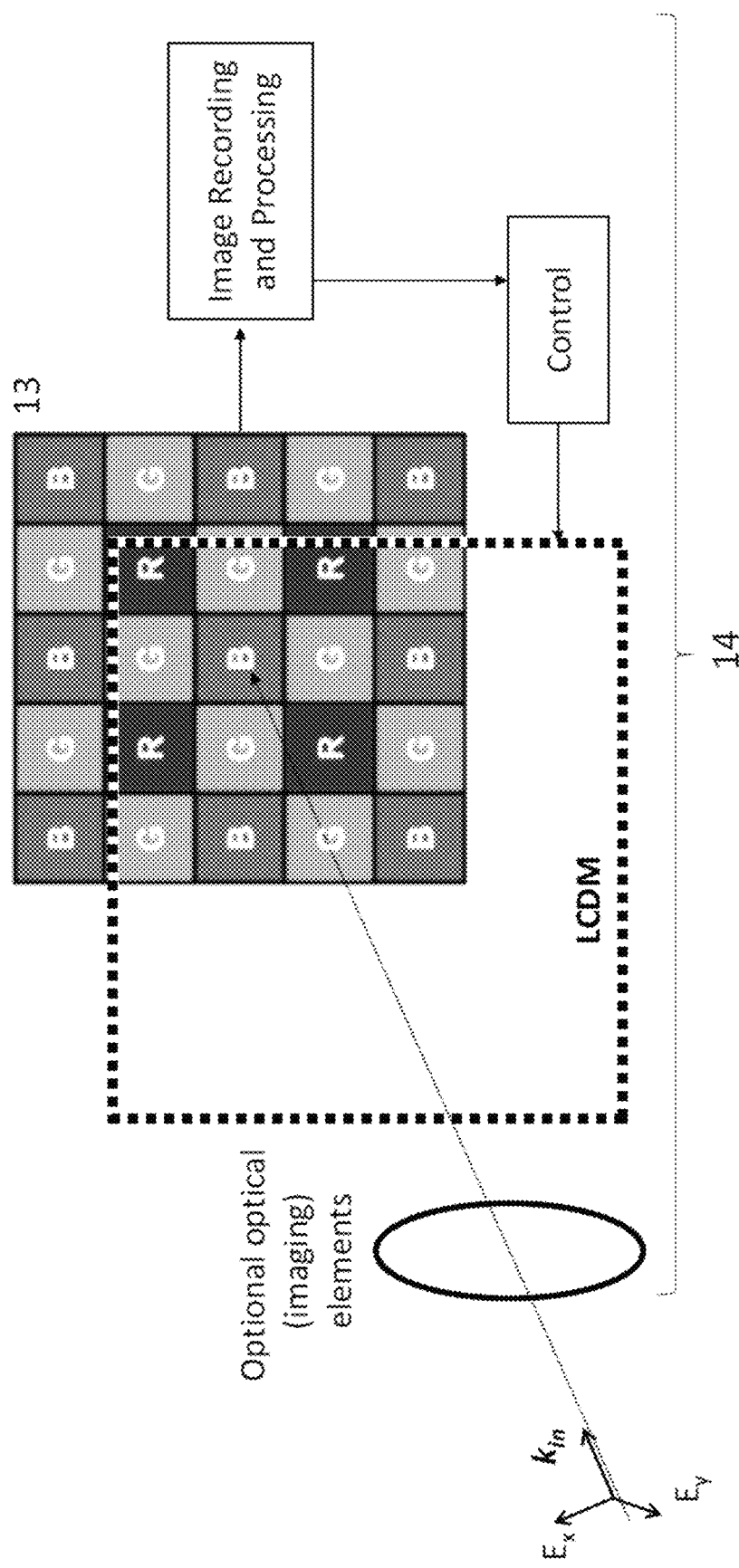
FIG. 12a schematically shows an application of the LCDM, in proximity to an image sensor, to enable obtaining additional information about the DoLP or PSoL across the image plane.
FIG. 12b schematically shows an application of the LCDM as an "add-on" device in a polarization sensitive camera.
Figure 12:
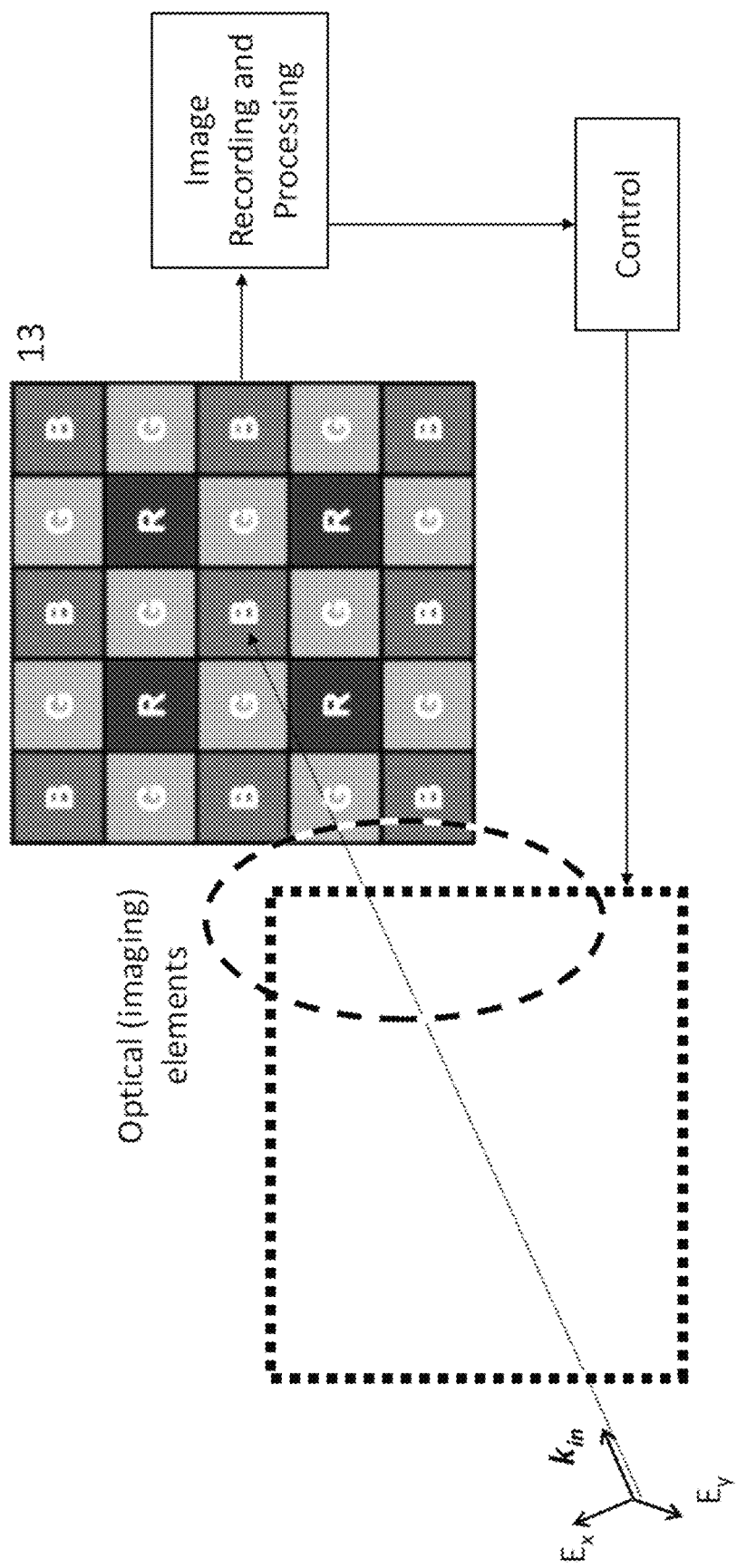

FIG. 12a schematically shows such an application of the LCDM that is integrated or in the proximity with an image sensor 13, having, for example, Bayer's pattern of color filters. It is worth mentioning that the position of the LCDM in such a pixelated (multichannel) detection system is important. The LCDM may be integrated with the image sensor to form a stand-alone combined product. Alternatively, it may be positioned in a plane, the image of which is formed on the image sensor. Finally, the LCDM, its controller and battery can be also simply added on the top of an existing imaging system, FIG. 12b. In this last case, it can provide qualitative information rather than precise quantitative information about the PSoL per pixel. In all above-mentioned embodiments, the lateral positioning of the LCDM is not critical since it is uniform in the lateral plane.

The detection method for the combined device 14 may be the same as described above. Most importantly, the imaging process does not need to be interrupted when performing polarization measurements. When needed, the controller can send the sequence of electrical control signals to switch the cells of the LCDM from the ground state (FIG. 9a) to the excited state (FIG. 9b) and to record the first data (in the image recording and processing unit), then to switch to the first half-excited state (FIG. 9c) and record the second data, and finally, to switch to the final half-excited state (FIG. 9d) and to record the third data. This will allow to find Stokes parameters for all pixels, taking into account the absorption coefficients for each color pixel, measured for the proposed dichroic cells in advance by using a standard spectroscopic device.

Figure 9A:
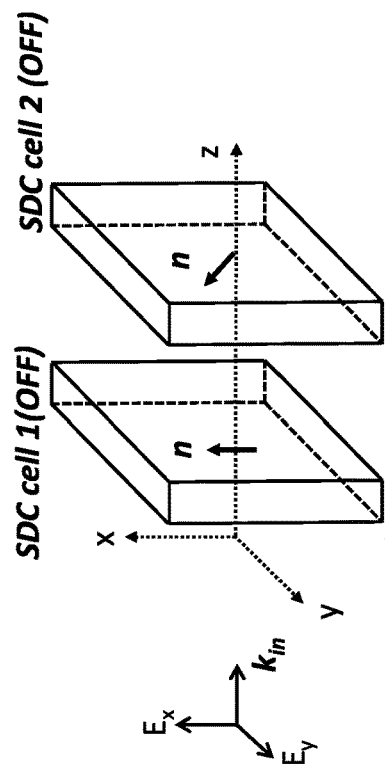

If the power consumption is not an issue, then the usual operation mode of the imaging device can be the described-above "strongly excited" state of the LCDM (FIG. 9b) instead of the ground state (FIG. 9a). In this way the "normal" image recorded in this mode can be used as a reference and thus only two "additional" measurements will be required to generate the polarization distribution image.

Interestingly, if the dichroism of the cells is chosen to be significant, then the transition, between the ground state (FIG. 9a) and various excited states (FIG. 9b,c,d) can also be used to obtain a partial attenuation of light ("dimming") for input light that might be too intense.

Thus, such an imaging system (e.g., a camera) will record not only the intensity and color distribution, but also the Stokes parameters of input light. This is the reason why we can name it as Stokes Imaging Camera (SIC). Since all the basic data (see eq.1) are available, then the "images" (transversal distributions) of various polarization components may be created. In addition, some critical combinations (subtractions or additions or their ratio) of these polarization components may be also created. For example, we can illuminate the scene with a specific light polarization (e.g., circular right) and then we can create the "image" of the ratio $S_3/S_0$, which can be used to distinguish man-made and natural materials with morphological differences that can change the PSoL differently either in transmission or reflection modes. Many applications, such as art-photography, LIDAR, autonomous driving (e.g., by distinguishing the iced road from the normal one), robotics, medicine, polarization microscopy, etc. may benefit from such a device.

Figure 13B:
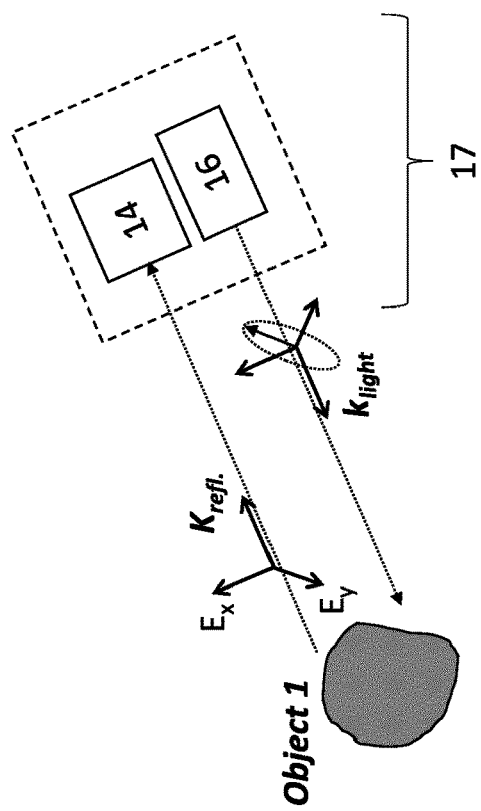
FIG. 13b schematically shows an application of the proposed device, described in FIG. 12, that is operating in the "active" imaging mode with a possibly triggered, synchronized, and polarized light source.
Figure 13A:
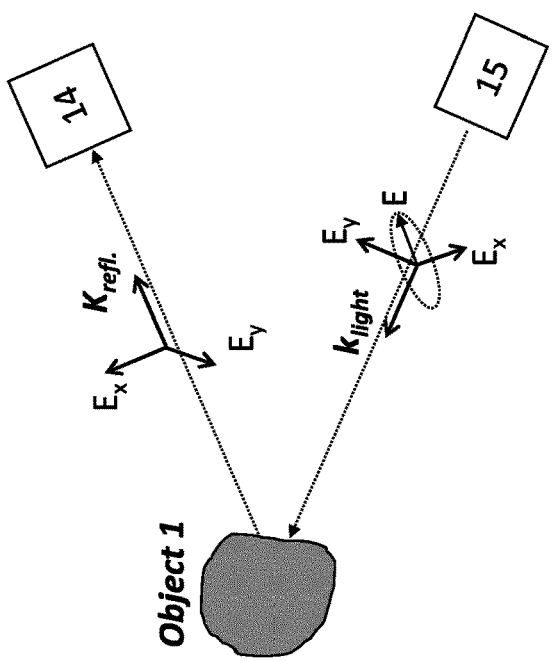
FIG. 13a schematically shows an application of the proposed device, described in FIG. 12, that is operating in the "passive" imaging mode.

In one possible embodiment, the proposed device and method can be used in the passive imaging mode, where the recorded light (reflected or emitted by objects) is not controlled by the imaging system (FIG. 13a). In the case of emission, this may be of thermal origin or be a fluorescence light generated by various excitation mechanisms. This type of emission is usually non polarized, but it may become partially polarized after traversing some specific objects or after being reflected from objects at various angles. The reflection or the retro diffusion light may be generated by a natural or artificial illumination source 15, which, in one preferable case, may be polarized.

In another embodiment, the proposed device 14 and method can be used in an active imaging mode, where the recorded light (reflected or emitted by objects) is generated by a light source 16 that is controlled and synchronized by the imaging system 17 (FIG. 13b). In this case, the illumination pulse and recording process can be triggered (synchronized) to generate a higher contrast with various combinations of "polarization images" for various types of illumination polarizations. For example, the object can be first illuminated by a pulse with circular right polarization and then with circular left polarization, along with the synchronized recording of corresponding Stoke parameters for each illumination polarization. Such a SIC with integrated illumination (SICII) 17 can help to dramatically increase the discrimination and the resolution of the polarization imaging system.

Figure 14:
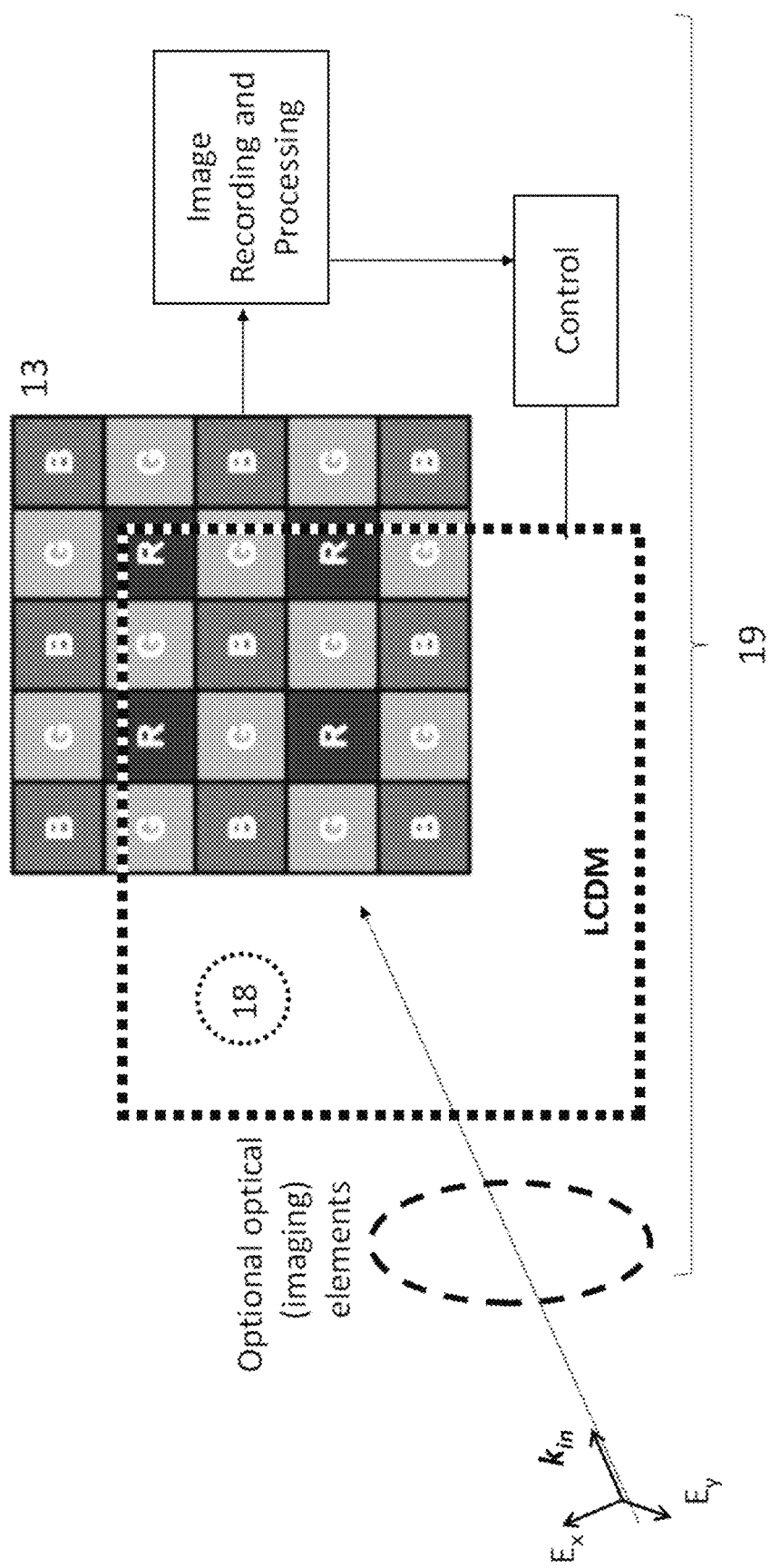
FIG. 14a schematically shows an application of the LCDM in proximity to an image sensor, including transparent "passive zones" to be linked with respect to detection pixels and to be used as reference channels to calculate the DoLP or PSoL across the image plane.
FIG. 14b schematically shows an application of the LCDM as an "add-on" device in a polarization sensitive camera, including transparent "passive zones" to be linked with respect to detection pixels and to be used as reference channels.
Figure 14:
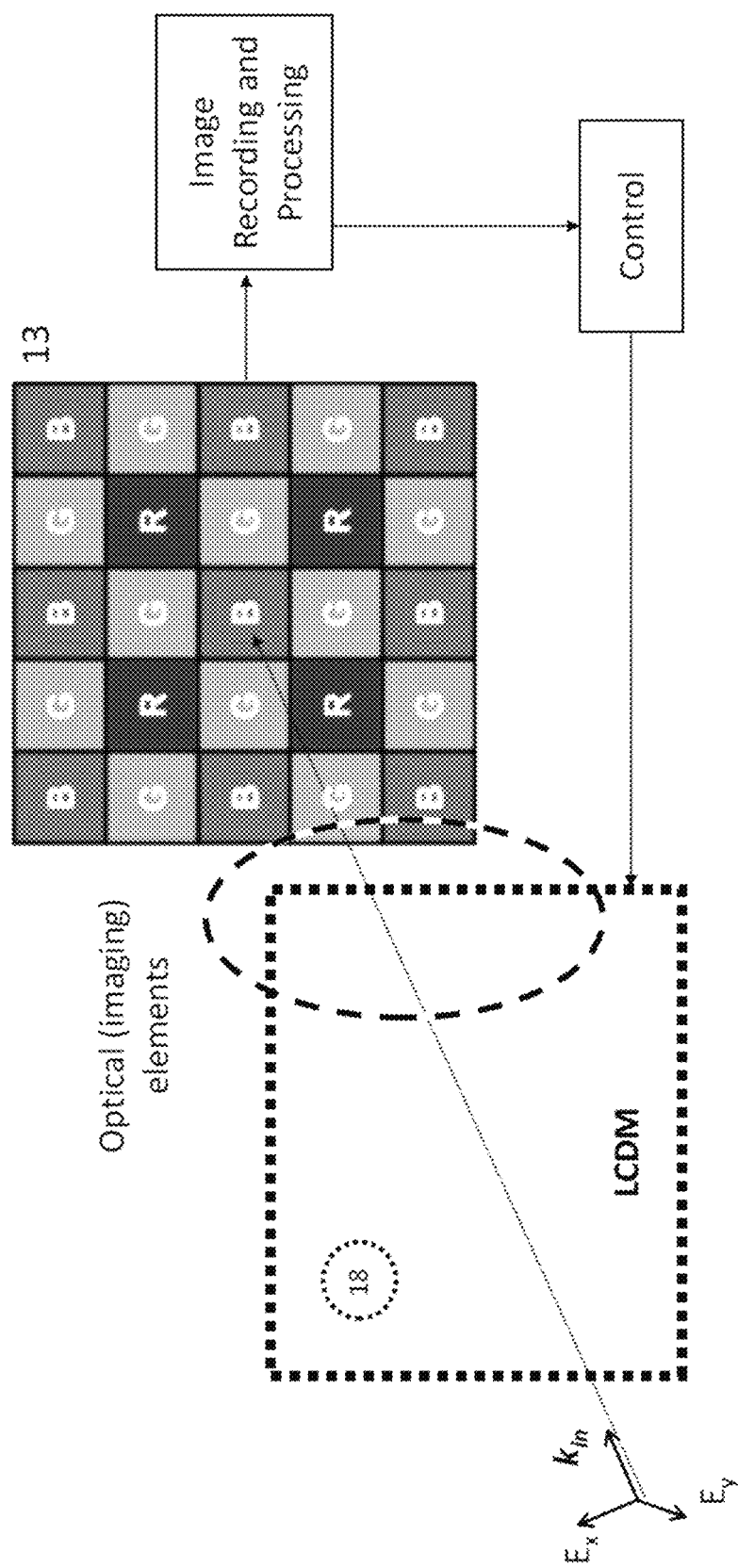

In the case when the intensity of the input signal may change quickly, the proposed LCDM may contain passive transparent areas 18 (FIG. 14), e.g., made of plastic or glass. The transmission of light through these areas will not change when we switch the LCDM from the ground state to various excited states. Thus, the detected intensity value (for the light transmitted through these passive areas 18) can be used to calibrate the measurements through neighboring (active) areas to reduce the influence of fluctuations of the incident light intensity. Such a device 19 will provide more accurate polarization data. However, the areas 18 must be identified and digitally linked to specific pixels or pixel areas of the image sensor 13. This may be done, during the manufacturing of the stand-alone device (when integrating the LCDM with an image sensor, see FIG. 14*a*) or in a post-assembly calibration step.

Alternatively, the LCDM may be positioned in a plane, the image of which is formed on the image sensor. In this case, the post-assembly calibration step can be used. In all above-mentioned embodiments, the lateral positioning of the LCDM is critical since it is not uniform in the lateral plane (due to the presence of multiple areas 18).

In contrast, the LCDM, its controller and battery can be also simply added on the top (input plane) of an existing imaging system, FIG. 14*b*. In this last case, the device can provide qualitative information rather than precise quantitative information about the PSoL per pixel. However, in all above-mentioned embodiments, the synchronization of the LCDM's operation with the image acquisition should be preferably ensured to obtain adequate information enabling polarization sensitivity or discrimination.

Figure 15:
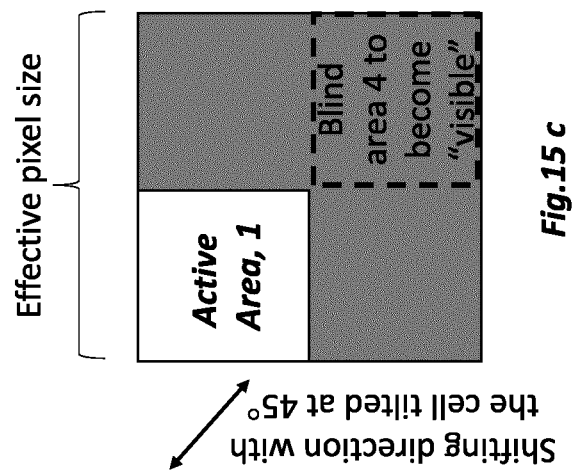
FIG. 15a schematically shows the problem of the loss of spatial resolution in pixelated devices.
FIG. 15b schematically shows an application of the LCDM to increase the spatial resolution of the system by shifting vertically the incident extraordinary polarization component of light by using the moderate mode of excitation of the first NLC cell (with vertical ground state orientation of molecules).
FIG. 15c schematically shows an application of the LCDM to increase the spatial resolution of the system by shifting diagonally the extraordinary polarization component of light by using the moderate mode of excitation of the second NLC cell (with its ground state molecular orientation tilted at 45 degrees).
Figure 15:
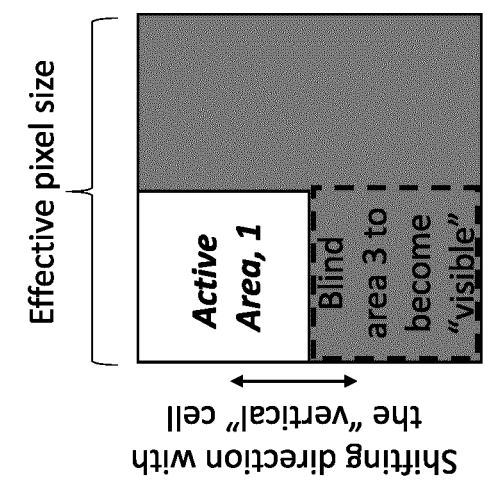
Figure 15:
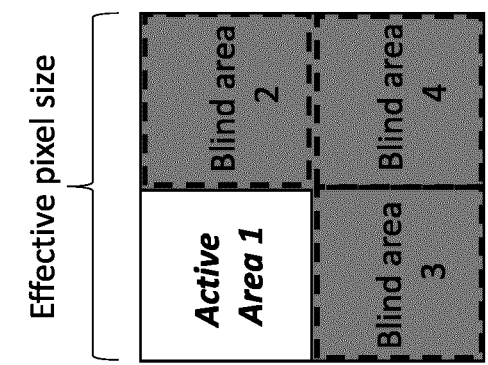

In another embodiment, the LCDM may be also used to increase the spatial resolution of the image sensor or an optical imaging system via the well-known technique of pixel or sub-pixel shifting (FIG. 15*a*). Usually, the effective area of a pixel may include an optically active area 1 and also some blind or shielded areas 2, 3 and 4. The LCDM can be also used to reduce the impact of these blind areas. Namely, as we have already mentioned, if the applied voltage is not too high, then we can also obtain an intermediate (moderate) state of excitation (above the threshold but below the reorientation saturation, shown in FIG. 7*b*). This, among others, will deliberately generate a transversal (lateral) shift δ* of the extraordinary polarization component of light in the moderately excited NLC cell. This shift will be in the plane of ground state orientation of the director for this cell. Thus, the lateral shift will be in the direction of x axis (in the plane xz) for the moderate activation of the Cell 1 (see FIG. 7*b* and FIG. 9). FIG. 15*b* schematically shows such a vertical shift. FIG. 15*c* schematically shows the case of the shift in the direction along the diagonal when the Cell2 is moderately excited (FIG. 9). Namely, the FIG. 9*b* schematically shows the strongly excited state when two orthogonal polarization components of the field ($E_x$ and $E_y$) do not undergo neither relative phase delay nor a spatial shift (Δφ=0, δ=0, see FIG. 7*d* or FIG. 8*b*) at the output of the LCDM. In the case when there is no shift, the active area 1 (FIG. 15*a*) may be used to record the image, while the blind areas 2,3 and 4 will not be used (so, light, directed to these areas, will be lost). Then, when the Cell1 is only moderately excited, then the extraordinary polarized beam will be shifted vertically and the same active areal may now be used for light that was previously directed to the blind area 3 (FIG. 15*b*). When the Cell1 is again highly excited but the Cell2 is only moderately excited, then the beam is shifted by diagonal and the same active areal may now be used to detect light that was previously directed to the blind area 4 (FIG. 15*c*). In this way, the spatial resolution of the camera may be multiplied by approximately 3.

However, the described-above shifting will occur only for the extraordinary polarization mode of light in each cell. That is why, we must know, at least approximately, the polarization state of light in that area or in the neighboring areas to estimate which part of light's intensity was shifted. This is the reason why we must combine this "shifting-imaging" with the measurement of Stokes parameters (described above) in the neighboring active areal to make this evaluation. Indeed, by knowing Stokes parameters of light, detected by the active area 1, we can estimate the part of the "extraordinary polarized" light that will be shifted to the active areal from the neighboring blind zones. Thus, we can reconstruct the images computationally.

Figure 17:
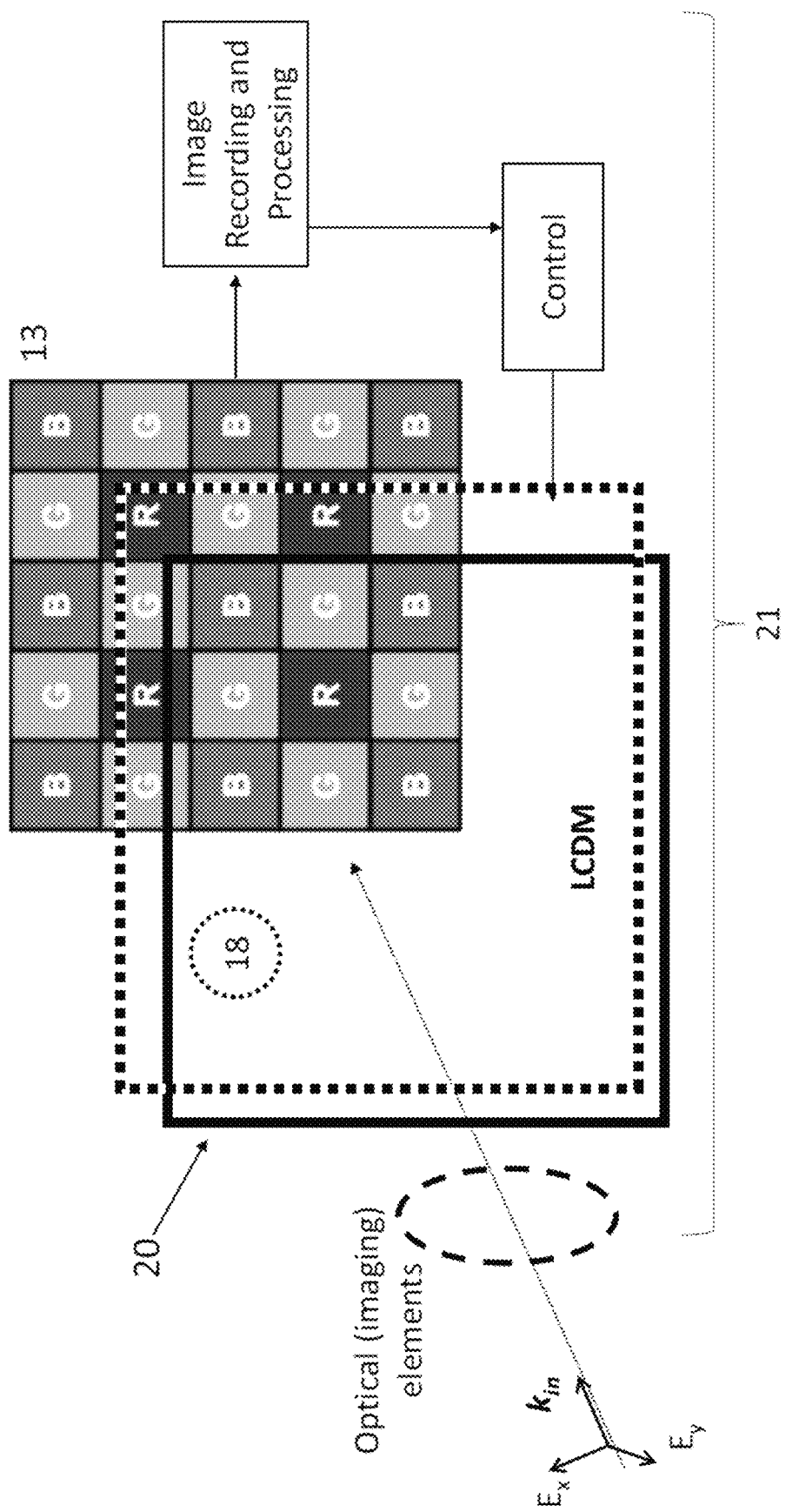
FIG. 17 schematically shows an application of the LCDM and the TWA devices in combination with an image sensor or an imaging system, to perform independent polarization measurement and spatial and angular resolution increase.

The shifting value here (for the resolution increase) may be a trade-off with respect to the switching speed (e.g., for the LCDM's operation). The thickness L of the NLC is one of the key parameters defining both the switching speed and the shifting value (along with other parameters, such as the anisotropy and the voltage applied). Higher is the value of L larger can be the shift, but slower will be the switching time. To resolve this problem, we can "decouple" two functions by considering the use of a separate additional cell (such as described in FIG. 7*a*) or a combination 20 of two such cells that are preferably oriented at 90° (FIG. 16). We could call it as a Tunable Waveplate Assembly (TWA) 20. Indeed, the use of a single additional cell will provide rather limited improvement (shift in one direction only), while two cells can ensure a further optimization by shifting also in the perpendicular direction. The parameters of the cells of the TWA (such as the type of the NLC, the thickness, etc.) can be different from those used in the LCDM. In one possible implementation, the NLC used for the TWA may be also of "Dual-Frequency" type to provide larger shifts within short time periods. In this case, we can also reach both vertical, and horizontal shifts and provide an enhanced performance of the camera using such an element (FIG. 17).

However, we must keep in mind that, here also, only the extraordinary polarization component of light (in each NLC cell) is shifted; in the vertical direction in the Cell 1 and in the horizontal direction in the Cell 2 (FIG. 16). This may be a drawback since, in addition of needing more computational power, it will require also the knowledge of Stokes parameters and it will be approximate since we shall use the information from one zone (active areal) to estimate the information in the neighboring (blind) zone.

In another embodiment, we could also provide an NLC assembly 22 (FIG. 18*a*) that can laterally shift both (ordinary and extraordinary) polarization components of light simultaneously, that is, it will be working also for the unpolarized light. In this case, e.g., when it is used for imaging, we shall not need polarization information and the light detection will be direct, not estimated nor calculated. FIG. 18*a* schematically shows the proposed Tunable Shifter Assembly (TSA) 22 that is composed of two identical planar aligned NLC cells (such as described in FIG. 7*a*) and of a broad band HWP, that is inserted in between with an optical axis C oriented at 45°. Such an assembly enables the spatial shift of an unpolarized light in a predetermined direction (here, x). In this configuration, there is no spatial (lateral shift) when both NLC cells are strongly excited (FIG. 18b) or if they are in their ground state (FIG. 18a), keeping in mind that both cells have small "pretilt" angles. Namely, in the ground state (FIG. 18a), two orthogonal components of light, incident from left (let us call them original $E_x$ and $E_y$), will cross the Cell 1 (with some relative phase delay), will then be rotated at 90° by the HWP (thus, the former $E_x$ will become $E_y(x)$ and the former $E_y$ will become $E_x(y)$). Then, they will cross the Cell 2 and will emerge without a lateral spatial shift ($\delta \approx 0$) nor relative phase delay ($\Delta\varphi \approx 0$) since the original polarization component $E_x$ (that was shifted due to the cell 1) will not undergo a further shift in the cell 2 since it will be of ordinary mode $E_{y(x)}$ in the second cell, and vice versa. A similar output will occur in the case when both cells are strongly excited (FIG. 18b).

However, as it is described in the FIG. 18c, we can obtain a lateral shift (in the direction of x axis) for only the original $E_x$ when we moderately excite only the Cell1.

Similarly, as it is described in the FIG. 18d, we can obtain also a lateral shift (in the same direction of x axis) for the original $E_y$ component of light polarization when we moderately excite both cells. This happens since the original $E_x$ component (that was shifted by the cell 1) will not undergo a further shift in the cell 2. In contrast, the original $E_y$ component, that was not shifted in the cell 1, will now propagate (in the cell 2) in the extraordinary polarization mode and will be shifted. Thus, the entire unpolarized input light will then be shifted in the direction of x axis by this device 22, and we do not need to add calculations to estimate the local intensity of the beam.

In another embodiment, we can combine (FIG. 19a) two such TSA 22 devices (one rotated with respect to the other by 90°) to obtain a new device 23 enabling also a spatial shift in the direction of y axis. In fact, this new device will enable shifting the beam in x and y directions, as well as by diagonal (FIG. 19b) since we can also generate the shifts in x and y directions simultaneously. Thus, the use of the device 23 can provide an increase of spatial resolution of various optical systems by a factor of 4.

Finally, in another embodiment, the use of the additional electrically tunable anisotropic elements (single one, such as described in FIG. 7a, or multiple cell assemblies as described in FIG. 16 or in FIG. 18) may also help us to estimate the light incidence angle α. Indeed, as we have already mentioned, the application of a moderate voltage on an NLC cell can change the relative phase delay $\Delta\varphi$ between the ordinary and extraordinary polarization components (FIG. 7b). This delay depends also upon the incidence angle α (FIG. 7c) as well as upon the applied voltage. We can use the voltage dependence of this phenomenon (being calibrated in advance) to achieve the above-mentioned function. Namely, the proposed device will be a camera system, including the LCDM (in front of the image sensor) and one of the above-mentioned tunable anisotropic elements (FIG. 7a, FIG. 16 or FIG. 18) in front of the LCDM.

In the first step, we provide a voltage $V_s$ (applied, e.g., to one of tunable anisotropic cells) and we measure the PSoL for each pixel thanks to the LCDM. Once we have that information, we change the voltage $V_s$ to a moderate voltage $V_f$ to deliberately generate a differential (or relative) phase delay $\Delta\varphi^*$ and lateral shift $\delta^*$ between the ordinary and extraordinary polarization components (FIG. 7b) of light. Then, we measure again the PSoL and we find the value of additional effective $\Delta_{\varphi eff}$ generated by the change of $V_s$ to $V_f$. This process can be done once or multiple times, with different $V_f$ values, if necessary. Then, knowing the change in Stokes parameters and knowing how the phase delay $\Delta\varphi^*$ and the lateral shift $\delta^*$ (FIG. 7c) depend upon the applied voltage, we can estimate the angle of incidence of the beam. Thus, we shall be able to generate data about the incidence angle of light that was so far available only with Light Field Cameras.

The last capability is also reminding us about the possible sensitivity of the LCDM's operation to the incidence angle of light since the light's attenuation (absorption) also may depend upon its angle of incidence. This is the reason why the LCDM should be preferably inserted in the plane of the optical system where we have the most collimated beam, since its operation will then be optimized. Otherwise, a procedure of calibration of the LCDM's driving and data processing must be applied to take into account the angular distribution (or the divergence) of beams that will change absorption coefficients of cells and thus we must work with the effective absorption values.

In fact, the proposed combination of the LCDM and one of the above mentioned tunable anisotropic elements can be a very powerful element enabling a dramatic increase of the performance of various optical imaging systems. For example, in a camera, the proposed elements will allow the detection of the "image" of Stokes parameters and the angles of incidence, in addition to the traditional intensity image detection. Not only this will be done without a loss of resolution (as it is the case in Light Field Cameras or in cameras with rotating or multiple fixed polarizers), but the proposed elements will also help to further increase the spatial resolution of the system.

Furthermore, it is well known due to the increased use of imaging cameras in mobile devices that their movement due to the hand shaking, vibrations and other undesired mechanisms can result in to the dramatic degradation of the recorded image or video quality. This is the reason why many manufacturers of cameras have introduced various electro mechanical solutions to minimize its effect. Step motors, voice coil motors (VCM), shape memory, piezo and other devices can be used here. Namely, FIG. 19c schematically shows a prior art imaging camera with fixed image sensor (CMOS, CCD, Bolometer, etc.) and moveable spring-suspended lens-VCM system to perform optical image stabilization.

Figure 19:
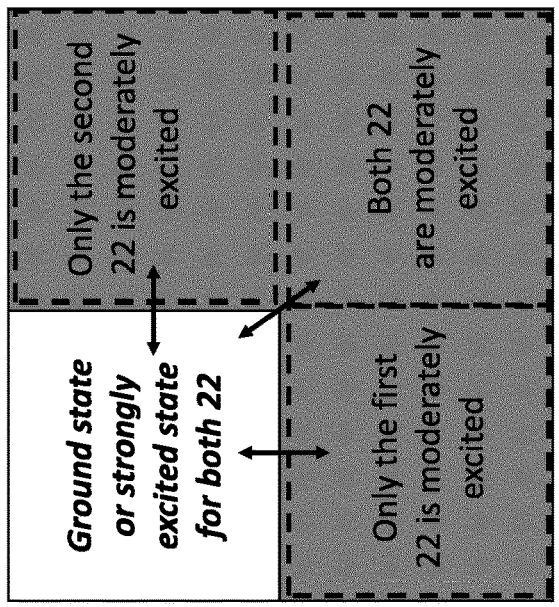
FIG. 19a schematically shows an enhanced TSA device, composed of two TSA devices, described in FIG. 18a, with their ground state molecular orientations being aligned at 90°, to perform dynamic shifting of unpolarized light beam in three directions, and to increase the spatial and angular resolution of optical systems.
FIG. 19b schematically shows various beam positions with corresponding states of excitation of the enhanced TSA device, described in FIG. 19a, to perform light beam shifts in three directions: horizontal, vertical and by diagonal.
FIG. 19c schematically shows a prior art imaging device with fixed image sensor and moveable spring-suspended lens system to perform optical image stabilization in view of compensating hand shaking or vibrations.
FIG. 19d schematically shows a prior art imaging device with moveable spring-suspended image sensor and fixed lens system to perform optical image stabilization in view of compensating hand shaking or vibrations.
FIG. 19e schematically shows a proposed imaging device with fixed lens, fixed image sensor and the device of FIG. 19a to perform optical image stabilization in view of compensating hand shaking or vibrations.
Figure 19:
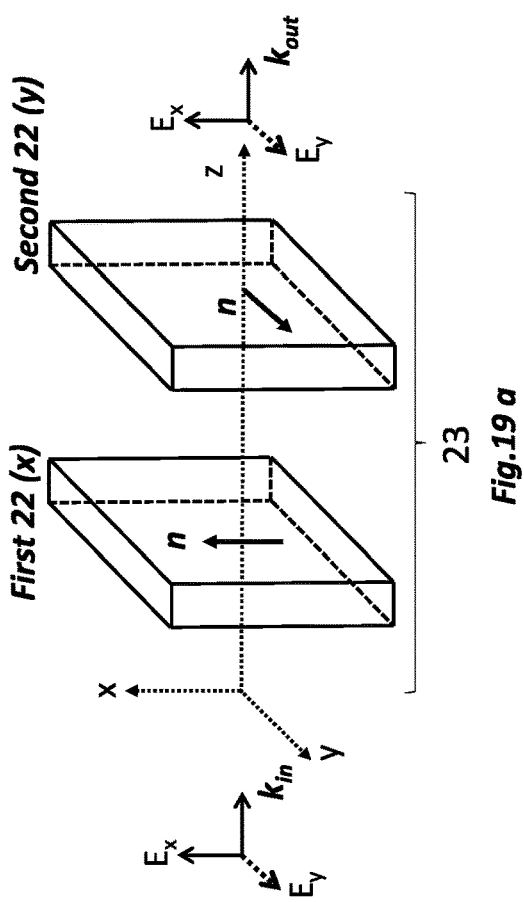
Figure 19:
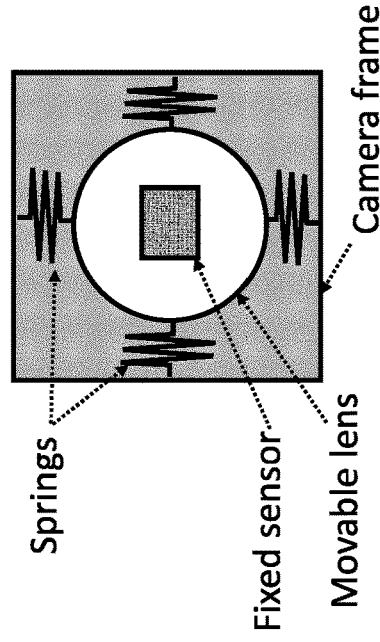
Figure 19:
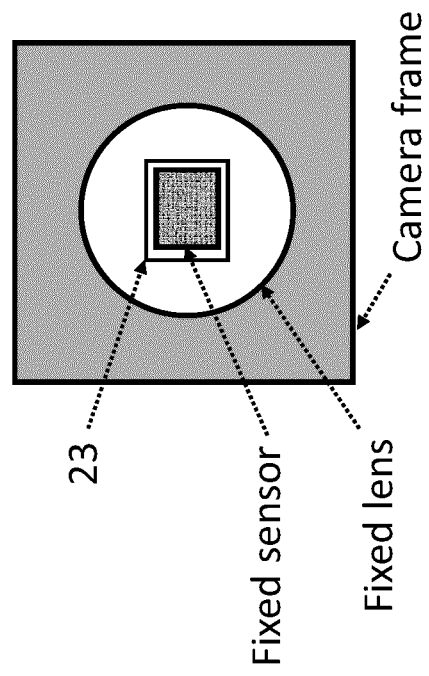
Figure 19:
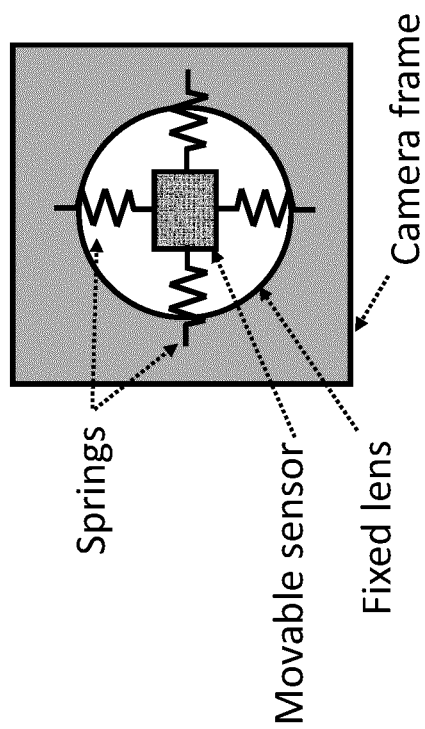

Recently, some manufacturers have changed their strategy and proposed the use of a fixed lens position along with a moveable spring-suspended sensor system, FIG. 19d.

The proposed in this invention element 23, described in FIG. 19a, can be also used to perform image stabilization but without any mechanical movements. Indeed, as it is schematically described in FIG. 19d, the addition of the element 23 to a fixed image sensor can allow shifting the image in the desired direction by using the same detection and processing system as in traditional cameras but with an additional controller that performs the image shifts, described in FIG. 19b, instead of moving the lens. For a mobile device, avoiding the use of moving parts can increase dramatically their reliability and, perhaps most importantly, it can also allow the fabrication of wafer scale cameras with image stabilization capability, while all other known moving techniques (such as VCM) are incompatible with wafer scale fabrication methodology.

Figure 20B:
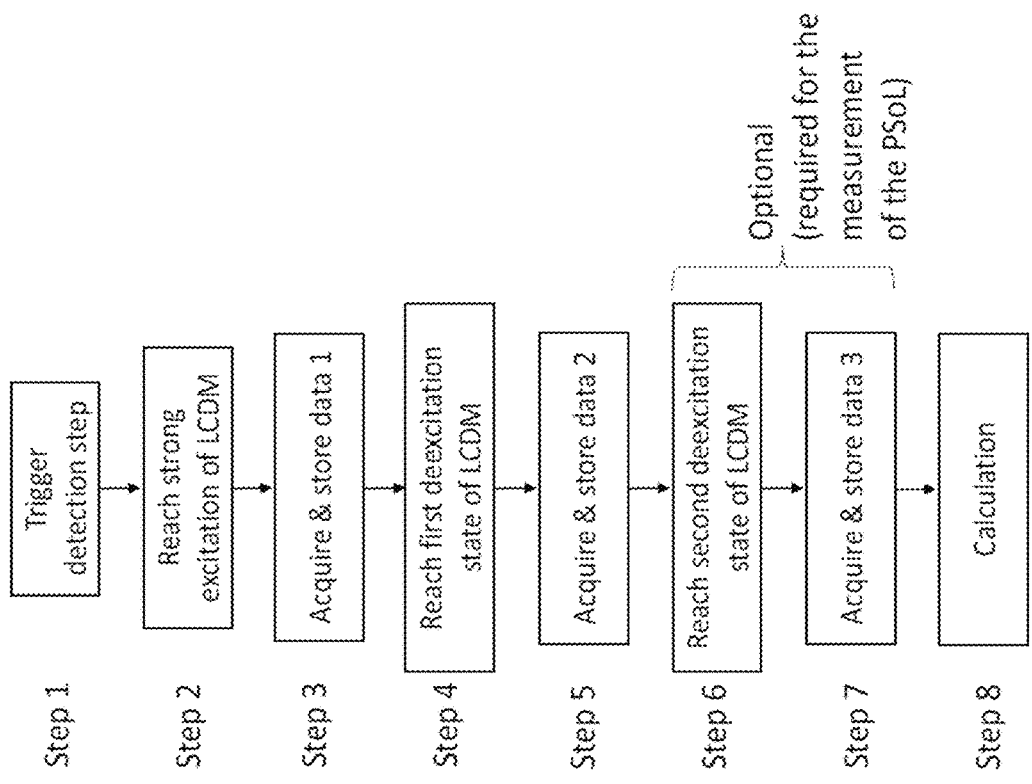
FIG. 20b schematically shows a possible procedure of using the LCDM device with an optical detection system, such as a photodetector or camera to measure the DoLP or PSoL.
Figure 20A:
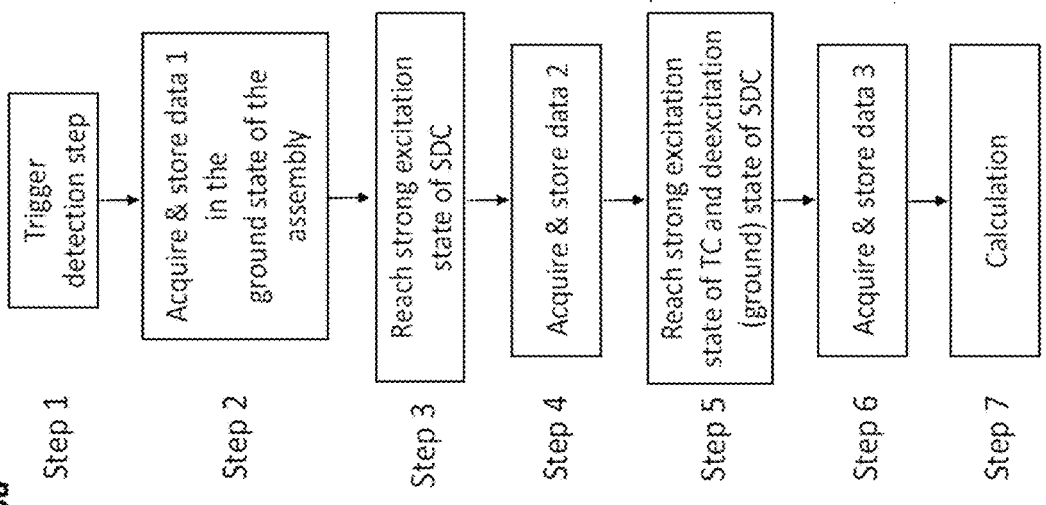
FIG. 20a schematically shows a possible procedure of using the assembly of a TC and an SDC with an optical detection system, such as a photodetector or camera to measure the DoLP or PSoL.

FIG. 20a schematically shows a possible procedure of using one of the proposed devices, composed of the TC and SDC (described in FIG. 8c), combined with an optical detection and processing system, such as a photodetector or camera. Namely, the polarization analysis may be started by the step 1 (triggering the detection step), in a similar way, as, for example, when we wish to record an image. This can be done by the choice of the corresponding mode on the touch screen of the camera, by special "double-clicking" a button, by preliminary programming or other distinctive means. Immediately after (while both cells are in their ground states), the transmitted total intensity of light is recorded (single channel, or multiple pixels) and stored in the step 2. Once the information is recorded, the SDC is brought to the strongly excited state (step 3), while the TC is still kept in the ground state, and the total light transmission is again measured and stored in the step 4.

If the used assembly is designed only for the detection of the DoLP, then the next step can be the step 7 (calculation of the DoLP). In addition, if the assembly contains passive zones 18 or a passive reference arm, then the step 7 may also include the calibration of the data obtained through the active areas of the assembly by the data obtained through the neighboring passive areas or the reference arm.

If, in contrast, we are considering the complete version of the device (capable of measuring the PSoL), then we must inverse the last states of two cells. That is, we must bring the TC into the strongly excited state and bring the SDC into the ground state (in the step 5) and perform another measurement and storage in this state (step 6). Then, all the stored transmission data may be used to calculate the PSoL in the step 7.

FIG. 20b schematically shows another possible procedure of using the LCDM device (described in FIG. 9a) with an optical detection and processing system, such as a photodetector or camera. Namely, the polarization analysis may be started by the step 1 (triggering the detection step), in a similar way, as, for example, when we wish to record an image, etc. Immediately after, a signal of strong excitation is provided to the LCDM (step 2) and the transmitted intensity is recorded (single channel, or multiple pixels) and stored in the step 3. Once the information is recorded, the LCDM is brought to the ground state (the deexcitation signal, step 4) and a new transmission data is recorded (step 5). If the used LCDM is designed only for the detection of the DoLP, then the next step can be the step 8 (calculation of the DoLP). In addition, if the LCDM contains passive zones 18 or a passive reference arm, then the step 8 may also include the calibration of the data obtained through the active areas of the LCDM by the data obtained through the neighboring passive areas or the reference arm.

If, in contrast, we are considering the complete version of the LCDM (capable of measuring the PSoL), then a second cell must be present (tilted at 45° with respect to the first cell). During the steps 2, 3, 4 and 5, this second cell must be in the strong excitation regime. Then, in the step 6, a second deexcitation signal must be applied to the second cell of the LCDM while the first cell is again brought into the strong excitation mode. Then, the corresponding transmission data must be recorded (step 7), before proceeding to the calculation step 8.

Those skilled in the art can imagine that the described dependencies are present also in other types of LC cells, such as twisted nematic or cholesteric cells, etc. Also, the described LC may be of commonly used type or of the so-called dual frequency type that enables fast switching of molecular orientation in both (excitation and "relaxation") directions.

The described device and procedure can be used also in the reflection mode, for example, by using the light reflection from the exit surface of the cell, etc.

Finally, the described device can also work if, instead of a dichroic absorption, we have other mechanisms of switchable dichroic losses, for example, diffractive, reflective, etc.

The described above assemblies can be built on separate liquid crystal panels (by using well-known in the industry processes), scribed, and broken into individual units with open areas for electrical connections, filled by the desired LC mixture and then laminated together and connectorized.

Figures 21A, 21B:
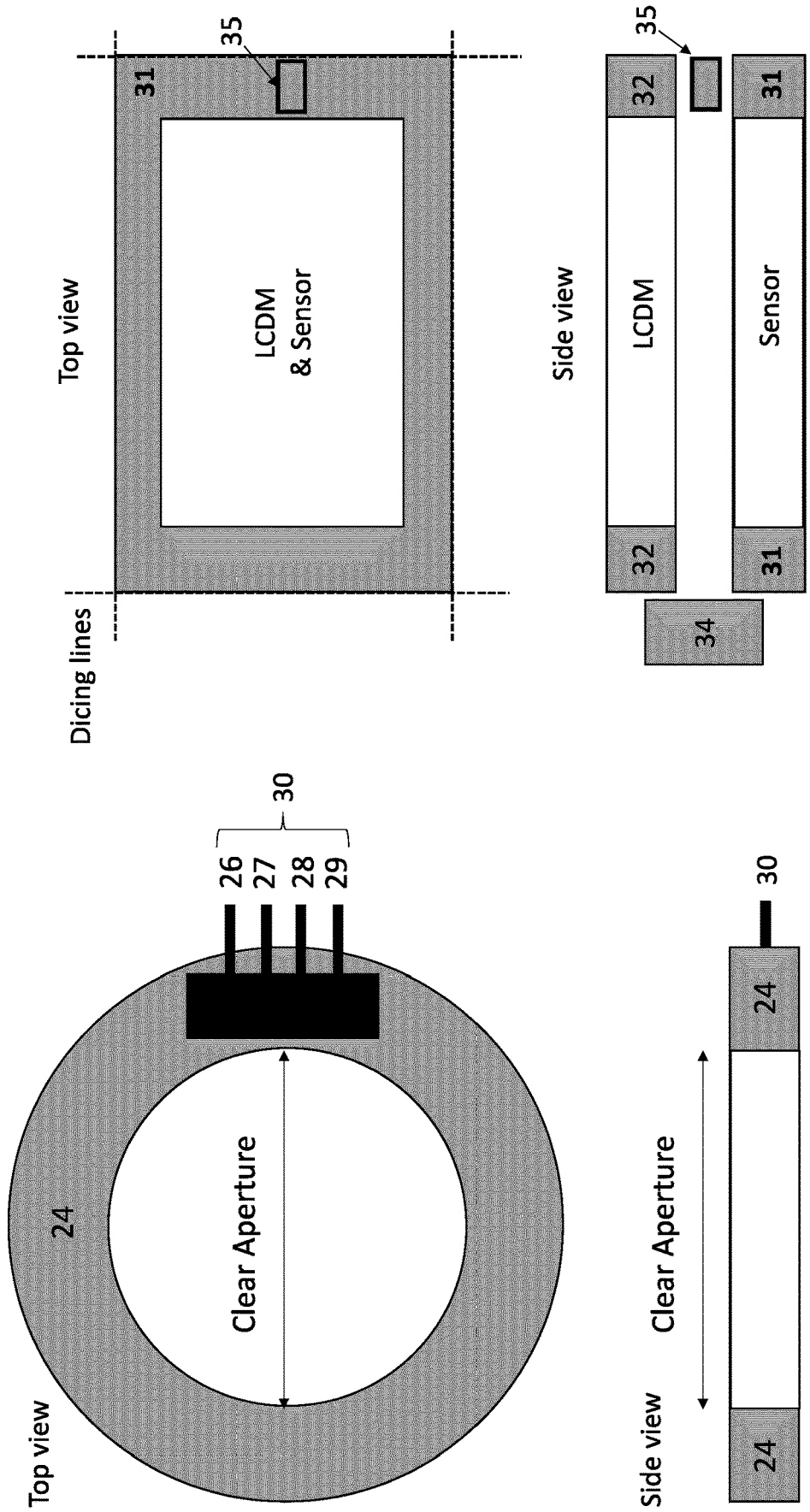
FIG. 21a schematically shows a possible round shaped LCDM device that can be fabricated separately and added to an optical detection system, such as a photodetector or camera.
FIG. 21b schematically shows a possible rectangular shaped LCDM device that can be integrated with a photodetector or an image sensor (such as CMOS or CCD) during the wafer-mode fabrication of the final assembly.

FIG. 21a schematically shows the top and side views of a possible round shaped LCDM device that can be fabricated with a frame 24, including preferably an electric circuit 25 used for the reception of the triggering electric signal from the "host" device (e.g., a power meter or a camera) and for the generation of required (including, strong) excitation signals to ensure the operation of the LCDM. This circuit may possibly have a battery and a capability to receive a signal of low voltage and transform it into a high voltage required for the strong excitation mode of the LCDM. The LCDM device may have several external electric connections. For example, the device, designed for the measurement of the DoLP, could have at least 2 electrodes (26, 27) and some additional electrodes (28, 29) to communicate with the circuit control or for charging purposes. In contrast, the device, designed for the measurement of the PSoL, would require at least another additional electrode (the two cells of the LCDM possibly sharing their ground electrodes).

FIG. 21b schematically shows the top and side views of a possible LCDM device that can be integrated with a photodetector or an image sensor (such as CMOS or CCD) during their fabrication process instead of being an "add-on" device. In this case, the sensor can be fabricated in the form of a waver, containing multiple sensor units, the LCDM also can be fabricated as a wafer, containing multiple LCDM units, and then these two wafers can be assembled (e.g., laminated) and diced into multiple "single combined devices" that can be later used with other optical systems. In this case, the frames 32 of the diced LCDM and the frames 31 of the diced sensor must be adjusted to insure the correspondence of their optical clear apertures. The electric connection of the LCDM with the rest of the circuit (of the final host device) may be done via the sensor itself to simplify the integration into the final device. This connection of the LCDM to the sensor may be done by using an edge connection technique (34) or via or surface connection 35 or other commonly used means.

Finally, in another possible scenario, various liquid crystal layers can share a common substrate and, in the case of the device, described in FIG. 18, the HWP can be used as that common substrate.

In another embodiment, we can use cells that are filled with "pure" NLC material and we can add a separate external (out of the NLC cell) thin anisotropic weakly absorbing or attenuation layer (like a "weak polarizer") to perform the measurement of the polarization state of light (at different levels, see hereafter) by using standard commercial (undoped) NLC cells. Another advantage for this approach is that the anisotropic absorption layer may be built by using materials that are difficult or even impossible to be doped in the NLC material.

Thus in another embodiment, the anisotropic absorption or attenuation film can be built by using conductive wires, carbon nano tubes, oriented graphene, or other materials that can provide anisotropic absorption or attenuation at UV, visible, infrared, gigahertz, terahertz or other frequencies.

In fact, the anisotropic "absorption" element may be of different nature and the required anisotropic losses may be generated also in a non-absorptive way. For example, it may be a structure that is providing anisotropic losses in transmission or reflection directions, such as anisotropic diffractive or holographic elements, metastructures, resonators (e.g., filled by a liquid crystal), etc. In addition, the use of such structures may also introduce wavelength selectivity. Thus, the said loss mechanism can be both polarization and wavelength selective if desired.

In fact, the function (the role) of this anisotropic film can be even played by an anisotropic detector itself, for example, it may be a radar antenna (stripes of electrodes) that is detecting more efficiently one linear polarization with respect to the orthogonal polarization. In this case, there is no need to add a separate anisotropic absorption film. Alternatively, such a film can be integrated into an isotropic (polarization insensitive) detection system too.

Coming back to the operation principle of the proposed device, FIG. 22a schematically shows the 3D view of such an approach (FIG. 22b shows its side view) for measuring the vertical and horizontal linear polarization components of input electromagnetic radiation by using a separate anisotropic absorption film in combination with a cell of a standard NLC with ground-state 90 degrees rotation of its director n. In the ground state of the cell, the input $E_x$(in) and $E_y$(in) components of light are rotated at 90 degrees by the 90 degrees twisted NLC cell, and then, the exiting x component (the input y component) is absorbed differently (say, more) by the anisotropic absorption film, compared to the exiting y component (the input x component). In contrast, in the excited (untwisted) state of the NLC cell (FIG. 22c shows its side view), the input $E_x$ and $E_y$ components are not rotated by the NLC cell since the twist is eliminated by the electric field. In this case, the exiting x component (the same input x component) is absorbed more than the exiting y component (the same input y component).

The obtained polarization information is almost the same as in the case of doping the dichroic molecules inside of the single planar aligned NLC cell (the switchable dichroic cell). Indeed, if we note the transmission coefficients (by intensity) of the anisotropic absorbing film as $t_{para}$ and $t_{perp}$ (with respect to the absorption or attenuation anisotropy axis, here along x), and the detected total transmitted intensities in the ground and excited states of the NLC, respectively as $I_{ground}$ and $I_{excited}$, then it is easy to demonstrate that, the measurement of the total transmitted light intensity for two cases (in the ground $I_{ground}$ and excited $I_{excited}$ states) should allow the calculation of the intensities of input x and y polarization components in a "different" way, as $$I_{x(in)}=(t_{para} I_{excited}-t_{perp} I_{ground})/(t^2_{para}-t^2_{perp}), \quad \text{eq.(11)}$$

and $$I_{y(in)}=(t_{para} I_{ground}-t_{perp} I_{excited})/(t^2_{para}-t^2_{perp}) \quad \text{eq.(12)}$$

In contrast, in the case of the original geometry, when the anisotropic (dichroic) absorption is generated inside the switchable dichroic dye doped planar oriented uniform (without twist rotation) NLC cell, then the same measurements would allow the calculation of intensities of input x and y components as:

$$I_{x(in)}=(I_{ground}-I_{excited})/(t_{para}-t_{perp}) \quad \text{eq.(13)}$$

and $$I_{y(in)}=(t_{para} I_{excited}-t_{perp} I_{ground})/[t_{perp}(t_{para}-t_{perp})] \quad \text{eq.(14)}$$

As we can see from these formula, the division on the difference of squares $(t^2_{para}-t^2_{perp})=(t_{para}-t_{perp})(t_{para}+t_{perp})$ might be less critical then the division on the difference $(t_{para}-t_{perp})$ for the previous approach for the cases when, e.g., the value of $t_{para}-t_{perp}$ is small. This may be, e.g., the case, when we try to minimize the attenuation of light to improve low-lighting operation, thus both absorption coefficients are kept small, and thus their difference is also small.

In another embodiment, if we wish to identify other Stokes parameters of the input light (not only vertical and horizontal), then we can further transform this device by adding (in front of it) a 45 degrees twisted cell that is similar to the one described in FIG. 7e. Namely, the described above device (of FIG. 22a) can only identify vertical (x) and horizontal (y) polarization components of input light. However, we can add in front of this device a 45 degrees twisted NLC cell, which, in its ground state, will allow "transforming" the input linear polarization components, that are oriented along the +45 degrees and −45 degrees, respectively, into vertical and horizontal polarization orientations, before it enters into the 90 degrees twisted cell. The FIG. 23a schematically shows the 3D view of such a cell in the ground state, and with the director undergoing +45 degrees rotation with its orientation at the exit surface being in a predetermined direction, e.g., vertical (along the x axis). This device can be switched into the untwisted (excited) state by using high voltage, as already described in FIG. 7f. Namely, FIG. 23b schematically demonstrates the 3D view of the device, described in FIG. 23a, but in the excited (untwisted) state. Obviously, the corresponding rotation of polarizations is eliminated in this cell. Thus, if this "excited" element (of FIG. 23b) is positioned in front of the assembly of FIG. 22a, then, the entire assembly can still be used to detect the same input polarization components, along the vertical (along x) and horizontal (along y) axis, by using the described above "original procedure" of measurement and calculation of the vertical and horizontal polarization components.

However, if the 45 degree twisted cell is in the ground state (FIG. 23a), then it will perform the above-described rotation of input +45 degrees and −45 degrees polarization components, transforming them into, respectively, "new" vertical (along the x axis) and "new" horizontal (along the y axis) components, before they enter into the device of FIG. 22a. Thus, as described in FIG. 23c, the same "original procedure", performed by the assembly of FIG. 22a (which is now positioned just behind the device of FIG. 23a) may now be used to measure the "new" vertical and "new" horizontal components, which are in reality the input +45 degrees and −45 degrees polarization components of light.

It is worth mentioning that the same goal may be achieved if the anisotropic absorption layer is placed inside the 90 degrees twisted NLC cell, e.g., in the alignment layer of the NLC or separately, between the alignment layer and the exit substrate of the cell. Thus, FIG. 24 schematically demonstrates the 3D view of an alternative version of the device, described in FIG. 22a, with the anisotropic absorption layer being integrated inside the cell.

The described additional approach may look similar to solutions when two pure twisted NLC cells are used (the first one twisted at 45 degrees and the second one twisted at 90 degrees), laminated together, followed by a traditional (normal) polarizer film. However, traditional (e.g., plastic) polarizer films typically exhibit 95% transmission in the «transmission» direction and 5% transmission in the «blocking» direction. Thus, in this case, the total average transmission is very low, typically below 45%, that is degrading the low-light operation performance of the system.

In our case, the total transmission may be significantly higher, depending, among others, upon the sensitivity of the sensor. Our approach requires more mathematical operations (needed to find the Stokes parameters), while they are rather simple (multiplication, subtraction and division). Indeed, if, instead, we use a dichroic NLC or an anisotropic (dichroic) absorption film (as proposed here), then it could be considered as a very «weak» polarizer, and the total (average) transmission may be well above 90%, but it will require a little bit more calculations compared to the case when using normal polarizers. Thus, the transmission will be at least twice better than the approaches using standard polarizers. This will be important when trying to improve the low-lighting operation of the camera, particularly in mobile devices where it is difficult or impossible to control the lighting level. At the same time, with the current tendency of increasing more-and-more the computing power of microprocessors, the need in additional calculation (with our approach, both the above mentioned new one and the one described earlier) may be a quite good option, while offering better low-lighting operations thanks to the higher transmission.

The proposed here methods may have one potential drawback—they require sequential acquisition of data. However, we can eliminate this problem by electrode segmentation of our cells. Thus, in another embodiment, we can use twisted and/or planar uniform NLC cells with segmented non-uniform electrodes to perform a simultaneous (one frame) measurement of various polarization states of light. Namely, the advantage of the Sony's sensor (FIG. 5) consists in the fact that it can record all the information, necessary for calculation of 4 orientations of polarisation of light (along 0, +45, −45 and 90 degrees), during a single frame of image acquisition. In contrast, it loses the spatial resolution of the acquired normal "intensity" image by a factor of 4 as well as (consequently) it loses also the resolution of the reconstructed "polarization" image.

The method we have proposed so far was using an assembly of uniform cells (no pixels nor segments, FIG. 12a), and thus, there was no loss of spatial resolution at all. However, the potential drawback of our approach consists in the fact that we need at least 3 additional frames (image acquisitions or signal detection) to calculate all Stokes parameters (or just 2 for the DoLP). Namely, referring on the FIG. 8, in the previously described approach, the first acquisition must be done when only the cell 1 is excited, the second acquisition must be done when only the cell 2 is excited and the third acquisition must be done when both cells (1&2) are excited. In the alternative approach, proposed here, to perform a simultaneous measurement of all Stokes parameters, we can use pixelated or segmented (in the xy plane) electrodes for our NLC cell-assemblies (laminated or positioned one after the other with segments of each cell being adjusted and synchronized with the pixels of the other cell) instead of uniform electrodes. The segmentation may be done in various ways, including the traditional technique, for example, used in passive matrix NLC displays (FIG. 25a or FIG. 25b): that is, vertical parallel electrode lines on one substrate of a given cell and horizontal parallel lines on the opposed substrate of the same cell, etc. All cells and layers may be laminated in a way that each effective pixel is a combination of effective pixels of 2 consecutive NLC cells, one behind the other along the z axis. Thus, we can simultaneously excite different effective pixels (or groups of effective pixels) in different ways.

Namely, let us use the example of the device of FIG. 25a to explain the proposed operation principle. Thus, the ellipse A (FIG. 25c) describes one possible option: the effective pixel "a" corresponds to the position where only the "front" cell 1 is excited (in the 45 degree twisted cell), while the cell 2 with switchable dichroic absorption planar oriented NLC (behind the cell 1) is in the ground state; the pixel "b" corresponds to the position where only the cell 2 is excited, while the cell 1 (in front of the cell 2) is in the ground state; and finally, the pixel "c" corresponds to the position where both cells (1&2) are excited. Thus, during a single frame, we can acquire all the information we need to calculate the PSoL. Obviously, the arrangement or the excitation of these effective pixels can be different if we are interested only by the DoLP.

The ellipse B shows another possible option where a 4rd pixel (the "d") is reserved as reference (no excited pixels). The "spatial repetition" of these pixel groups (to "fill" the device's surface) may be done in different ways, as for example, shown by ellipses A* and B* (FIG. 25d). Obviously, there must be a pixel-to-pixel correspondence between the image sensor and these effective pixels. That can be achieved in a calibration step (see hereafter).

The key advantage of this approach is that the normal "intensity" image capturing will not lose the spatial resolution (in contrast to Sony's sensor), while we can record all the required polarization information during one frame and the only "trade-off" will be the loss of the resolution of the "polarization" images (by a factor of 3 or 4, correspondingly for A and B). Obviously, the loss of "polarization" image's resolution will be less if we are interested only by the DoLP.

Both, uniform and pixelated or segmented, approaches are based on simple mathematical calculations which includes division. This risks to increase the noise in the reconstructed/calculated "polarisation" image. Various precautions may be taken to avoid it or to reduce its impact.

Thus, in another embodiment, we can use an automatic calibration and correction procedures to improve the quality of user experience in terms of the "polarization" images as well as normal "intensity" images that were obtained by "polarization calculation and filtering". This approach can be used for both uniform or segmented cell assemblies. Namely, the fixing of the proposed cell-assembly in front of a camera may be followed by various calibration procedures, e.g., an image (with given intensity and polarization distribution) is recorded when both cells are strongly excited (all-excited state for a "reference" image), then the same image is recorded when the twisted cell (TC) 1 is strongly excited, while the switchable dichroic cell (SDC) 2 is in the ground state. Then, using these results, the transmission coefficients (of the SDC) are calculated for ordinary and extraordinary polarizations per pixel position and at desired wavelengths. This will eliminate the error (and the related noise) due to the non-uniformity of the SDC's operation. In a similar way, we can also take into account the pixel response non-uniformity for the image sensor itself. Both procedures can reduce noticeably the noise generation, particularly, after the mathematical calculations required for the determination of the polarization state. This operation can be done, e.g., in the factory or in a "controlled" environment where, ideally, the image is kept constant, and the screen preserves also the polarisation state of recorded images. This, among others, may be achieved by using an artificial and synchronized lighting (controllable light source). In this case, the calculated polarization state distribution (over the surface of the sensor) may be used to find the noise distribution and to use it later to improve the image quality for recorded images.

In some cases, the measurement of the $s_3$ parameter may be highly desirable even with unpolarized light. This is where the measurements of $s_0$, $s_1$ and $s_2$ will not be enough to reach this goal. In this case, we can add an electrically variable waveplate in front of previously described devices to obtain an additional controllable and calibrated (known) phase modulation that will allow us the more accurate measurement of this last parameter, as it is commonly done in polarimetric devices.

Thus, in another embodiment, we can build an assembly of cells (see FIG. 26) where we first have a planar uniformly aligned cell (with calibrated well-known parameters), described in FIG. 7a. In the ground state, the director n of this cell in the new assembly (see FIG. 26) is tilted, e.g., at 45 degrees with respect to the vertical axis x. This planar cell is followed by a 45 degrees twisted NLC cell (45° TC), described in FIG. 7e. In the ground state, the orientation of its director at the entrance of the cell is also tilted at the same angle (e.g., 45 degrees). Thus, director orientations at the exit of the planar cell and at the entrance of the twisted cell are parallel. Obviously, the exit orientation of its director will be vertical (along the x axis) because of the 45 degrees twist. Finally, the proposed assembly contains, at the end, a planar switchable dichroic cell (SDC), described in FIG. 8a. In the ground state, the director of this cell is parallel with the x axis. Thus, the exit director of the twisted cell is parallel with the director of the SDC.

When the first (planar) cell is strongly excited (FIG. 7d), its director in its volume becomes perpendicular to the cell substrates; it does not affect the polarization of input light, and it does not affect the work of two following cells (45° TC and SDC) when trying to measure the first three Stokes parameters $s_0$, $s_1$ and $s_2$ (as described earlier). However, we can gradually change the voltage, applied to the first planar cell, and generate a well-known tunable "wave-plate" (phase delay) effect. This will generate a corresponding change of light polarization and thus of distribution in the values $s_0$, $s_1$ and $s_2$. Thus, by knowing the amount of the generated phase delay (by the planar cell), and the resulting changes in $s_0$, $s_1$ and $s_2$, we can calculate the amount of $S_3$.

The same concept of tunable phase shift can be used also with other device geometries described above, including, for example, the external anisotropic absorption film, etc.

Alternatively, we can also use a cell with liquid crystal the properties of which (transmission, reflection, losses) depend upon the circularity of light polarization. There are several examples of such liquid crystals, such as the so-called "blue phase" liquid crystals or cholesteric (or twisted) liquid crystals. One such a cell is schematically shown in the FIG. 27a, where the length of the molecule represents its projection on the plane of drawing. Thus, the director is aligned in the vertical direction at the entrance interface of the cell and then it rotates gradually. For example, there are points inside the liquid crystal layer where the director is pointing perpendicular to the drawing direction. Such a cell will be sensitive to the specific circular polarization of the incident light for a specific wavelength range. FIG. 27b shows the transmission of light that has circular right $E_{CR}$, circular left $E_{CL}$ or no polarization. As we can see, the transmission of right circular polarization component $E_{CR}$ is not affected by the cell, while the left circular polarized component $E_{CL}$ undergoes strong losses because of reflection. The transmission of unpolarized light (that could be considered as a sum of circular left and right polarizations) is in the middle.

Thus, in another embodiment, if we apply a strong electrical field, then we can untwist the liquid crystal and eliminate the reflection of left circular polarization components. In this way, the recording of the total intensity of the transmitted light in the ground state and in the excited state of the cell will allow to calculate the proportion of left and right circular polarized components (and obviously their difference, $s_3$) in the same way as explained above.

In another embodiment, artificial intelligence software can be used to take into account the original "intensity" image and to process the transformed images to improve the quality of final images. This concerns first of all the normal "intensity" images. Thus, processing may include the removal of certain polarization components to emphasize specific details of the image, similar to the use of traditional stationary (rotating manually) polarization filters. However, this may also concern the "polarization" (calculated) images, again, taking into account the original image and user experience.

The lateral calibration of the cell-assembly may be used in a "supervised learning" process and this information may be later reinforced by the customer (user) experience and choices and then used in an "unsupervised correction" mode, similar to algorithms used in neural networks or artificial intelligence systems.

In one embodiment, once the NLC cell assembly is fixed in front of the camera or the image sensor, a calibration process may be applied to define a reference level for each effective pixel, including the camera sensor's pixels as well as segments of the proposed NLC devices in the transverse plane. This reference must be made to take into account the specificity of the image sensor's pixel, but also the characteristics of the area of the NLC cells assembly that is in front of that pixel, even if the NLC cell has no pixelated electrodes. This will help to remove the variability coming from the non-uniformity of the NLC cell or of its reaction to the electric field applied.

In another embodiment, the measurement can be performed by averaging the values over a group of pixels in the transversal plane, instead of working with individual pixels.

In another embodiment, the measurement can be performed by time averaging the detected values over individual pixels for various acquisitions, instead of working with instantaneous values.

In another embodiment, the measurement data can be used along with standard image processing algorithms to eliminate the artifacts in the optimized or calculated images.

In another embodiment, the proposed devices may be used to discriminate various materials in such applications as robotics, automated waste selection, autonomous driving, medical and military imaging, etc.

For those skilled in the art, it is clear that all described concepts (polarization detection, image shifting, etc.) may be adapted for the use with electromagnetic radiation in various spectral ranges, from UV up to infrared, Gigahertz, Terahertz or other radiations, for such applications as thermal imaging, radars or other antennas. Obviously, the shifting or the adiabatic polarization rotation regimes for the described twisted cells may be quite different for these spectral ranges. NLC, substrate, and electrode materials also may be non-efficient for some wavelengths. Then, the electrode configurations and materials can be changed to reduce losses. Also, either the planar switchable cell may be used or the NLC cells may be designed and operated in different conditions to still provide the desired polarization transformation by using the relative phase delay between the ordinary and extraordinary polarization components of the working electromagnetic radiation.

Finally, for those skilled in the art, it is clear that the described formula does not limit the application of this invention. Also, various derived parameters (such as the angle of polarization or degree of circular polarization, etc.) of light may be also used to identify the material or geometrical differences.

What is claimed is:

1. A light polarization modulation device comprising:
   at least one active liquid crystal element that, in response to a control signal, changes a propagation of light in a polarization-dependent manner in different states,
   wherein, in one of said different states, said device has a transmission of a first polarization of light greater than a transmission of a second orthogonal polarization of light and transmission of said second polarization is greater than 5%, and in another of said different states, said device has different levels of transmission of said first polarization of light and said second polarization of light than in said one of the different states;
   wherein at least two orthogonal polarization component values characterizing said light can be resolved by comparing an intensity of light captured in a plurality of said different states.

2. The device as defined in claim 1, wherein said at least one active liquid crystal element comprises a planar nematic liquid crystal cell containing a dichroic dye that, in use, provides a variable absorption of light of one linear polarization depending on an orientation of a planar nematic liquid crystal material.

3. The device as defined in claim 2, wherein said planar nematic liquid crystal cell containing a dichroic dye absorbs less than 40% of said one linear polarization and less than 10% of an orthogonal linear polarization in one orientation of the planar nematic liquid crystal material and less than 10% of said one linear polarization and of said orthogonal linear polarization in another orientation of the planar nematic liquid crystal material.

4. The device as defined in claim 2, wherein said at least one active liquid crystal element further comprises a twisted liquid crystal cell able to provide a 45° rotation of a linear polarization of light, wherein said planar nematic liquid crystal cell receives said light from said twisted liquid crystal cell and intensity signal can be compared using said variable absorption and said 45° rotation to provide a measurement of four linear polarization component values.

5. The device as defined in claim 2, wherein said at least one active liquid crystal element comprises two active liquid crystal elements having a planar nematic liquid crystal orientation and containing said dichroic dye, said planar nematic liquid crystal orientation being at 45° between said two active liquid crystal elements, and said intensity signal can be compared using said two said active liquid crystal elements to provide a measurement of four linear polarization values.

6. The device as defined in claim 1, wherein said at least one active liquid crystal element comprises at least one twisted liquid crystal cell containing a dichroic dye that, in use, provides a variable absorption of light of one linear polarization and able to rotate a linear polarization of light by 90° in a ground state and by 0° in an active state.

7. The device as defined in claim 4, wherein said at least one active liquid crystal element further comprises a cholesteric liquid crystal element arranged to at least partially reflect one circular polarization of light in one of said different states and not to reflect said one circular polarization of light in another of said different states, wherein all Stokes parameters $S_0$ to $S_3$ can be provided as said at least one polarization state value characterizing said light.

8. The device as defined in claim 1, wherein said at least one active liquid crystal element further comprises a cholesteric liquid crystal element arranged to at least partially reflect one circular polarization of light in one of said different states and not to reflect said one circular polarization of light in another of said different states.

9. The device as defined in claim 1, wherein said at least one active liquid crystal element comprises at least one twisted liquid crystal cell able to rotate a linear polarization of light by 90° in a ground state and by 0° in an active state, said device comprising a dichroic polarization absorption, diffraction or reflection element passing at least one polarization of said light from said at least one liquid crystal element to a photodetector allowing the identification of two linear orthogonal polarization components of incident light.

10. The device as defined in claim 1, wherein said at least one active liquid crystal element comprises at least one twisted liquid crystal cell able to rotate a linear polarization of light by 45° and another 90° twisted cell in a ground state and by 0° in an active state, said device comprising a dichroic polarization absorption, diffraction or reflection element passing at least one polarization of said light from said at least one liquid crystal element to a photodetector allowing the identification of four linear polarization components of incident light.

11. A polarization modulation and detection device comprising:
   a polarization modulation device comprising:
      at least one active liquid crystal element that, in response to a control signal, changes a propagation of light in a polarization-dependent manner in different states,
      wherein, in one of said different states, said device has a transmission of a first polarization of light greater than a transmission of a second orthogonal polarization of light and transmission of said second polarization is greater than 5%, and in another of said different states, said device has different levels of transmission of said first polarization of light and said second polarization of light than in said one of the different states;
      wherein at least two orthogonal polarization component values characterizing said light can be resolved by comparing an intensity of light captured in a plurality of said different states;
   at least one photodetector for receiving light passing through said at least one active liquid crystal element and producing an intensity signal; and
   a controller providing said control signal, receiving said intensity signal and providing at least one polarization state value characterizing said light by comparing said intensity signal in said different states.

12. The device as defined in claim 11, further comprising calibration light source having a plurality of known polarization states and a control input for selecting said known polarization states, wherein said controller is connected to said control input of said calibration light source and is configured to calibrate how said at least one polarization state value characterizing said light is provided by comparing said intensity signal in said different states.

13. The device as defined in claim 12, wherein said controller determines an intensity value $S_0$ characterizing said light by combining said intensity signal from said different states.

14. The device as defined in claim 11, wherein said photodetector is an image sensor.

15. The device as defined in claim 14, wherein said controller comprises an image processor configured to enhance images of a scene or object acquired by said image sensor by using state of polarization values for said scene or object obtained when said at least one active liquid crystal element is in different states.

16. The device as defined in claim 14, further comprising a controllable light source connected to said controller to provide controlled lighting to said scene or object.

17. The device as defined in claim 15, wherein said at least one active liquid crystal element has a planar nematic liquid crystal orientation causing light of one polarization to shift in said different states, wherein said image sensor has active light sensitive pixel areas surrounded by inactive areas, and said image processor is configured to make use of said shift of light to enhance a resolution of said image of said scene or object to be greater than a resolution of said image sensor.

18. The device as defined in claim 17, wherein image processor is configured to make use of said shift of light to double a horizontal resolution and to double a vertical resolution of said image of said scene or object with respect to a resolution of said image sensor.

19. The device as defined in claim 1, further comprising an adapter for mounting said device to an aperture of a camera, a user trigger, an indicator, and a controller connected to said user trigger and providing said control signal and activating said indicator to cycle through said different states and prompt a user of said camera to acquire at least one image in each of said different states.

20. A method of manufacturing product involving machine vision, the method comprising:
    providing a light polarization modulation and detection device comprising:
    a polarization modulation device comprising:
        at least one active liquid crystal element that, in response to a control signal, changes a propagation of light in a polarization-dependent manner in different states,
        wherein, in one of said different states, said device has a transmission of a first polarization of light greater than a transmission of a second orthogonal polarization of light and transmission of said second polarization is greater than 5%, and in another of said different states, said device has different levels of transmission of said first polarization of light and said second polarization of light than in said one of the different states;
        wherein at least two orthogonal polarization component values characterizing said light can be resolved by comparing an intensity of light captured in a plurality of said different states;
    at least one photodetector for receiving light passing through said at least one active liquid crystal element and producing an intensity signal; and
    a controller providing said control signal, receiving said intensity signal and providing at least one polarization state value characterizing said light by comparing said intensity signal in said different states;
    performing object detection using an image from said image sensor and said at least one polarization state value characterizing said light in said image from said image sensor; and
    using said object detection in quality control to reject or to release said product.

* * * * *